United States Patent [19]
Okamura

[11] Patent Number: 6,062,188
[45] Date of Patent: May 16, 2000

[54] ROTARY PISTON TYPE INTERNAL COMBUSTION ENGINE

[76] Inventor: Toshio Okamura, 4-12, Yasuicho, Nishinomiya-shi Hyogo 662, Japan

[21] Appl. No.: 08/832,864

[22] Filed: Apr. 4, 1997

Related U.S. Application Data

[63] Continuation of application No. PCT/JP95/02047, Oct. 5, 1995.

[30] Foreign Application Priority Data

Oct. 5, 1994 [JP] Japan .................................. 6-266387

[51] Int. Cl.[7] .................................................. F02B 53/00
[52] U.S. Cl. ......................................................... 123/228
[58] Field of Search .............................. 123/228; 418/92, 418/248, 249

[56] References Cited

U.S. PATENT DOCUMENTS

| | | | |
|---|---|---|---|
| 1,309,096 | 7/1919 | Leibing | 123/228 |
| 2,728,330 | 12/1955 | Petersen | 418/92 |
| 3,251,348 | 5/1966 | Unruh | 123/228 |
| 4,286,555 | 9/1981 | Williams | 123/228 |
| 4,911,624 | 3/1990 | Bagepalli | 418/92 |

FOREIGN PATENT DOCUMENTS

| | | | |
|---|---|---|---|
| 815582 | 10/1951 | Germany | 123/228 |
| 48-18616 | 8/1973 | Japan . | |
| 54-35620 | 5/1979 | Japan . | |
| 60-27732 | 2/1985 | Japan . | |
| 60-206938 | 10/1985 | Japan | 123/228 |
| 5-38131 | 2/1989 | Japan . | |
| 4-66727 | 3/1992 | Japan . | |

*Primary Examiner*—Michael Koczo
*Attorney, Agent, or Firm*—Evenson, McKeown, Edwards & Lenahan, P.L.L.C.

[57] ABSTRACT

A rotor provided in a cylindrical rotor holding bore in a housing is supported rotatably in the holding bore via a shaft member extending coaxially with the rotor holding bore, and the rotor has one projecting portion, a gently inclined curved pressurization surface and a steeply inclined curved pressure reception surface. The rotor housing is provided therein with first and second swinging vane mechanisms positioned substantially on both sides of the shaft member, and a suction chamber, a compression chamber, a combustion chamber and an exhaust chamber, the capacities of which vary in accordance with the rotation of the rotor, are formed via these projecting portions of the rotor and first and second swinging vane mechanisms. An auxiliary combustion chamber is opened and closed by and with a first swinging vane, and a suction port is opened and closed by a second swinging vane, whereby a compressed gaseous mixture in the compression chamber is introduced into the auxiliary combustion chamber via a rotary valve in a shaft type portion of the first swinging vane and ignited therein, the auxiliary combustion chamber being then opened to inject a combustion gas into the combustion chamber.

30 Claims, 32 Drawing Sheets

98°

144°

174°

190°

300A

300B

300C

300D

300E

300F

ROTARY PISTON TYPE INTERNAL COMBUSTION ENGINE

CROSS-REFERENCE TO RELATED APPLICATIONS

This application is a continuation of PCT Application No. PCT/JP95/02047, filed on Oct. 5, 1995.

BACKGROUND AND SUMMARY OF THE INVENTION

This application claims the priority of Japanese Patent Application No. 6-266387 filed on Oct. 5, 1994 and PCT Application No. PCT/JP95/02047 filed on Oct. 5, 1995, the disclosures of which are expressly incorporated by reference herein.

The present invention relates to a rotary piston type internal combustion engine configured to rotate a rotor as a rotary piston provided in a cylindrical rotor holding bore in a housing, coaxially with a rotating axial center of the rotor holding bore.

A conventional reciprocating internal combustion engine converts reciprocating motion of a piston into rotating motion via a crank mechanism. However, presumably, due to the characteristics of the crank mechanism, approximately 50 to 60 percent of combustion gas pressure exerted on the piston is converted into output torque of the crank shaft.

Due to a valve over-lap period in which both the intake valve and exhaust valve are opened, even after exhaust is released, a small amount of combustion gas remains in the combustion chamber, and therefore it is difficult to improve the combustibility and also difficult to decrease the amount of unburned gas. The structure of the crank mechanism and valve driving mechanism including the intake valve and the exhaust valve is complex and it is therefore not easy to decrease vibration and noises caused by reciprocating motion of the piston. It is also difficult to revise the size of the four phase cycle reciprocating engine without decreasing the horsepower of the output. Accordingly, until present, various kinds of rotary piston type internal combustion engines (rotary piston engines) have been proposed. The rotary piston engine is classified either as a single rotation type rotary piston engine having a rotor rotating not eccentrically (i.e. rotating coaxially), or as a planetary rotation type rotary piston engine. As the structure of the former is more complex than that of the latter, the former has generally not been put into practical use. However, the Wankel rotary piston engine, an example of the latter type has been put into practical use.

In the Wankel rotary piston engine, a triangular rotor is held within a rotor holding bore which has an inner surface similar to a peritrocoid curve. The rotor is rotated in a planetary motion through the engaging of a rotor gear on the rotor with a gear on an eccentric output shaft. Depending on the planetary motion of the rotor, while three chambers outside of the rotor varying their capacities, four strokes of intake (suction), compression, combustion (expansion) and exhaust are performed. However, in this Wankel engine, the combustion gas pressure received by the trailing side portion of the pressure reception rotor surface facing to the combustion chamber exerts on the rotor so as to drive in reverse. Therefore, presumably, only approximately 60 to 70 percent of the combustion gas pressure received by the rotor can be converted into output torque. As well, it is also difficult to improve the combustibility in the combustion stroke and to decrease the exhaust quantity of unburned gases. Until present, various types of single rotation rotary piston engines have been proposed. FIGS. 51–56 show well known single rotation rotary engines 300A–300F. FIG. 57 shows a single rotation rotary engine 300G put into practical use by Malorie CO. This engine 300G has a housing 300, a rotor 301, a suction port 302, an ignition plug 303, an exhaust port 304 and a scavenging port 305, and the rotor 301 rotates clockwise. The engine 300H shown in FIG. 58 is provided with a housing 310, a suction port 311, an exhaust port 312, a rotor holding bore 313, a rotor 314 coaxial with the bore 313, cycloid tooth portions 315, 316 formed on the rotor 314, a first small cylindrical driven rotor 317, a second small cylindrical driven rotor 318, a combustion subchamber 319, an ignition plug 320 and the like. As shown in the chain lines, this engine 300H has a suction chamber 321, a compression chamber 322, an expansion chamber 323 and an exhaust chamber 324. A prototype of this engine 300H made in about 1945 was reported to have high output horse power performance notwithstanding its small and light structure. However, this engine was not put into practical use after its development.

On the other hand, Japanese patent publication No. 60-27732 discloses a single rotation rotary engine having a rotor holding bore in a housing, a rotor coaxial with the bore, a shaft member holding the rotor rotatably, three partition mechanisms (each having a movable partition plate and a spring member forcing the partition plate toward the rotation center), a cut-away portion formed by cutting away ⅓ of the rotor, a pressure reception surface directed radially at the leading end portion of cut-away portion, a compression surface formed arcuately at the bottom of cut-away portion, a suction port and an exhaust port positioned at both sides of the first partition mechanism on the lower left hand side portion of the housing, a compression port near the trailing side of second partition mechanism on the lower right hand side portion of the housing, an expansion port positioned near the leading side of third partition mechanism on the top portion of the housing, an ignition plug facing the expansion port, a gas passage pipe making the compression port communicate with the expansion port, etc.

Next, descriptions will be given concerning technical problems of above prior art. In various single rotation rotary engines 300A–300F shown in FIGS. 51–56, the axial center of the rotor is eccentric to the axial center of the rotor holding bore, and presumably some portion of the combustion gases will generate intrinsically a reversely driving torque. Thus, it is difficult to improve the efficiency in converting the combustion gas pressure into output torque. For an engine having plural cylinders, a straight type output shaft cannot be applied and, moreover, the structure of the output shaft becomes complicated.

Therefore, engine vibrations will occur due to this eccentric structure. It is also difficult to secure the durability of gas sealing members. Some of the above engines require an intake valve and an exhaust valve. It is also difficult to sufficiently lengthen the suction period and the exhaust period. In the single rotation rotary engine 300 shown in FIG. 57, the structure is complex due to its many components, and thus manufacturing costs become high. It seems difficult, therefore, to secure adequate durability. The single rotation rotary engine 300H shown in FIG. 58 is superior due to its simple structure, yet there remain some problems in the reliability and durability of gas sealing mechanisms between the cycloid tooth portions and small cylinders, and it is difficult to sufficiently lengthen the periods of suction stroke and exhaust stroke which are 180 degrees in the rotor rotation angle.

In the single rotation rotary engine disclosed in the Japanese patent publication noted earlier, a small amount of compressed fuel-air mixture remains continually in the communicating tube to supply the compressed mixture from the compression port to the combustion port. When a small-sized communicating tube is applied, the pressure loss of the compressed mixture will become large. Also, it is necessary to prevent the compressed mixture from firing in the tube by using a valve means. Because the reversely driving torque gradually increases during the combustion stroke, it is difficult to improve efficiency in converting the combustion gas pressure into output torque. Since the pressure reception surface of the rotor is directed radially, the partition plate cannot maintain any gas sealing contact with the rotor at high rotation speed. During the compression stroke, reversely driving torque due to negative pressure in the cut-away portion is generated presumably. Since each duration of the suction stroke, the compression stroke, the expansion stroke and the exhaust stroke is very short and runs at approximately 120 degrees in the rotor rotation angle, it is difficult to improve the engine's performance. The thin partition plates are not sufficient to permit gas seal engagements, and their durability is also insufficient. When the rotor housing is divided due to three partition plates, it will become difficult to fabricate the rotor housing and to secure precision in fabrication. Because three partition plates extend in a radial direction, engine size becomes large. As described above, the engine is not suitable for practical use due to these many shortcomings.

The objects of the present invention are as follows. One object is to improve efficiency in converting combustion gas pressure into output torque. Another object is to reduce the size and to simplify the engine structure. Other object is to lengthen the period during which the large pressure reception area is maintained. Other object is to reduce the pumping losses by securing the period of suction stroke and enlarging the period of exhaust stroke. A further object is to secure the performance of hermetically engaging contact and the durability of partitioning mechanisms partitioning between a bore surface and an outer circumferential surface of rotor. Still another object is to shorten the passage length of the gas passage mechanism which supplies compressed fuel-air mixture or compressed air from the suction chamber to the combustion chamber, and to simplify the structure of the gas passage mechanism. A final object is to make it possible to adopt a straight output shaft for an engine having plural cylinders.

According to one preferred embodiment of the present invention, a rotary piston type internal combustion engine comprises: a housing including a rotor housing and side housings; a cylindrical rotor holding bore formed in the housings; a rotor as a rotary piston held in the rotor holding bore rotatably around a rotation center which is an axial center of the rotor holding bore, the rotor including at a portion of its outer circumferential surface a minimum radius surface smaller in diameter than a bore surface which is a circumferential surface of the rotor holding bore, and including a projecting portion for partitioning whose top portion is in contact with the bore surface with gas seal engagement; an axial member coaxial with the rotor holding bore, the axial member supporting the rotor on the housing, and being rotatable in unison with the rotor; an intake port and an exhaust port which are formed in the housing, the exhaust port being positioned near the intake port on the trailing side in the direction of rotor rotation; a first partitioning means for partitioning hermetically between the outer circumferential surface of the rotor and the bore surface while engaging the outer circumferential surface, on an opposite side to the intake port and exhaust port with respect to the axial center of the rotor holding bore; a second partitioning means for partitioning hermetically between the outer circumferential surface of the rotor and the bore surface while engaging the outer circumferential face, between the intake port and exhaust port; and three chambers formed by partitioning with the first partitioning means, the second partitioning means and the projecting portion, between the outer circumferential surface of the rotor and the bore surface within the rotor holding bore, the three chambers varying their capacities according to rotor rotation.

According to certain preferred embodiments of the present invention, the rotor comprises, on its outer circumferential surface, the minimum radius face, a gently inclined curved pressurization surface extending from a trailing side end of the minimum radius surface to a top of the projecting portion, and a steeply inclined curved pressure reception surface extending from a leading side end of the minimum radius surface to the top of the projecting portion.

According to certain preferred embodiments of the present invention, the first partitioning means comprises: a first swinging partition member comprising an axial portion disposed so as to approximately circumscribe the bore surface and supported on the housing so as to swing around an axial center parallel to the axial center of the rotor holding bore, and a swinging partition plate formed integrally with the axial portion and extended by a given length from the axial portion in the direction of rotor rotation and having an engaging curved surface for engaging hermetically with the rotor; a first holding cavity formed in the rotor housing and being open to the bore surface, and being capable of holding the swinging partition plate of the first swinging partition member; and a first biasing means for forcing the first swinging partition member so that the swinging partition plate may be forced against the rotor.

According to certain preferred embodiments of the present invention, the second partitioning means comprises: a second swinging partition member comprising an axial portion positioned so as to approximately circumscribe the bore surface and supported on the housing so as to swing around an axial center parallel to the axial center of the rotor holding bore, and a swinging partition plate formed integrally with the axial portion and extended by a given length from the axial portion in the direction of rotor rotation, with an engaging curved surface for engaging hermetically with the rotor, the second swinging partition member being capable of opening and closing the intake port at timings depending on the rotation phase of the rotor; a second holding cavity formed in the rotor housing and being open to the bore surface, capable of holding the swinging partition plate of the second swinging partition member, and communicating with the intake port; and a second biasing means for forcing the second swinging partition member so that the swinging partition plate may be forced against the rotor.

According to certain preferred embodiments of the present invention, the three chambers comprise: when the projecting portion of the rotor is positioned on the leading side rather than the intake port and on the trailing side rather than the first partitioning means, a suction chamber communicating with the intake port, a compression chamber between the projecting portion and the first partitioning means, and an exhaust chamber communicating with the exhaust port; and when the projecting portion of the rotor is positioned on the leading side rather than the first partitioning means and on the trailing side rather than the exhaust port, a suction chamber or a compression chamber, an expansion chamber, and an exhaust chamber.

According to certain preferred embodiments of the present invention, the intake port and the exhaust port are formed in the rotor housing.

According to certain preferred embodiments of the present invention, the projecting portion of the rotor comprises a seal groove, a seal member fitted in the seal groove and being in hermetical contact with the bore surface of the rotor holding bore, and a biasing means forcing the seal member against the bore surface.

According to certain preferred embodiments of the present invention, the rotor housing is provided with a combustion subchamber opening to at least a portion of an interior end face of the first holding cavity, the combustion subchamber switchable between a closed condition closed hermetically by the swinging partition plate of the first swinging partition member and an opened condition opened to the first holding cavity and the expansion chamber.

According to certain preferred embodiments of the present invention, the rotary piston type internal combustion engine further comprises: a gas inlet passage formed in the first swinging partition member for introducing compressed fuel-air mixture or compressed air in the compression chamber into the combustion subchamber; and an opening/closing valve means having a valve shaft fitted in through an axial bore in the axial portion of the first swinging partition member, the opening/closing valve means opening and closing the gas inlet passage at timings depending on rotation phase of the rotor.

According to certain preferred embodiments of the present invention, the rotary piston type internal combustion engine further comprises: a subchamber forming member fitted in an axial bore in the axial portion of the first swinging partition member; and a combustion subchamber formed in the subchamber forming member.

According to certain preferred embodiments of the present invention, the rotary piston type internal combustion engine further comprises: a gas inlet passage formed in the first swinging partition member for introducing compressed fuel-air mixture or compressed air in the compression chamber into the combustion subchamber; a gas outlet passage formed in the first swinging partition member for expelling combustion gas from the combustion subchamber into the expansion chamber; and an opening/closing valve means having a valve shaft fitted in through the axial bore in the axial portion of the first swinging partition member, the valve shaft including the subchamber forming member, the opening/closing valve means opening and closing each of the gas inlet passage and the gas outlet passage at timings depending on rotation phase of the rotor.

According to certain preferred embodiments of the present invention, the first biasing means is constructed so as to provide an elastic force via one or more spring members.

According to certain preferred embodiments of the present invention, the first biasing means is constructed so as to provide an elastic force via one or more spring members and compressed air.

According to certain preferred embodiments of the present invention, the second biasing means is constructed so as to provide an elastic force of one or more spring members.

According to certain preferred embodiments of the present invention, the second biasing means is constructed so as to provide an elastic force of one or more spring members and compressed air.

According to certain preferred embodiments of the present invention, the rotary piston type internal combustion engine further comprises an oil supplying means for supplying lubricating oil to the engaging curved surface of the first swinging partition member of the first partitioning means.

According to certain preferred embodiments of the present invention, the rotary piston type internal combustion engine further comprises a cooling means for cooling the first swinging partition member of the first partitioning means.

According to certain preferred embodiments of the present invention, the rotary piston type internal combustion engine further comprises an oil supplying means for supplying lubricating oil to the engaging curved surface of the second swinging partition member of the second partitioning means.

According to certain preferred embodiments of the present invention, the rotary piston type internal combustion engine further comprises a cooling means for cooling the second swinging partition member of the second partitioning means.

According to certain preferred embodiments of the present invention, the rotary piston type internal combustion engine further comprises an ignition plug for igniting compressed fuel-air mixture in the combustion subchamber.

According to certain preferred embodiments of the present invention, the rotary piston type internal combustion engine further comprises a fuel injector for injecting fuel into the combustion subchamber.

Next descriptions will be made on the functions and advantages of above inventions.

According to certain preferred embodiments of the present invention, just as for the Wankel rotary piston engine, between the outer circumferential surface of the rotor and the bore surface within the rotor holding bore, three chambers whose respective capacities vary depending on rotor rotation, are formed by separating with the first partitioning means, the second partitioning means and the projecting portion of the rotor. When the rotor is in motion so that the projecting portion of the rotor has passed the intake port but not yet arrived at the first partitioning means, a suction chamber communicating with the intake port and expanding its capacity, a compression chamber between the projecting portion and the first partitioning means and reducing its capacity, and an exhaust chamber between first and second partitioning means and communicating with the exhaust port, are each formed. Additionally when the projecting portion of the rotor has passed the first partitioning means but not yet arrived at the exhaust port, the suction chamber or the compression chamber between the intake port and the first partitioning means, the expansion chamber between the first partitioning means and the projecting portion and an exhaust chamber between the projecting portion and the second partitioning means, are each formed. As the rotor rotates around the rotating center which is the axial center of the rotor holding bore, it is easy to attain hermetical sealing performance between the projecting portion and the bore surface and to attain durability of the hermetical sealing engagement. A lever length from an exerting position of resultant force of combustion gas pressure exerted on the rotor to the rotation center of rotor in the combustion stroke can be set large, and reversely driving torque by combustion gas pressure almost never be generated if the shape of rotor is formed properly. It is therefore possible to improve considerably the efficiency in converting the combustion gas pressure into output torque. By enlarging the circumferential length of the minimum radius surface of the rotor, or designing properly the shape of the outer circumferential surface portion of the rotor from the minimum radius surface to the projecting portion, it is possible to maintain an approximate maximum pressure reception area in the expansion stroke, and therefore it is possible to further improve the converting efficiency.

The rotor never rotates eccentrically, the axial member as an output shaft is coaxial to the axial center of the rotor holding bore, and thus a straight axial member can be used even in an engine having plural cylinders. Vibrations due to eccentric configuration will not be generated. The suction stroke begins just after the projecting portion of the rotor passes the intake port and continues until a certain timing (depending on the shape of rotor) after the projecting portion passes the first partitioning means. In this way suction stroke duration becomes sufficient and suction resistance can be reduced. The exhaust stroke begins after the projecting portion passes the exhaust port and continues while the rotor rotates almost one revolution. Thus the duration of the exhaust stroke becomes sufficient and it becomes unnecessary to provide an exhaust valve means in the exhaust port. As a result, exhaust resistance can be reduced considerably. Accordingly, the pumping loss due to suction and exhaust can also be reduced considerably.

According to certain preferred embodiments of the present invention, the rotor comprises, on its outer circumferential surface, the minimum radius face, the gently inclined curved pressurization surface extending from the trailing side end of the minimum radius surface to the top of the projecting portion, and the steeply inclined curved pressure reception surface extending from the leading side end of the minimum radius surface to the top of the projecting portion. Thus, when the rotor rotates, the first partitioning means or the second partitioning means is passed first by the gently inclined curved pressurization surface, followed by the top of the projecting portion, and finally by the steeply inclined curved pressure reception surface. Accordingly, motion of the first and second partitioning means and the rotor become smooth, and reversely driving torques due to pressing forces by the first and second partitioning means become negligible. And that, when the steeply inclined curved pressure reception surface receives combustion gas pressure, the increasing speed of the pressure reception area becomes sufficient, and thereby the output torque in the expansion stroke increases rapidly so that the converting efficiency become considerable.

According to certain preferred embodiments of the present invention, the first partitioning means comprises the first swinging partition member, the first holding cavity and the first biasing means. The first swinging partition member comprises the axial portion which is positioned so as to approximately circumscribe the bore surface and supported on the housing rotatably around the axial center parallel to the axial center of the rotor holding bore, and the swinging partition plate formed integrally with the axial portion and extending by a given length from the axial portion in the direction of rotor rotation and having the engaging curved surface engaging hermetically with the rotor. The first swinging partition member is enforced toward the rotor by the first biasing means. This first biasing means can be constructed of one or more spring members. Furthermore, although the gas pressure of compressed fuel-air mixture or compressed air is exerted on the swinging partition plate of the first swinging partition member, the first biasing means enforces the first swinging partition member toward the rotor so that the swinging partition plate may stay in contact with the rotor. Because the axial portion circumscribes approximately the bore surface and the swinging partition plate extends by a given length from the axial portion toward the rotor rotation direction, the compression chamber can compress fuel-air mixture or air until its capacity becomes sufficiently small. And, in accordance with rotor rotation, while the engaging curved surface of the swinging partition plate stays in contact with the rotor, the first swinging partition member swings around the center of the axial portion with following the rotor. Accordingly, as the swinging partition plate swings around the center of the axial portion in accordance with the rotor rotation, the contact area of the engaging curved surface oscillates, and therefore local abrasion almost never occurs in the engaging curved surface, improving the gas seal function and securing the durability.

When the projecting portion of the rotor passes the first partitioning means, the swinging partition plate of the first swinging partition member is held in the first holding cavity opened to the bore surface, allowing the rotor to rotate without hitting the swinging partition plate. When the swinging partition plate is held in the cavity, the projecting portion of rotor stays in contact with the swinging partition plate. As a result, jumping of the swinging partition plate does not occur. The first swinging partition member does not project largely outside of the rotor housing. Although the first swinging partition member swings, the partition member occupies only a small space. In this way, the rotor housing can be reduced in size and it becomes unnecessary to divide the rotor housing into plural pieces to provide the first swinging partition member.

According to certain preferred embodiments of the present invention, the second partitioning means comprises the second swinging partition member, the second holding cavity and the second biasing means. The second swinging partition member comprises the axial portion positioned so as to approximately circumscribe the bore surface and supported on the housing rotatably around the axial center parallel to the axial center of the rotor holding bore, and the swinging partition plate formed integrally with the axial portion and extended by a given length from the axial portion toward the direction of rotor rotation, having an engaging curved surface which engages hermetically with the rotor. This second swinging partition member is constructed so as to open and close the intake port at timings determined by rotor rotation. The second swinging partition member is enforced toward the rotor by the second biasing means. This second biasing means can be constructed with one or more spring members, and generates the biasing force to prevent the swinging partition plate from detaching from the rotor when exhaust gas pressure in the exhaust chamber is exerted on the partition plate.

Because the axial portion circumscribes approximately the bore surface and the swinging partition plate extends by a given length from the axial portion toward the rotor rotation direction, the exhaust chamber can be reduce in size until its capacity becomes sufficiently small. As well, in accordance with rotor rotation, while the engaging curved surface of the swinging partition plate stays in contact with the rotor, the second swinging partition member swings around the center of the axial portion so as to follow the rotor. Accordingly, as the swinging partition plate swings around the center of the axial portion in accordance with rotor rotation, the contact area of the engaging curved surface oscillates, and therefore local abrasion does not occur in the engaging curved surface, allowing for improved gas seal function and durability.

When the projecting portion of the rotor passes the second partitioning means, the swinging partition plate of the second swinging partition member is held in the second holding cavity open to the bore surface. The rotor can thereby rotate without colliding against the swinging partition plate. When the swinging partition plate is held in the cavity, the projecting portion of the rotor stays in contact with the swinging partition plate and so jumping of the swinging partition plate does not occur.

The intake port is opening to the second holding cavity, and the second swinging partition member opens and closes the intake port at timings depending on rotor rotation. Accordingly, the second swinging partition member operates as an opening/closing valve means for opening and closing the intake port, and compared with the instances when an opening/closing valve means is provided independently, this structure can be simplified. The second swinging partition member does not project largely outside of the rotor housing. Although the second swinging partition member swings, the partition member occupies only a small space. Thereby, the rotor housing can be reduced in size and it becomes unnecessary to divide the rotor housing into plural pieces to provide the second swinging partition member.

According to certain preferred embodiments of the present invention, the three chambers comprises, when the projecting portion of the rotor is positioned on the leading side than the intake port and on the trailing side than the first partitioning means, the suction chamber communicates with the intake port, the compression chamber is located between the projecting portion and the first partitioning means, and the exhaust chamber communicates with the exhaust port. Where the projecting portion of the rotor is positioned on the leading side than the first partitioning means and on the trailing side than the exhaust port, the three chambers are made up of the suction chamber or the compression chamber, the expansion chamber, and the exhaust chamber. Here, the suction chamber is partitioned between the second partitioning means and the steeply inclined curved pressure reception surface of the rotor. The capacity of the suction chamber in the early stage of suction stroke increases rapidly. This improves the charging efficiency. The capacity of the suction chamber can also be enlarged. As the expansion chamber is partitioned between the first partitioning means and the steeply inclined curved pressure reception surface of the rotor, the ascension of output torque in the expansion stroke can be promoted. In addition, the capacity of expansion chamber can be enlarged, and the pressure reception area of the rotor facing the expansion chamber can be enlarged. As the compression chamber is partitioned between the gently inclined curved pressurization surface of the rotor and the first partitioning means, the duration of the compression stroke can be lengthened so that compression operation becomes smooth. As the exhaust chamber is partitioned between the gently inclined curved pressurization surface of the rotor and the second partitioning means, exhaust operation also becomes smooth.

According to certain preferred embodiments of the present invention, the intake port and the exhaust port are provided in the rotor housing. However, by setting the length of these ports along the axial direction of the rotor to be shorter than that of the rotor, it is possible to prevent the rotor housing from being divided by these ports. Because these ports are provided in the rotor housing, the structures of these ports and the side housing can also be simplified.

According to certain preferred embodiments of the present invention, the projecting portion of the rotor comprises the seal groove, the seal member, as well as the biasing means biasing the seal member against the bore surface. Therefore the projecting portion of the rotor can partition hermetically between a pair of neighboring chambers.

According to certain preferred embodiments of the present invention, the combustion subchamber is formed in the rotor housing so as to open to at least a portion of the interior end face of the first holding cavity, and the combustion subchamber can be switched between the closed condition closed hermetically by the swinging partition plate of the first swinging partition member and the opened condition opened to the first holding cavity and the expansion chamber. Thus, the first swinging partition member is utilized as the opening/closing valve means for opening and closing the subchamber. Accordingly, in comparison with the case where an opening/closing valve means is provided independently, the structure can be simplified, and it becomes unnecessary to provide an actuator for driving the opening/closing valve means. After the subchamber is closed by the swinging partition plate in the late stage of the compression stroke, the gas pressure of the compressed fuel-air mixture or compressed air in the subchamber is exerted on the swinging partition plate, and therefore it is possible to reduce the maximum value of biasing force of the biasing means for resisting the compressed fuel-air mixture or compressed air.

The subchamber is opened and closed by the swinging partition plate which swings around the center of the axial portion near the bore surface, thereby it is possible to enlarge the opening area when the subchamber is open. In such cases, the combustion gas pressure is exerted on the swinging partition plate so as to enforce it against the rotor, thereby sealing performance (partition function) sealing hermetically by the first partitioning means becomes complete. Furthermore, the swinging partition plate extends by a given length in the direction of rotor rotation, and the subchamber is opened just after the rotor has passed the partition plate. Therefore, a compressed fuel-air mixture or compressed air is held in the subchamber during a short period, and thus firing performance can be enhanced and initial combustibility in the expansion stroke can be enhanced.

According to certain preferred embodiments of the present invention, the engine has the gas inlet passage for introducing the compressed fuel-air mixture or compressed air in the compression chamber into the subchamber and the opening/closing valve means for opening and closing the gas inlet passage at timings depending on the rotation phase of the rotor. The gas inlet passage is provided in the first swinging partition member, and the opening/closing valve means has the valve shaft fitted through in the axial bore formed in the axial portion of the first swinging partition member. The gas inlet passage can therefore be made short, allowing for the passage area of gas inlet passage to be enlarged as required. Furthermore, the opening/closing valve means can be constructed as a rotary valve including the valve shaft, allowing the structure of the valve means to be simplified and the valve shaft to be constructed as a common valve shaft for plural cylinders. It is also possible to drive the common valve shaft synchronously with the rotor.

According to certain preferred embodiments of the present invention, the subchamber forming member is fitted in the axial bore in the axial portion of the first swinging partition member, and the combustion subchamber is formed in the subchamber forming member. In this way, the distance from the compression chamber to the subchamber (i.e. length of gas inlet passage) can be minimized. As well, the residual quantity of compressed fuel-air mixture or compressed air residing in the gas inlet passage can be minimized and the structure of the subchamber can be simplified.

According to certain preferred embodiments of the present invention, the gas inlet passage for introducing the compressed fuel-air mixture or compressed air into the combustion subchamber, as well as the gas outlet passage for feeding out the combustion gas from the combustion subchamber into the expansion chamber are provided. In addition, the opening/closing valve means for opening and closing each of the gas inlet passage and the gas outlet passage at timings depending on the rotation phase of the rotor is also provided. The opening/closing valve means has the valve shaft fitted in through the axial bore in the axial portion of the first swinging partition member, and the valve shaft has the subchamber forming member. The opening/closing valve means opens and closes each of the gas inlet passage and the gas outlet passage at timings depending on the rotation phase of the rotor. Thereby, the structure of opening/closing valve means can be simplified remarkably, and the structure of rotor housing can be simplified.

According to certain preferred embodiments of the present invention, the first biasing means for enforcing the first swinging partition member of the first partitioning means is constructed so as to enforce by elastic force of one or more spring members. In this way, the structure of biasing means can be simplified.

According to certain preferred embodiments of the present invention, the first biasing means is constructed so as to enforce by elastic force of one or more spring members and compressed air, allowing a strong biasing force to be generated and a rapid response to be attained.

According to certain preferred embodiments of the present invention, the second biasing means for enforcing the second swinging partition member of the second partitioning means is constructed so as to enforce by elastic force of one or more spring members, allowing the structure of the biasing means to be simplified.

According to certain preferred embodiments of the present invention, the second biasing means is constructed so as to enforce by elastic force of one or more spring members and compressed air, allowing a strong biasing force to be generated and a rapid response to be attained.

According to certain preferred embodiments of the present invention, the oil supplying means supplies oil to the engaging curved surface of the first swinging partition member of the first partitioning means, making it possible to lubricate certainly between the rotor and the engaging curved surface.

According to certain preferred embodiments of the present invention, the cooling means cools the first swinging partition member of the first partitioning means, preventing overheat of the first swinging partition member and also assuring durability. The oil supplying means supplies oil to the engaging curved surface of the second swinging partition member of the second partitioning means, making it possible to lubricate certainly between the rotor and the engaging curved surface.

According to certain preferred embodiments of the present invention, the cooling means cools the second swinging partition member of the second partitioning means, preventing overheat of the second swinging partition member and also assuring durability.

According to certain preferred embodiments of the present invention, the ignition plug for igniting the compressed fuel-air mixture in the combustion subchamber is provided, and thus this engine is an ignition type internal combustion engine in which a mixed gas of air and fuel, such as gasoline, is ignited. In this engine, a compressed fuel-air mixture of approximate compression ratio from 8 to 10 is charged from the compression chamber into the subchamber. After closing the gas inlet passage by the opening/closing valve means, the ignition plug ignites, and then firing of the mixture spreads to the subchamber. After the projecting portion of the rotor passes the first partitioning means, the subchamber is opened and the combustion gas is injected into the expansion chamber from the subchamber, as the combustion gas pressure is exerted on the steeply inclined curved pressure reception surface of the rotor, enabling the rotor to rotate.

According to certain preferred embodiments of the present invention, the fuel injector for injecting fuel into the combustion subchamber is provided, and thus this engine is a compression ignition type internal combustion engine in which ignition is made by injecting fuel such as right oil, into the compressed air in the subchamber. The compressed air of an approximate compression ratio 14 is charged from the compression chamber into the subchamber. After closing the gas inlet passage by the opening/closing valve means, the fuel injector injects fuel, and then compression ignition occurs in the subchamber.

Other objects, advantages and novel features of the present invention will become apparent from the following detailed description of the invention when considered in conjunction with the accompanying drawings illustrating preferred embodiments of the invention.

13

Figure 21:
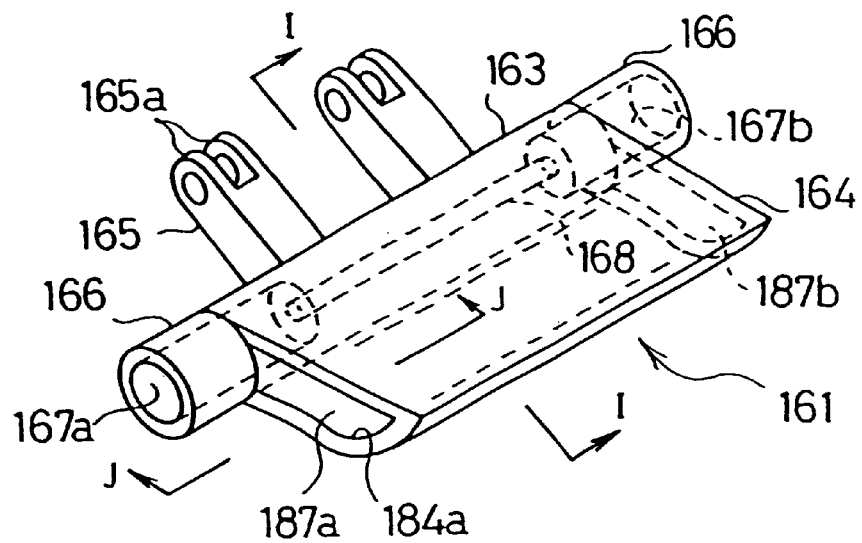

FIG. 21 is a perspective view of a second swinging vane of a second swinging vane mechanism.

Figure 22:
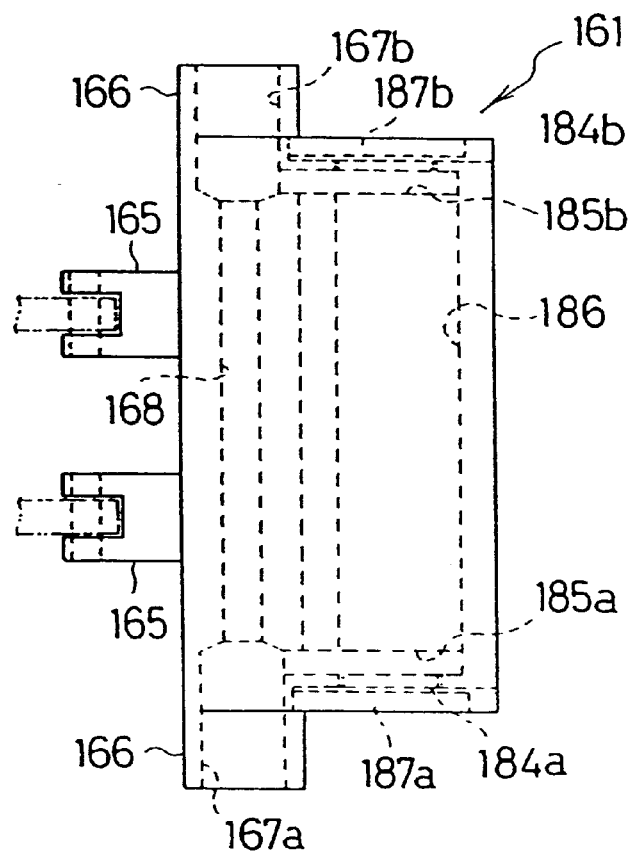

FIG. 22 is a plan view of the second swinging vane.

Figure 23:
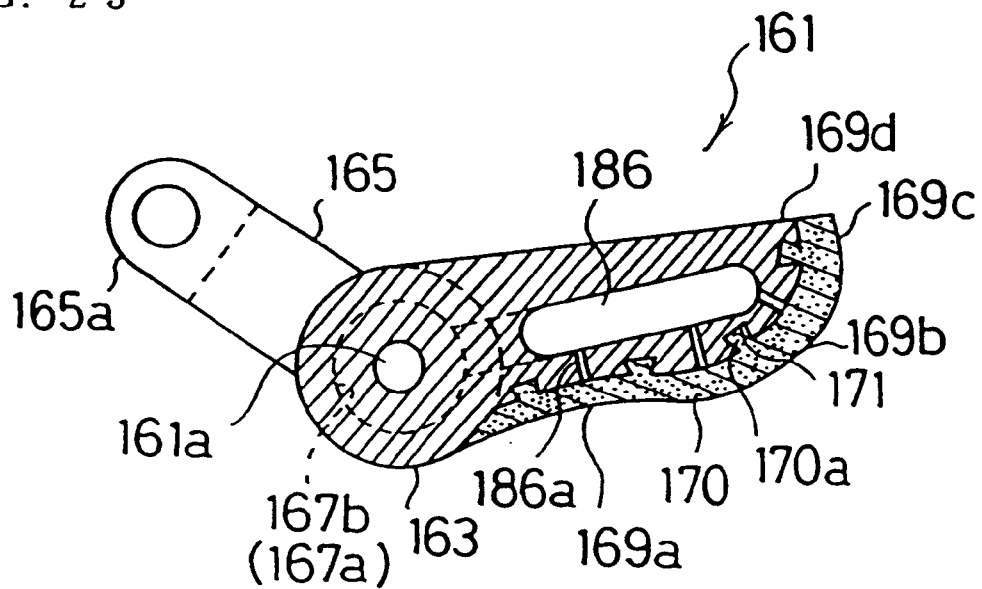

FIG. 23 is a cross sectional view at I—I line of FIG. 21.

Figure 24:
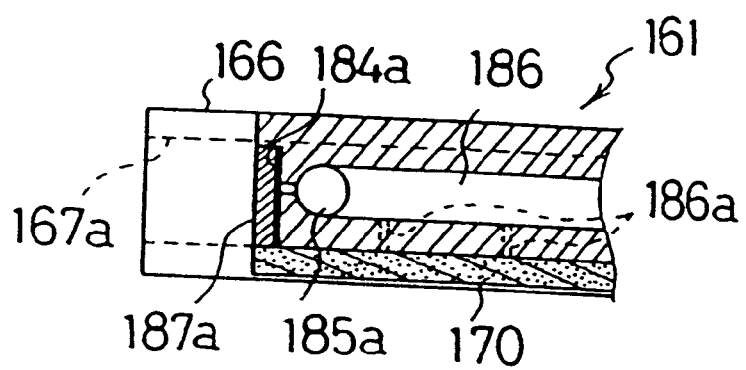

FIG. 24 is a cross sectional view at J—J line of FIG. 21.

Figure 25:
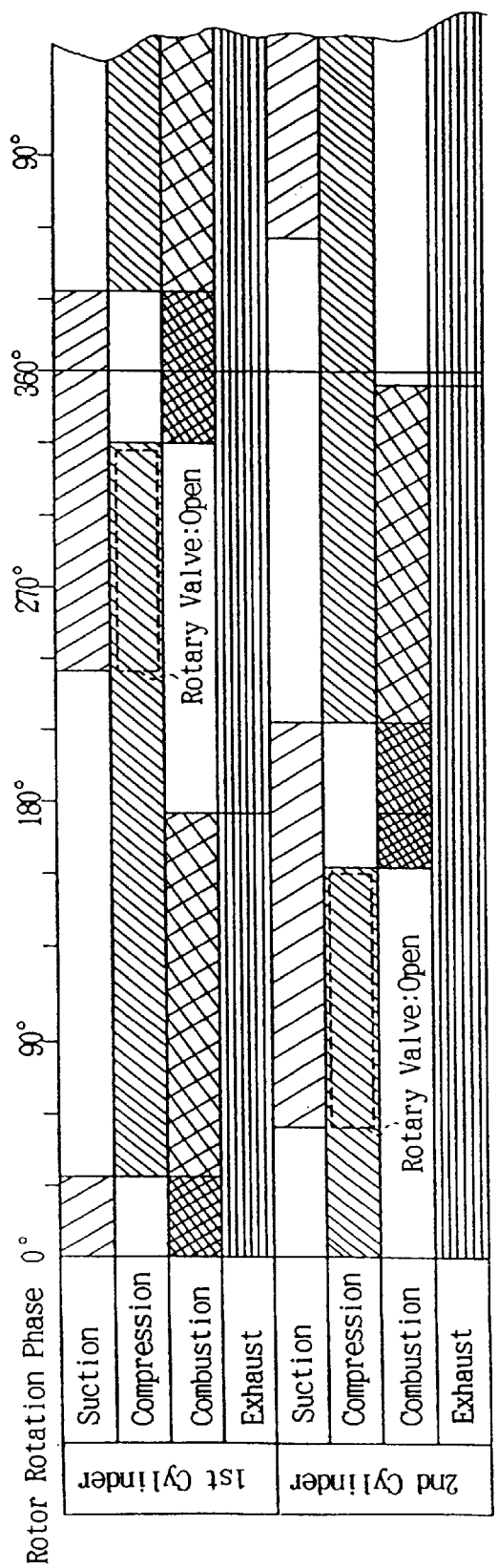

FIG. 25 is an explanatory time chart explaining strokes of suction, compression, combustion and exhaust in the engine.

Figure 26:
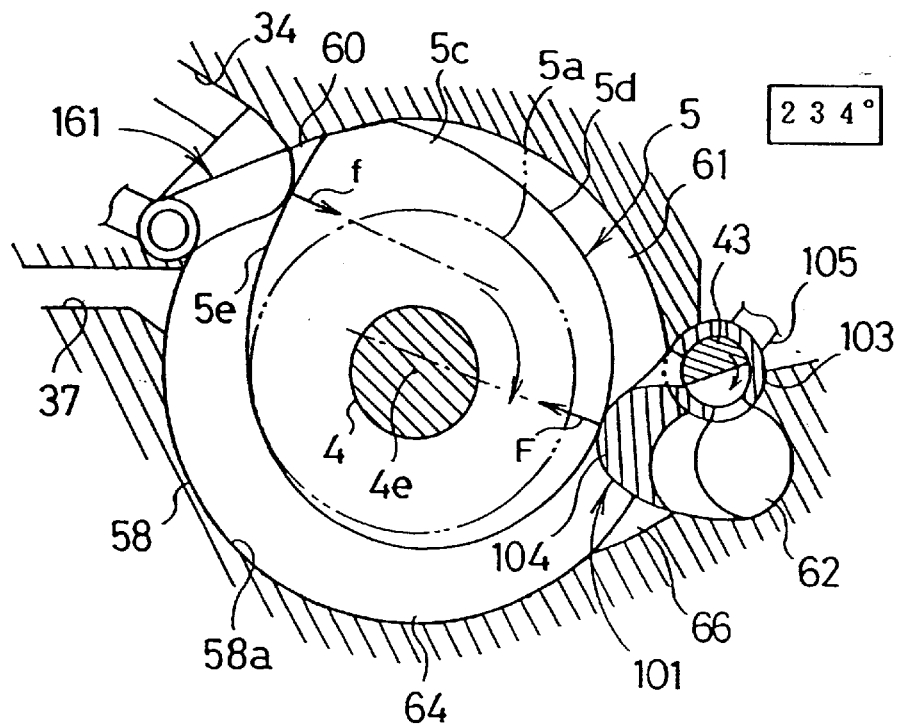

FIG. 26 is an explanatory sectional view showing the operative condition in rotor phase angle 234 degrees.

Figure 27:
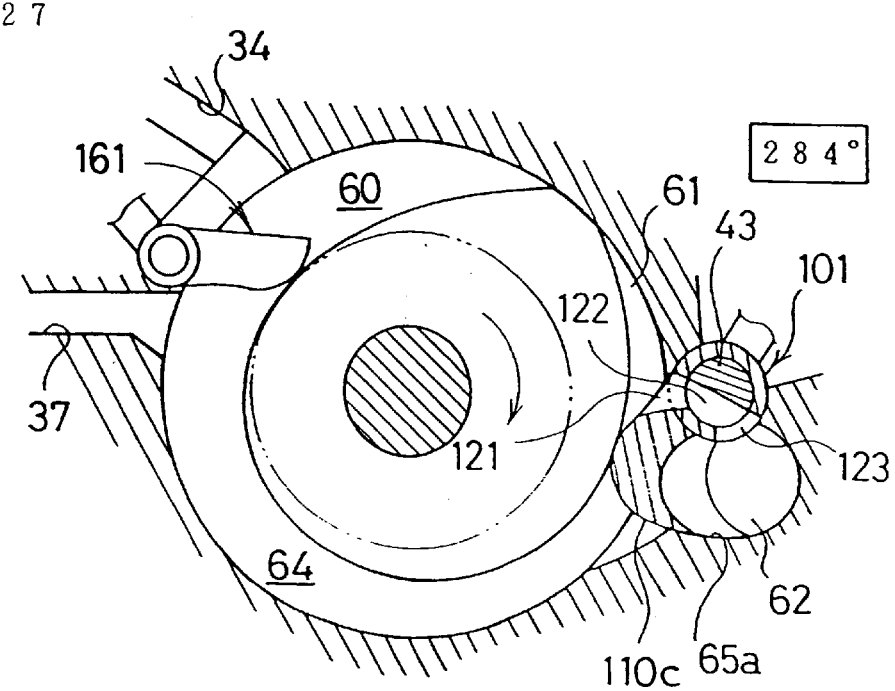

FIG. 27 is an explanatory sectional view showing the operative condition in rotor phase angle 284 degrees.

Figure 28:
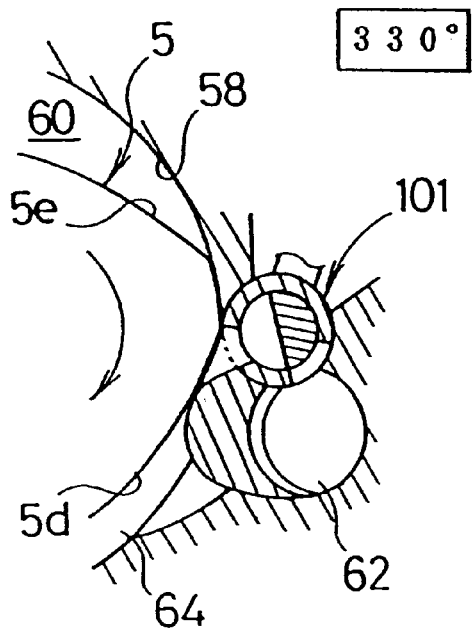

FIG. 28 is an explanatory sectional view showing the operative condition in rotor phase angle 330 degrees.

Figure 29:
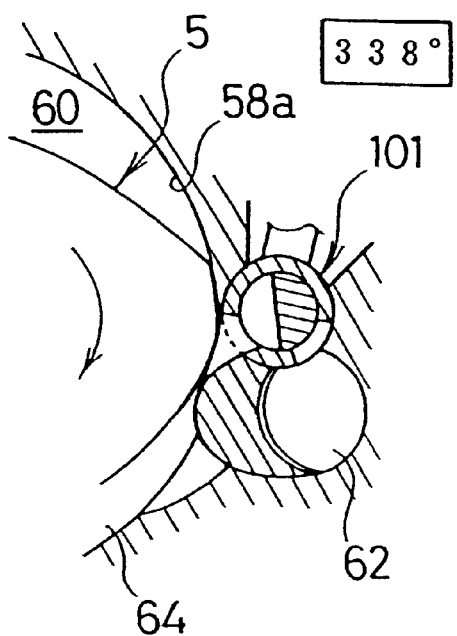

FIG. 29 is an explanatory sectional view showing the operative condition in rotor phase angle 338 degrees.

Figure 30:
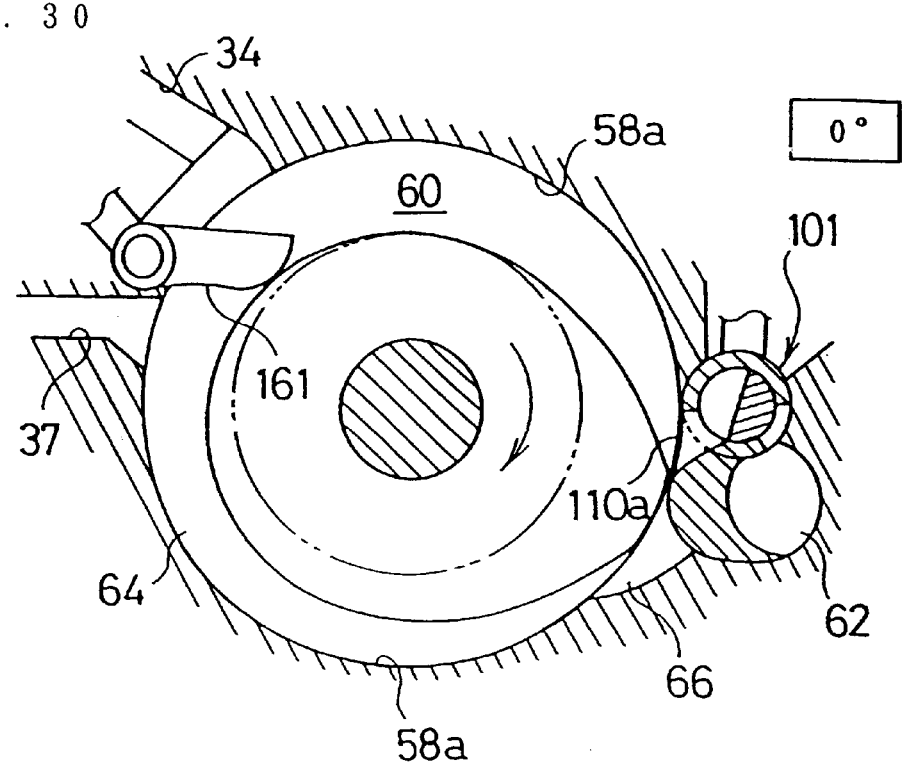

FIG. 30 is an explanatory sectional view showing the operative condition in rotor phase angle 0 degree.

Figure 31:
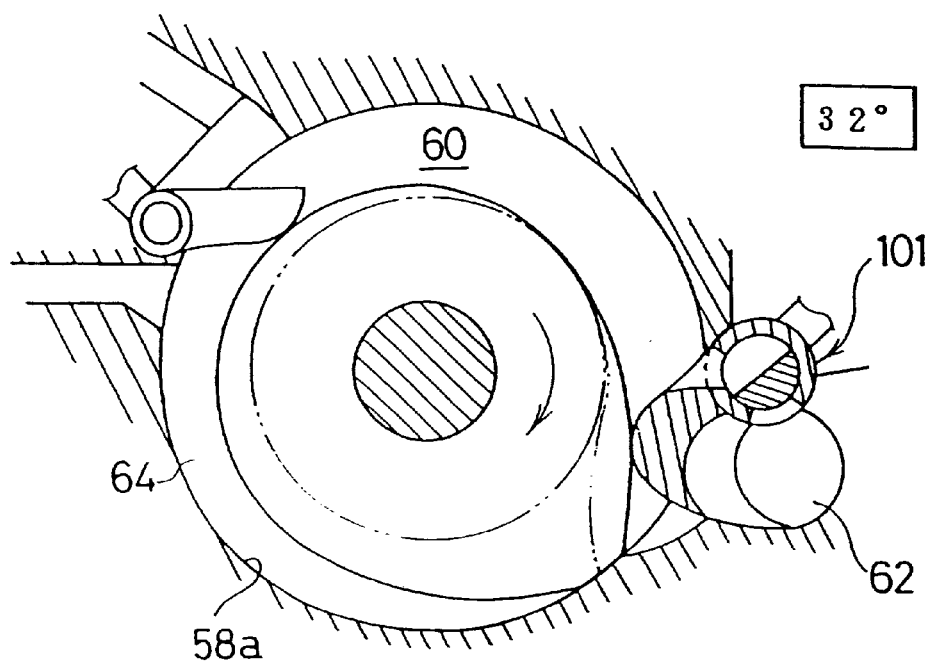

FIG. 31 is an explanatory sectional view showing the operative condition in rotor phase angle 32 degrees.

Figure 32:
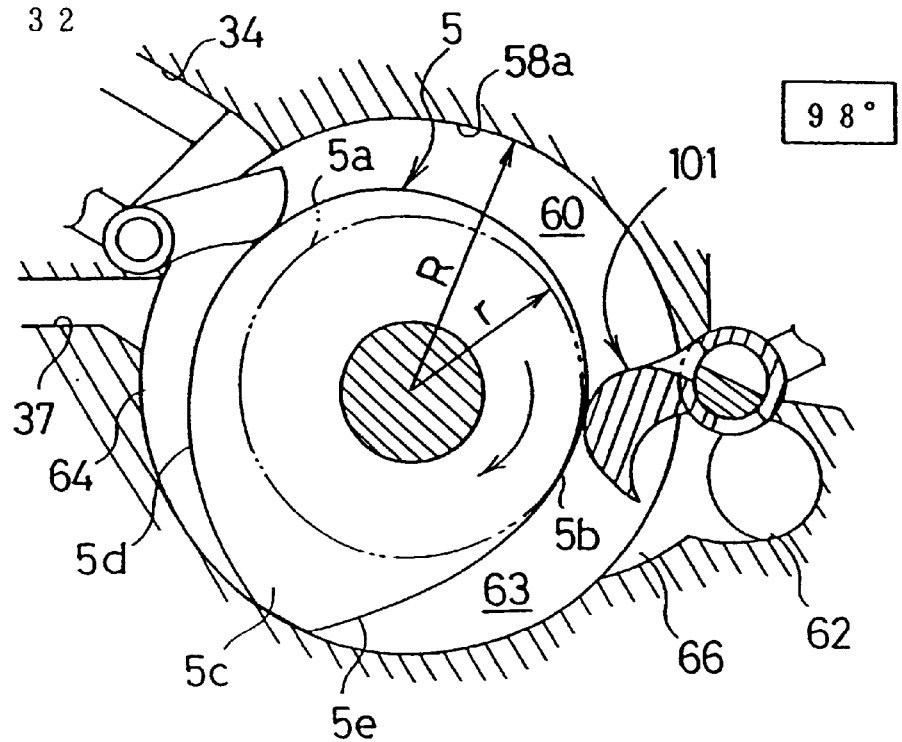

FIG. 32 is an explanatory sectional view showing the operative condition in rotor phase angle 98 degrees.

Figure 33:
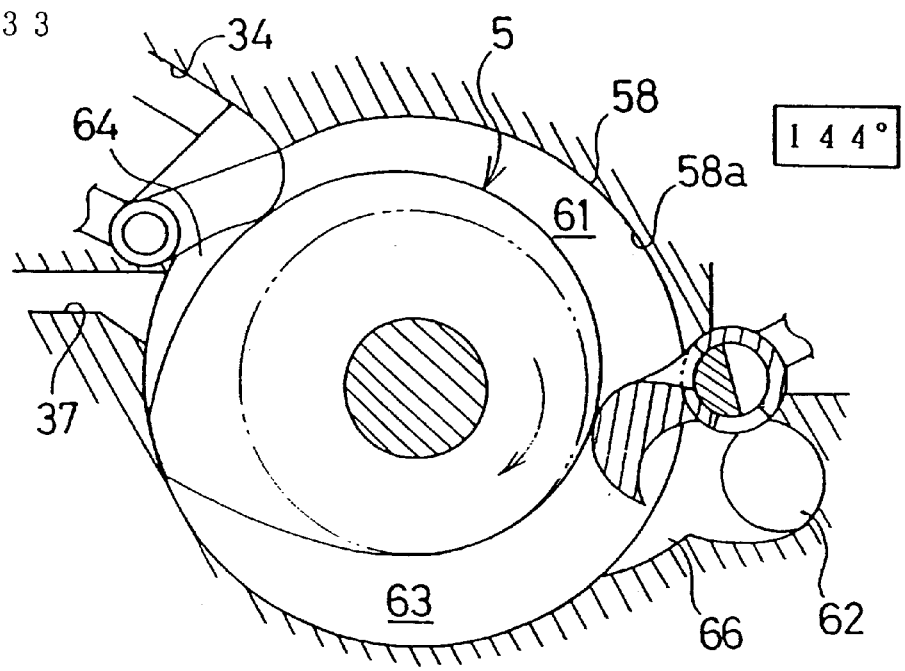

FIG. 33 is an explanatory sectional view showing the operative condition in rotor phase angle 144 degrees.

Figure 34:
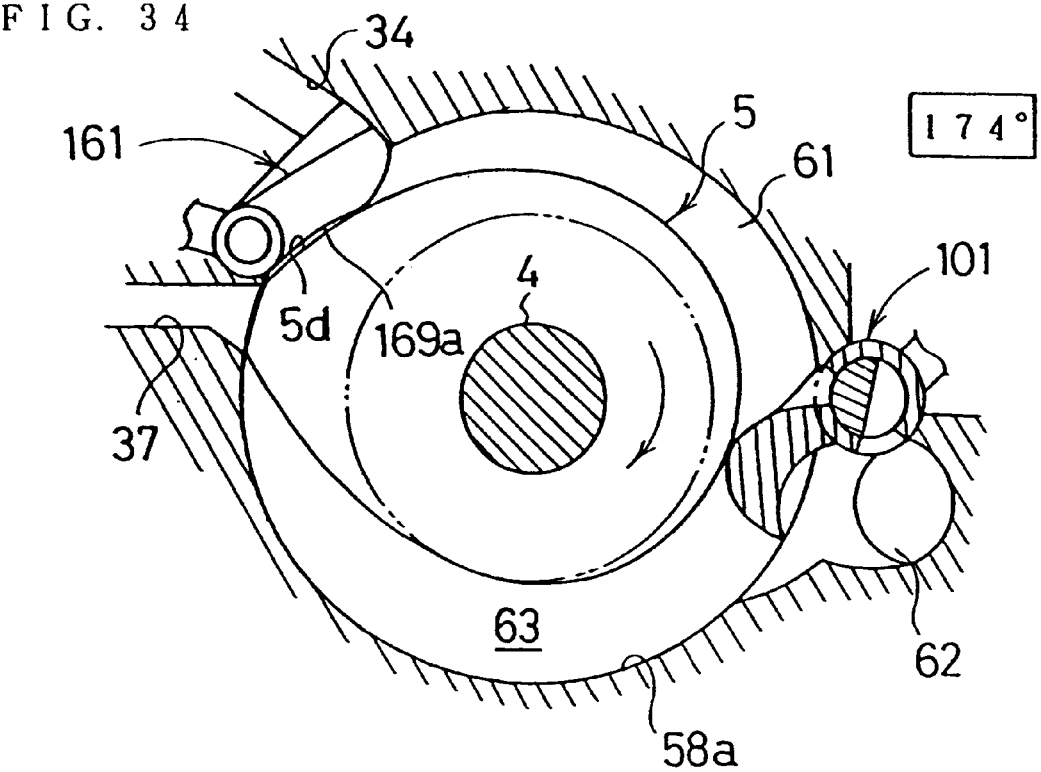

FIG. 34 is an explanatory sectional view showing the operative condition in rotor phase angle 174 degrees.

Figure 35:
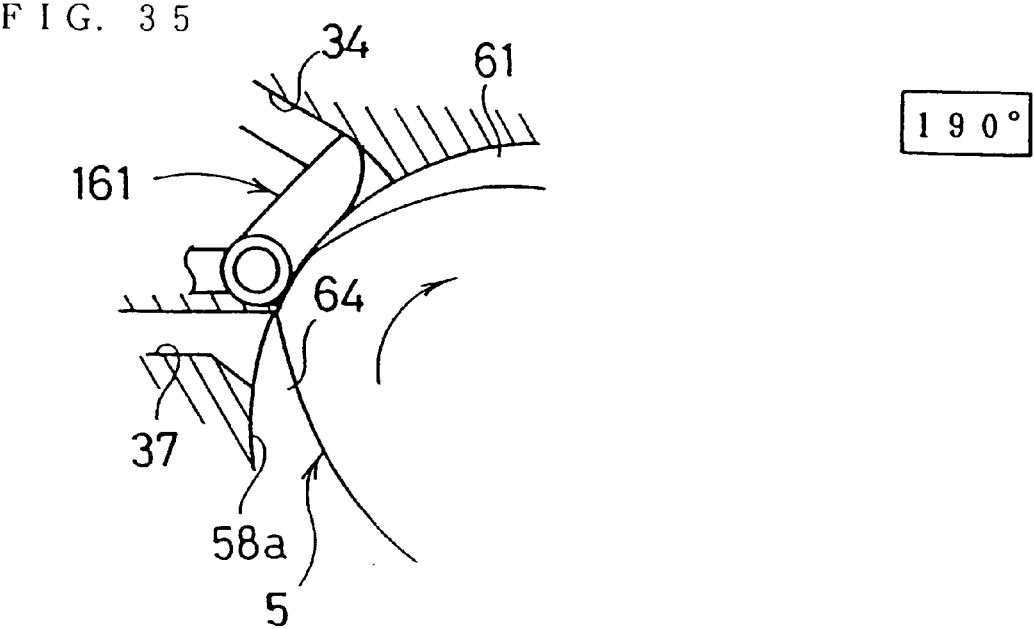

FIG. 35 is an explanatory sectional view showing the operative condition in rotor phase angle 190 degrees.

Figure 36:
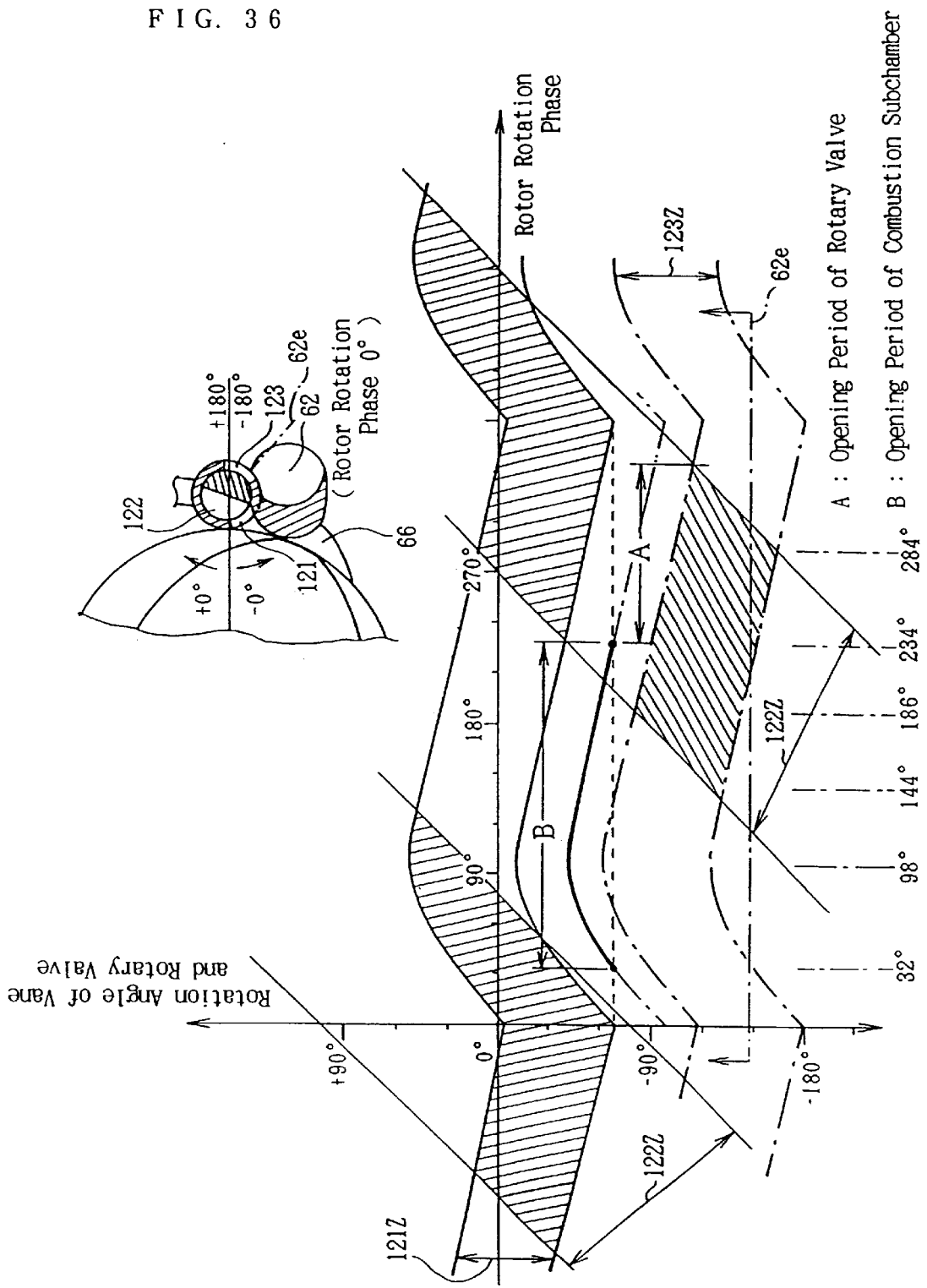

FIG. 36 is an explanatory time chart explaining a rotary valve opening period and a combustion subchamber opening period.

Figure 37:
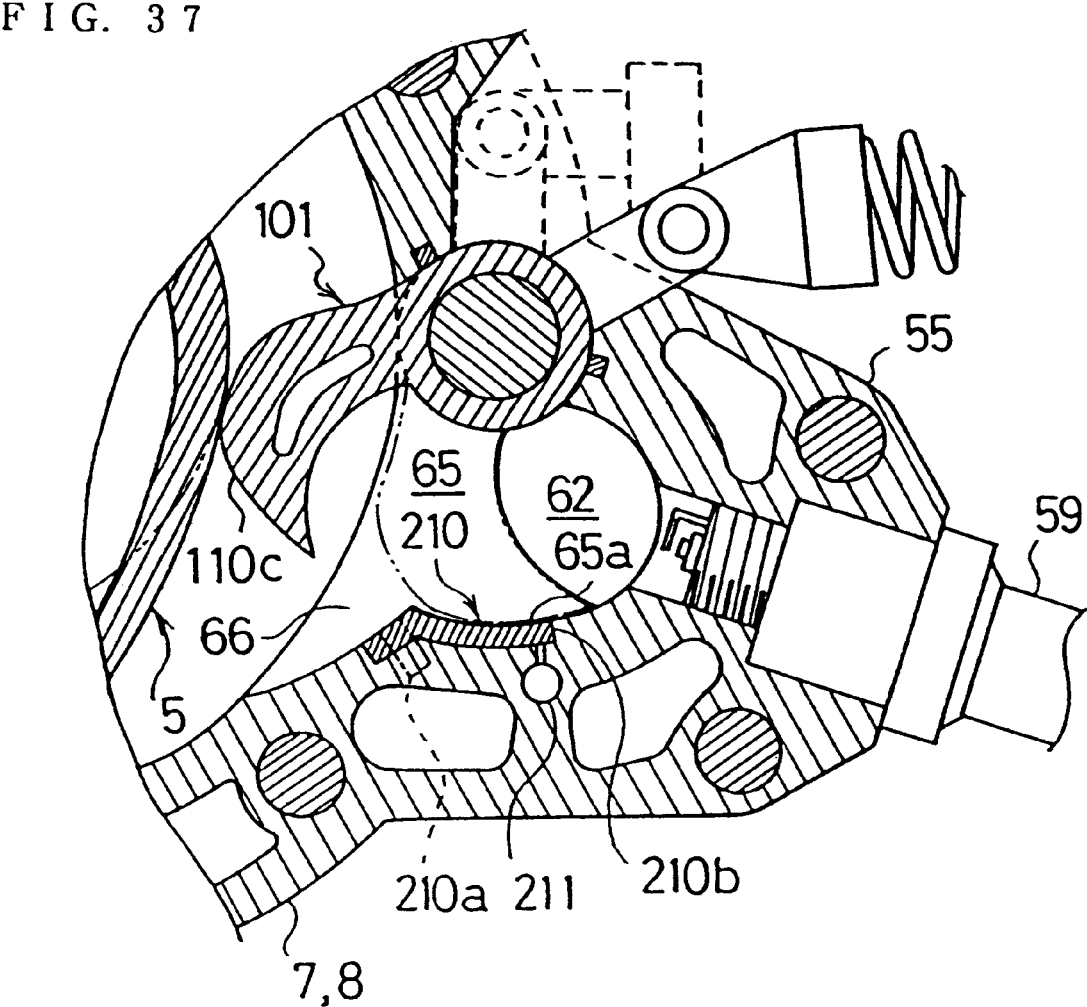

FIG. 37 is a vertically cross sectional front view of a modified configuration of the combustion subchamber and its adjacent portions.

Figure 38:
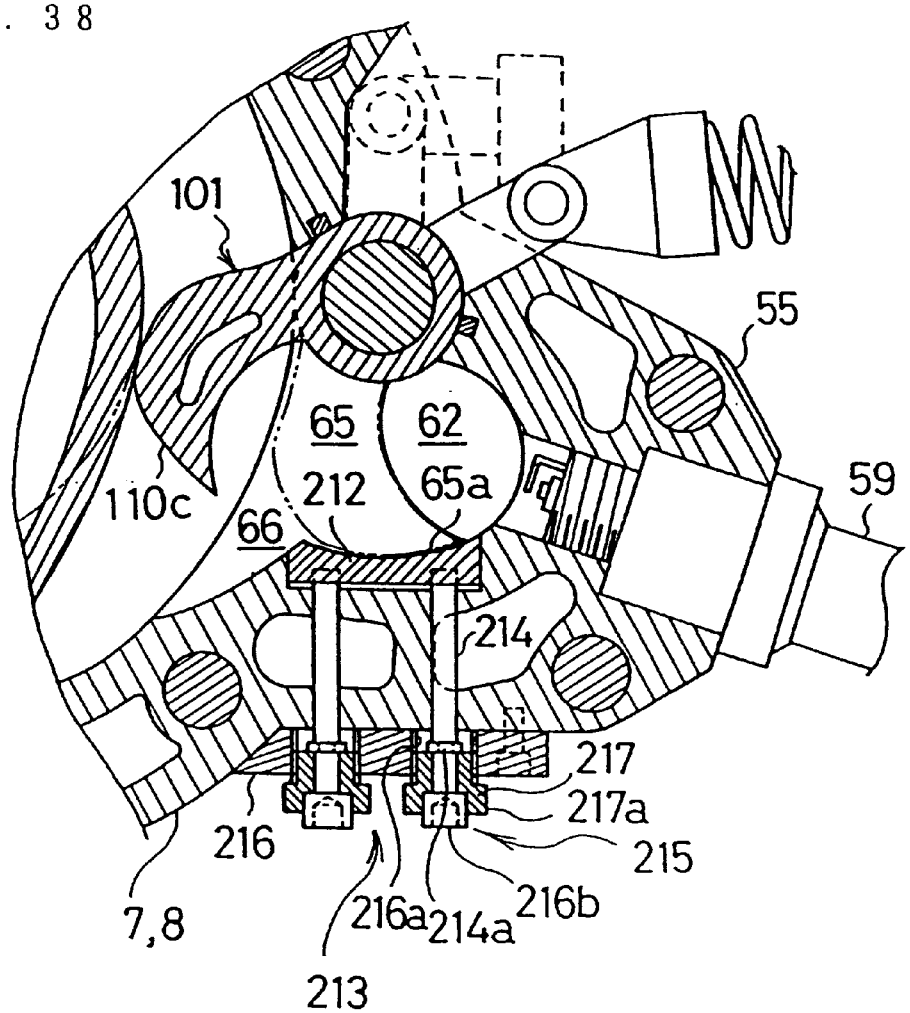

FIG. 38 is a vertically cross sectional front view of a modified configuration of the combustion subchamber and its adjacent portions.

Figure 39:
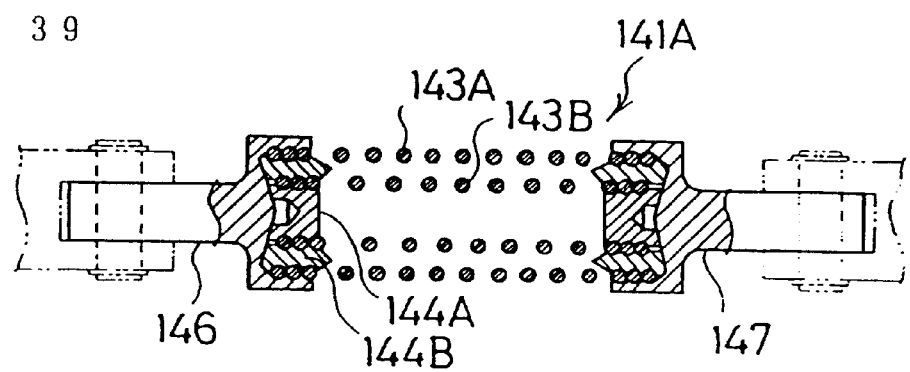

FIG. 39 is a cross sectional view of a modified spring unit.

Figure 40:
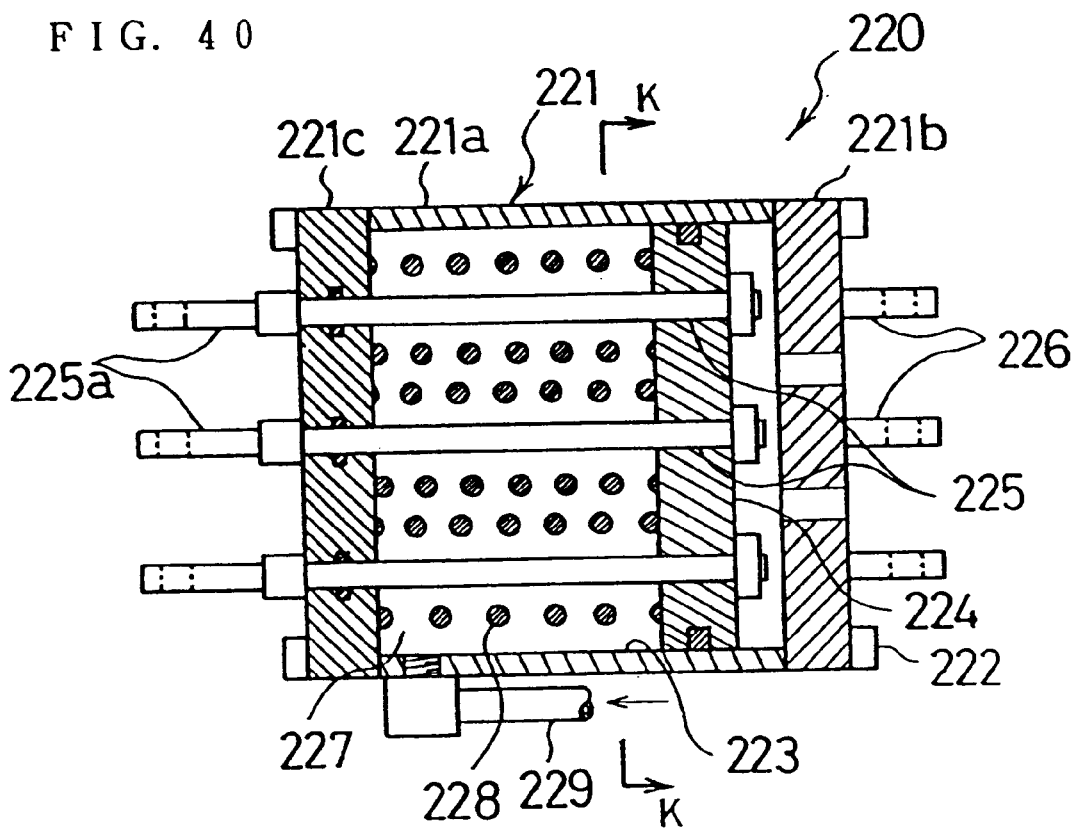

FIG. 40 is a cross sectional view of a modified biasing unit.

Figure 41:
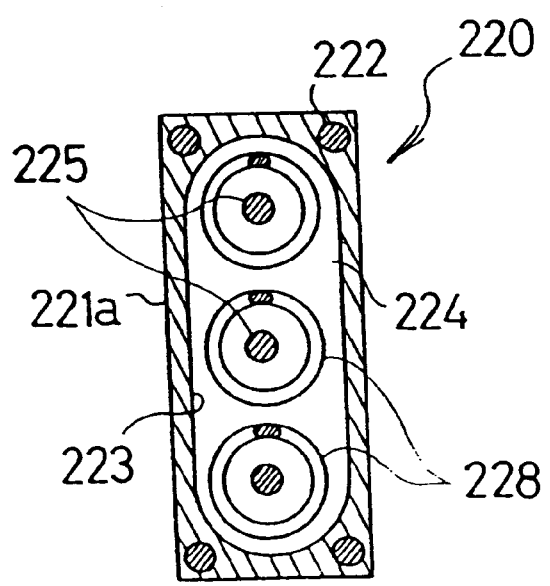

FIG. 41 is a cross sectional view at K—K line of FIG. 40.

Figure 42:
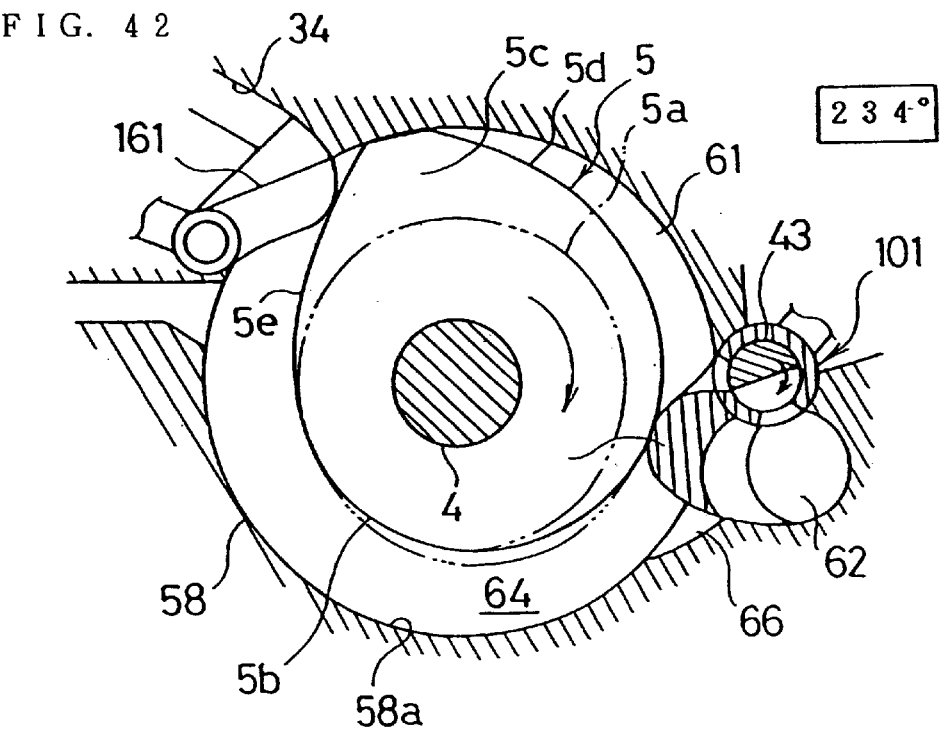

FIG. 42 is an explanatory sectional view showing the shape of a modified rotor (rotor phase angle 234 degrees).

Figure 43:
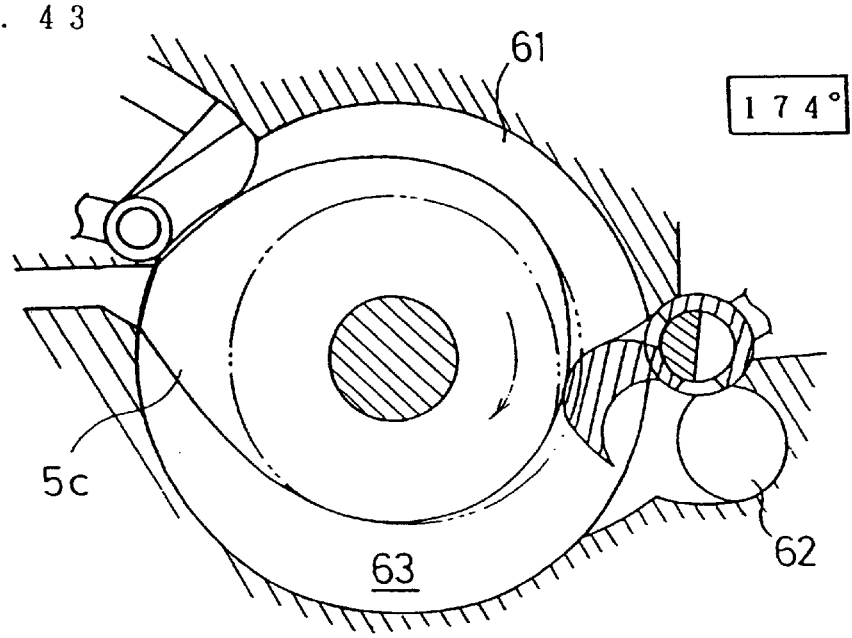

FIG. 43 is an explanatory sectional view showing the operative condition(rotor phase angle 174 degrees) including the rotor shown FIG. 42.

Figure 44:
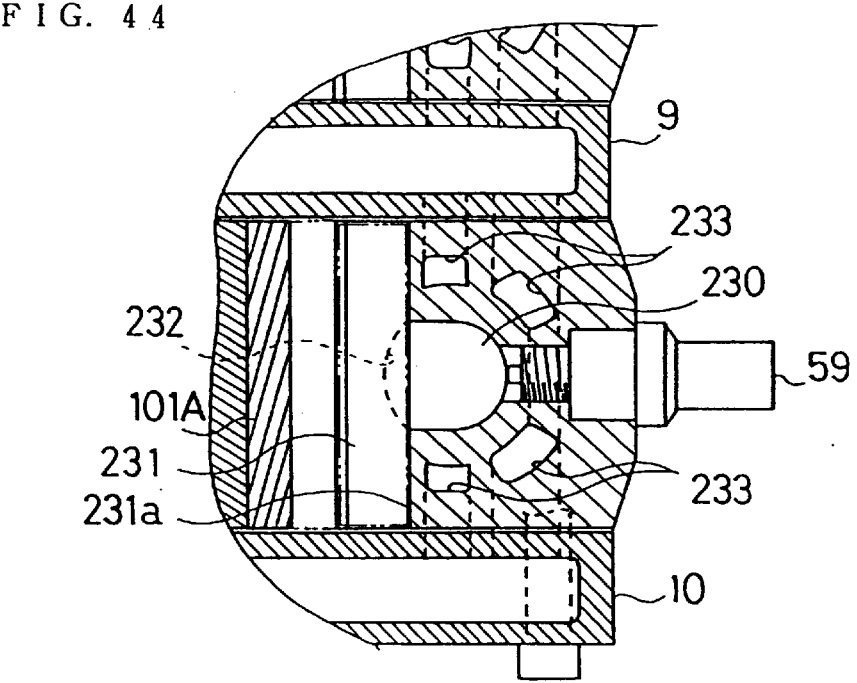

FIG. 44 is a cross sectional plan view of a modified configuration of the combustion subchamber and its adjacent portions.

Figure 45:
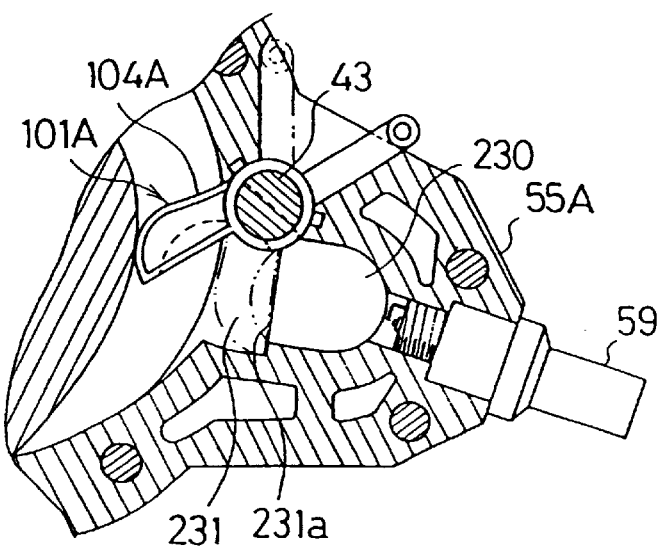

FIG. 45 is a vertically cross sectional view of the modified configuration of the combustion subchamber and its adjacent portions shown in FIG. 44.

Figure 46:
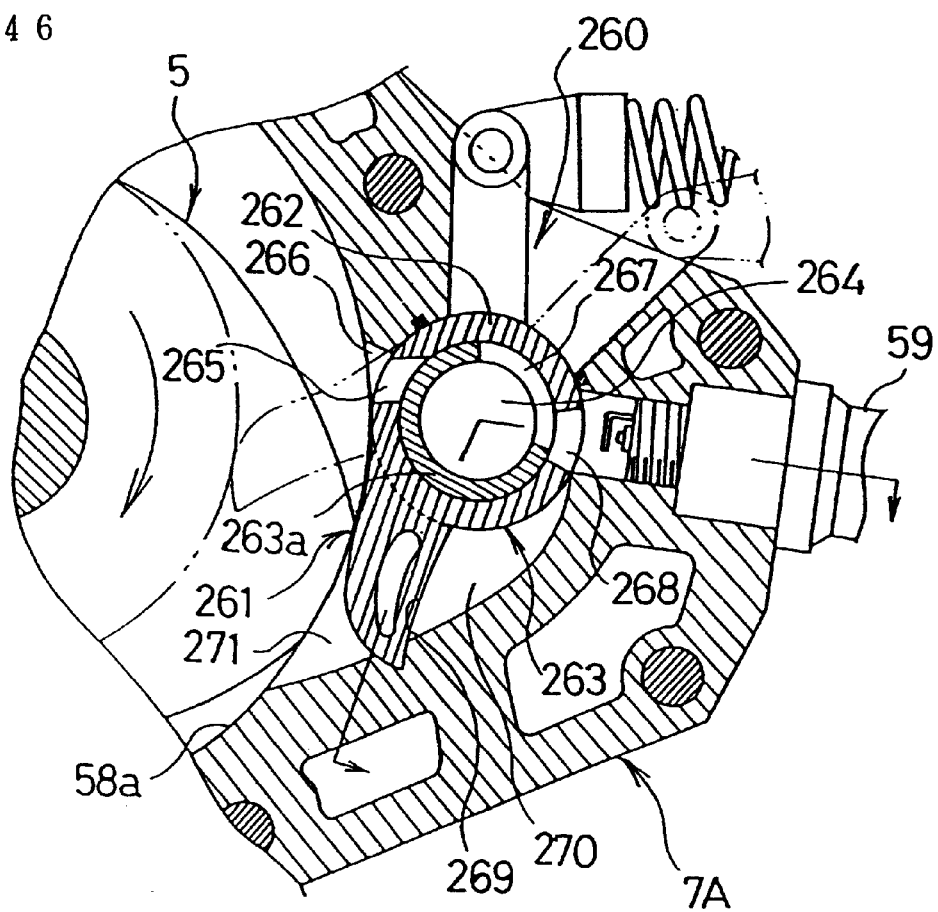

FIG. 46 is a vertically cross sectional view of another modified configuration of the combustion subchamber and its adjacent portions.

Figure 47:
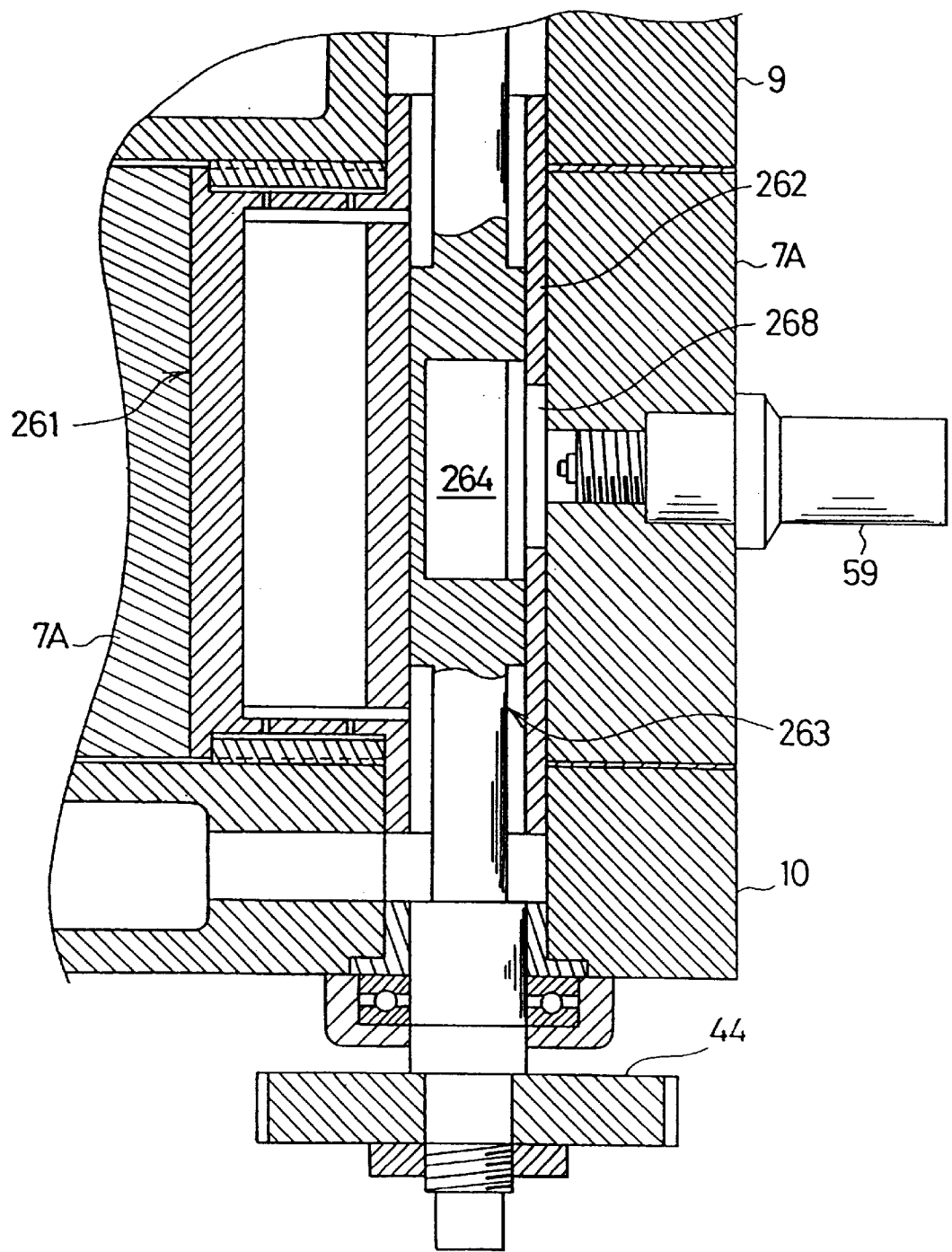

FIG. 47 is a cross sectional plan view of the modified configuration of the combustion subchamber and its adjacent portions shown in FIG. 46.

Figure 48:
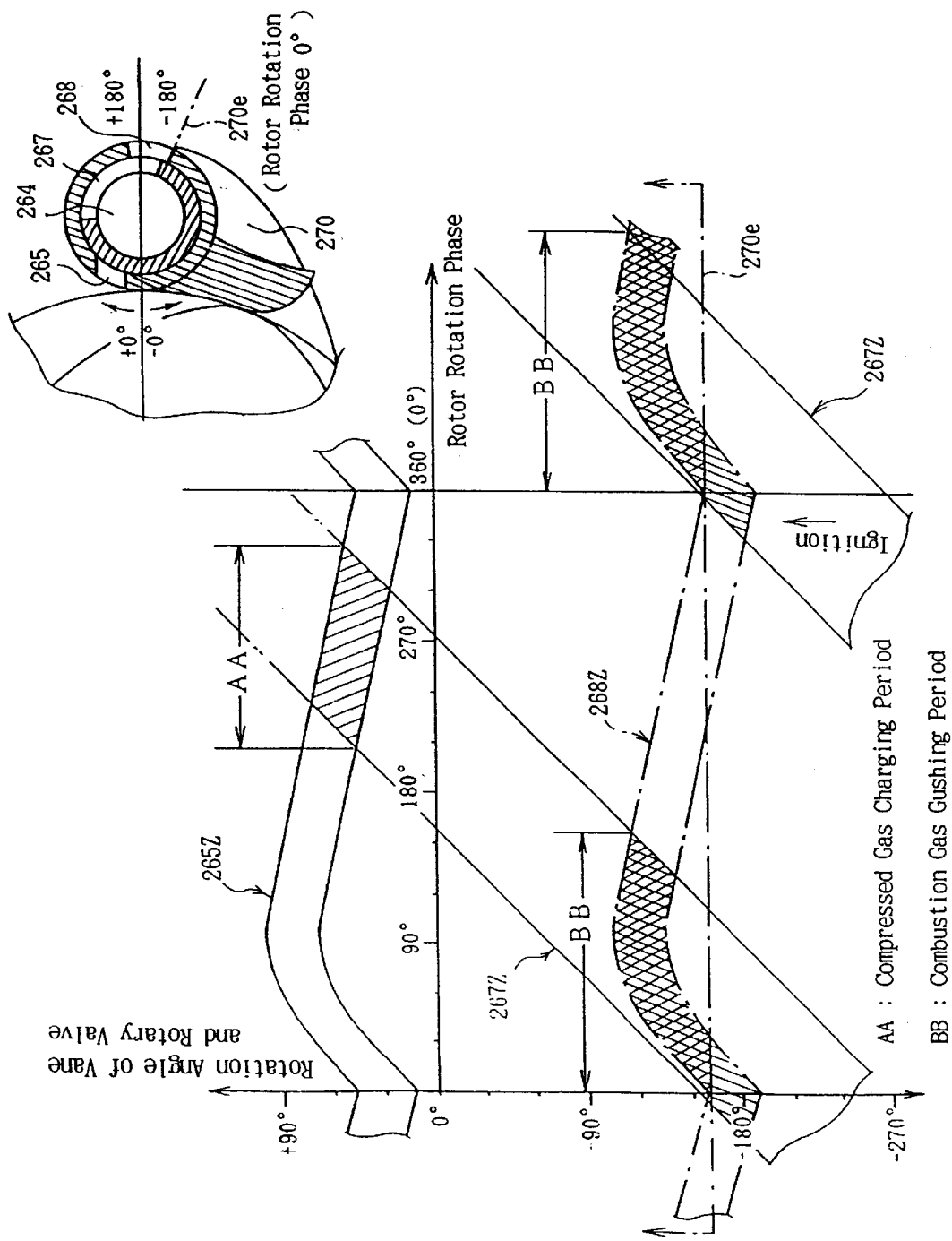

FIG. 48 is an explanatory time chart explaining a compressed gas charging period and a compressed gas gushing period in the modification shown in FIG. 46.

Figure 49:
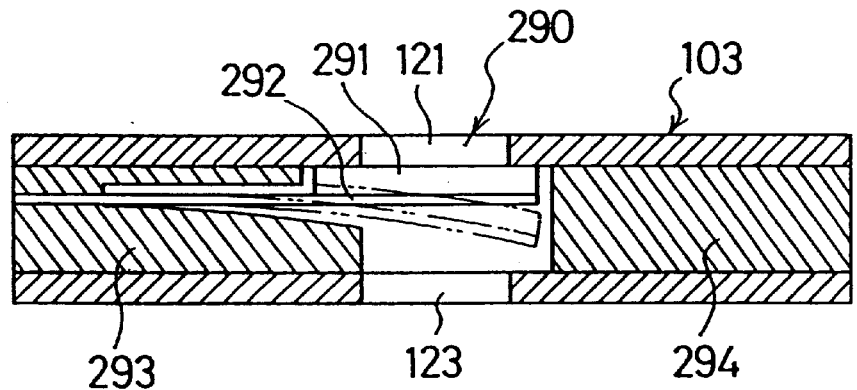

FIG. 49 is a cross sectional view of a modified check valve installed in the axial portion of the first swinging vane.

14

Figure 50:
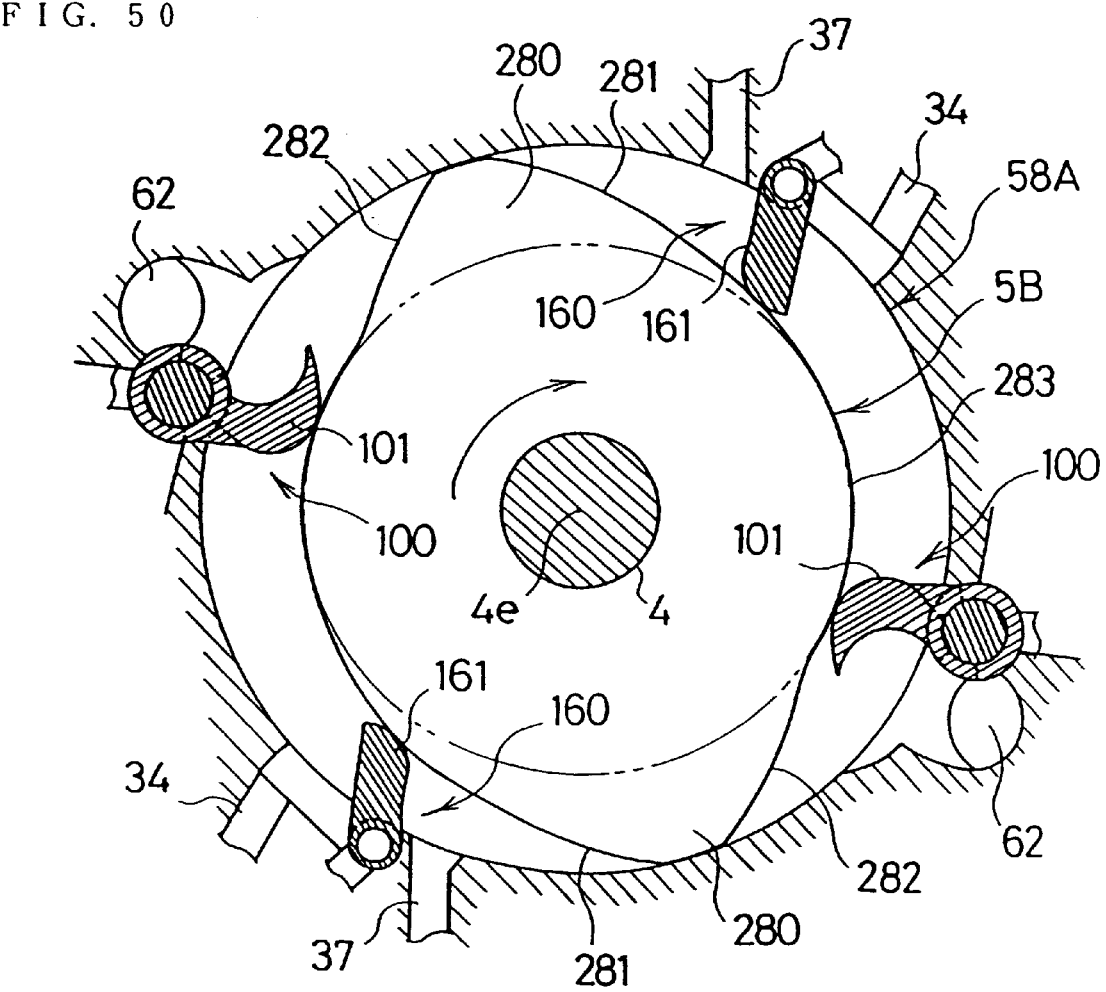
Figure 51:
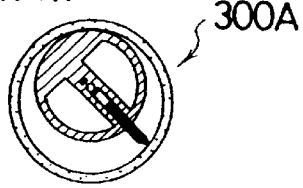
Figure 52:
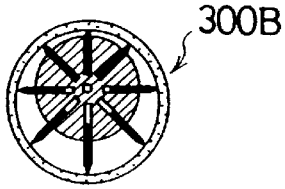
Figure 53:
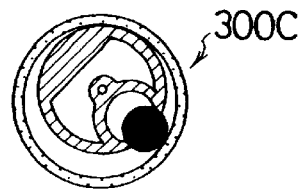
Figure 54:
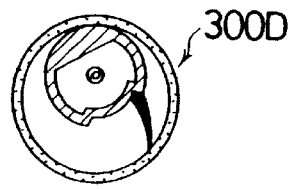
Figure 55:
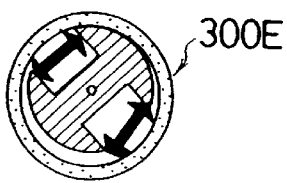
Figure 56:
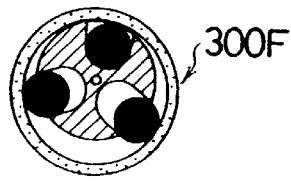

FIG. 50 is a vertically cross sectional front view of the main configuration of a modified rotary piston type engine.

FIGS. 51–56 are cross sectional views of six kinds of rotary piston type engines in the prior art.

Figure 57:
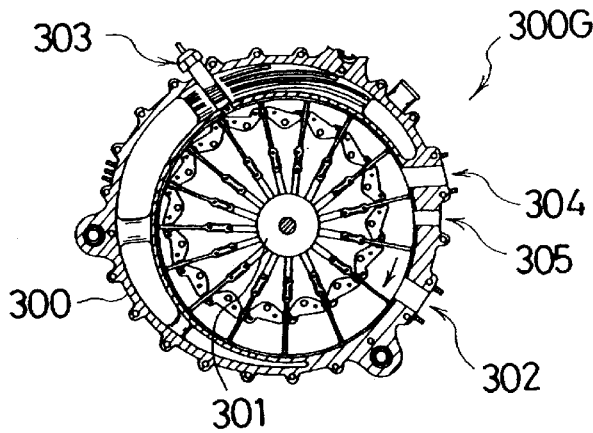

FIG. 57 is a cross sectional view of another rotary piston type engine in the prior art.

Figure 58:
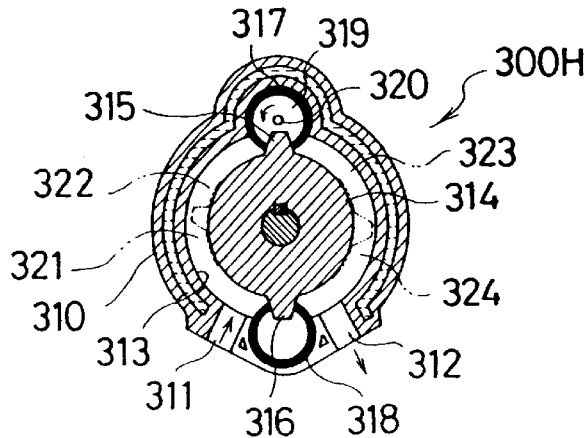

FIG. 58 is a cross sectional view of the other rotary piston type engine in the prior art.

DETAILED DESCRIPTION OF THE DRAWINGS

The following description of a preferred embodiment of a rotary piston type internal combustion engine according to the present invention is only one example of an application of the present invention, in this case a two cylinder type engine to be mounted on a vehicle. First, brief descriptions will be given on general construction of this rotary piston type internal combustion engine 1 (hereinafter, referred to as "engine").

Figure 1:
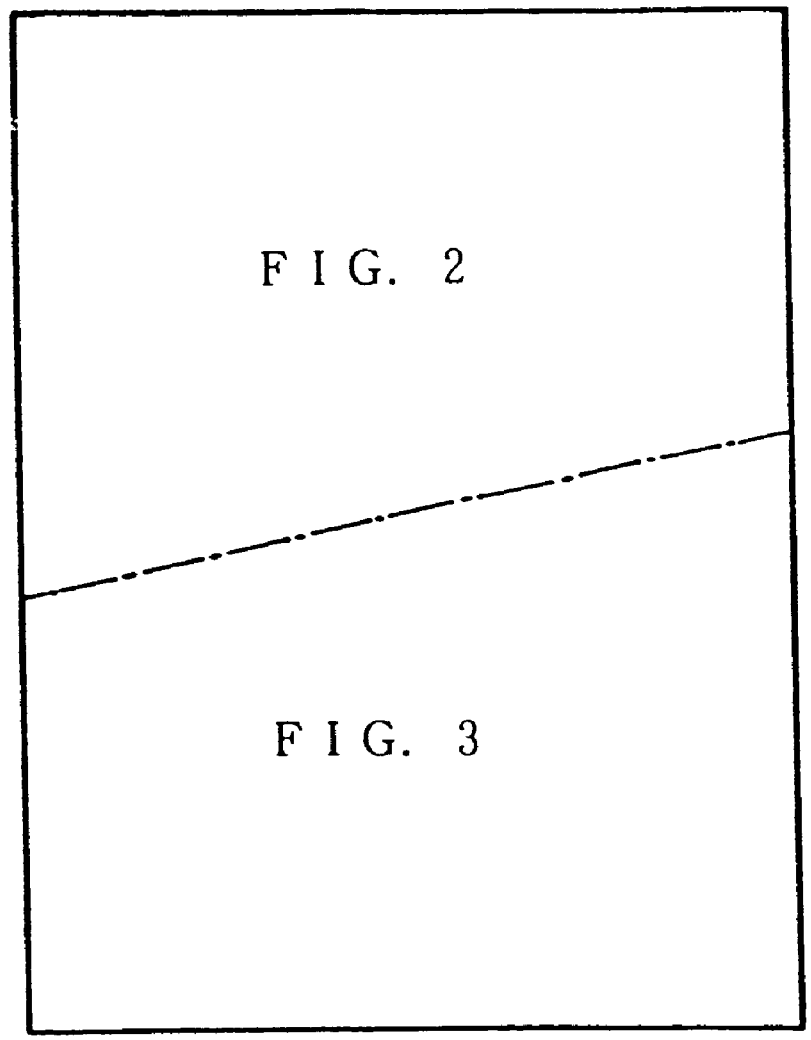
FIG. 1 is an explanatory drawing showing an arrangement connecting FIG. 2 and FIG. 3.
Figure 2:
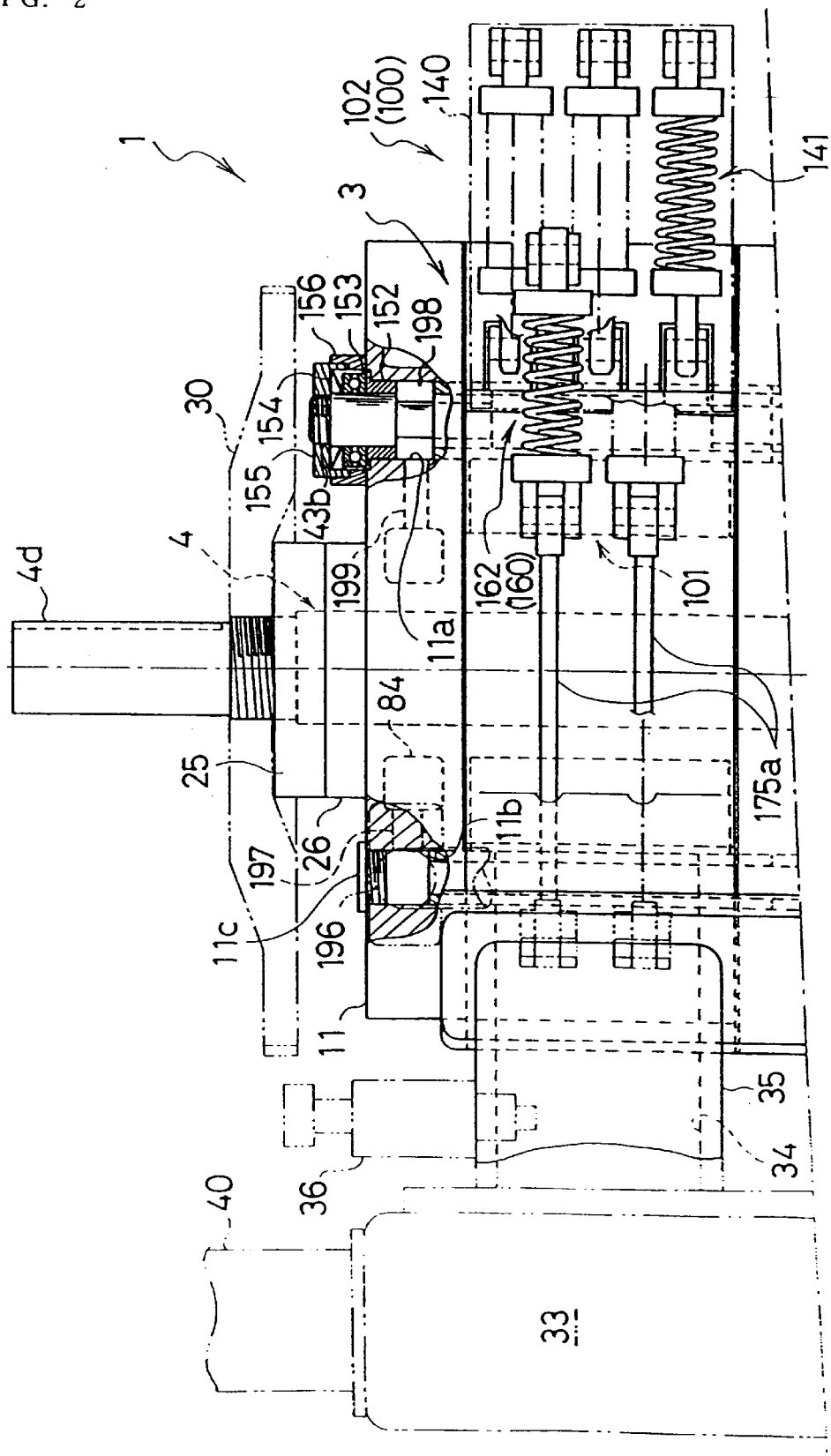
FIG. 2 is a plan view of the rear portion of a rotary piston type engine according to an embodiment of the present invention.
Figure 3:
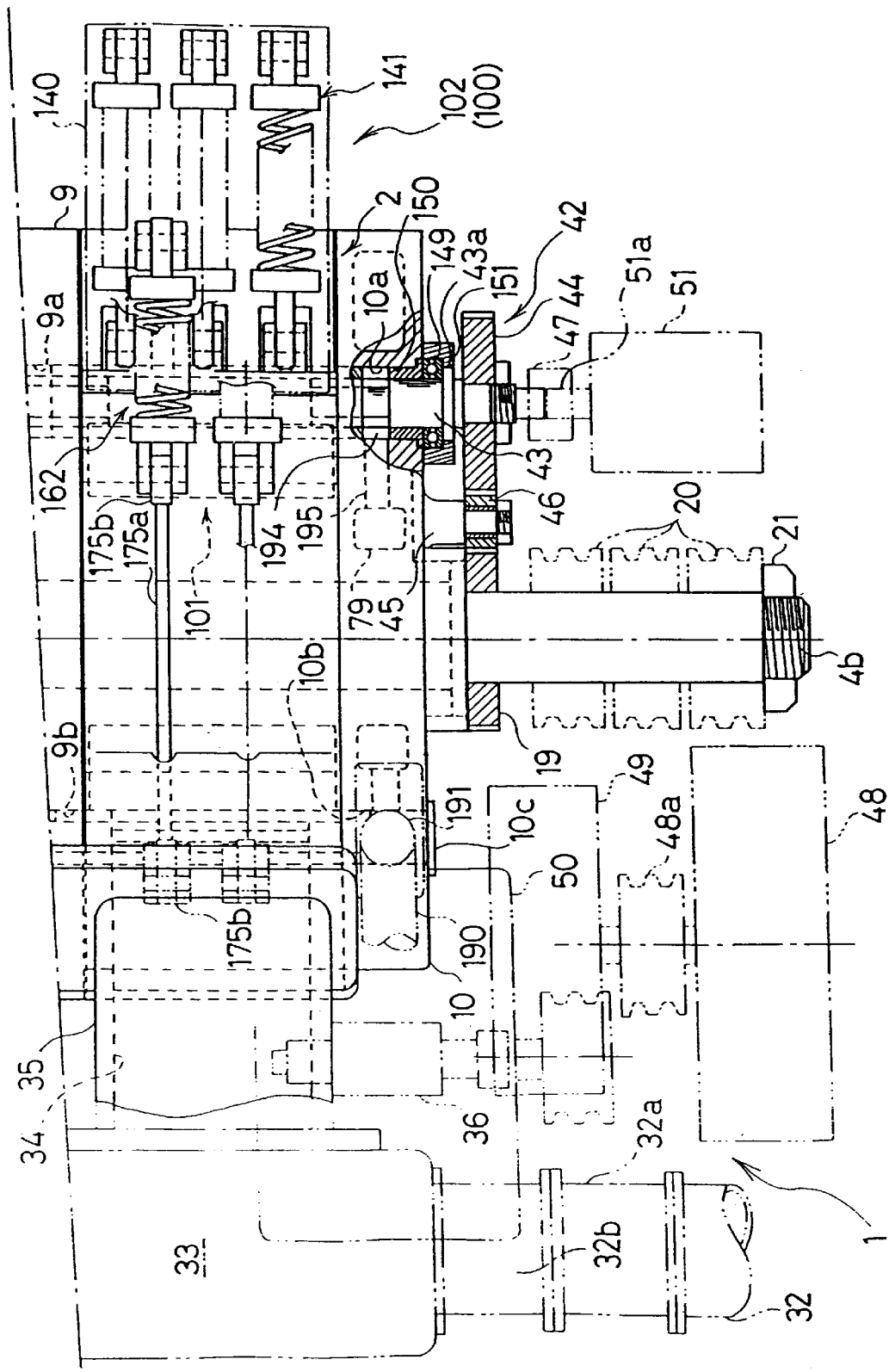
FIG. 3 is a plan view of the front portion of the rotary piston type engine shown in FIG. 2.
Figure 4:
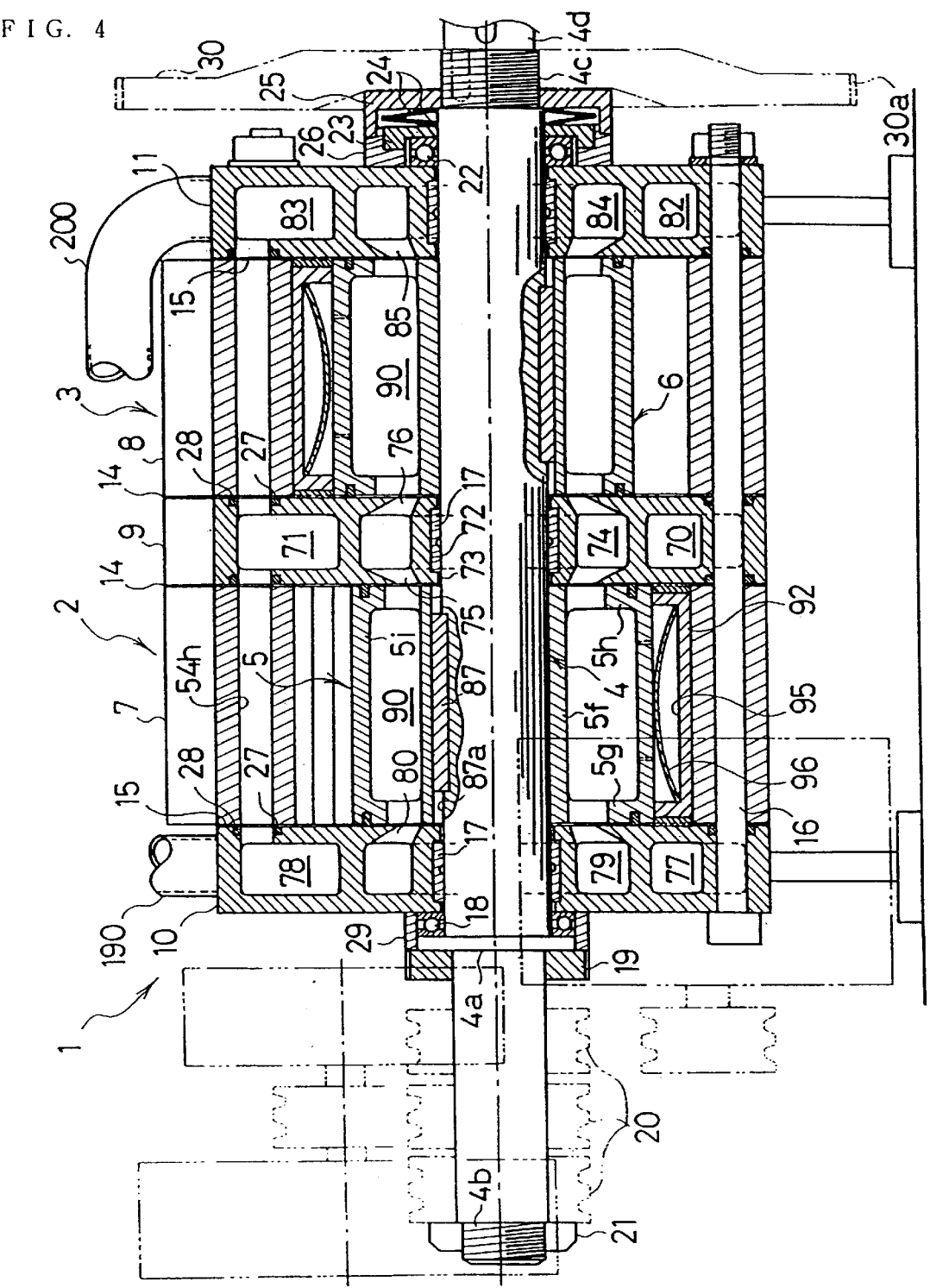
FIG. 4 is a vertically cross sectional side view of the engine shown in FIG. 2 and FIG. 3.

As shown in FIGS. 2–4, the engine 1 comprises an engine main body, an intake system, a fuel system, an exhaust system, auxiliary devices, etc. The engine main body includes a continuous main shaft 4 (output shaft) common to a first cylinder 2 on the front side and a second cylinder 3 on the rear side, a rotor 5 held in first cylinder 2 and fixed on the main shaft 4 penetrating rotor 5, a rotor 6 held in second cylinder 3 and fixed on main shaft 4 penetrating rotor 6 and being offset by 180 degrees in phase angle from rotor 5, rotor housings 7,8 surrounding these rotor 5,6 respectively, an intermediate side housing 9 (hereinafter, referred to as "intermediate housing") partitioning between rotor housings 7,8, side housings 10,11 covering both opposite ends of rotor housings 7,8, various internal mechanisms provided inside, etc.

As shown in FIGS. 2–4, metal touch portions between housings 7–11 are provided with very thin metal gaskets 14, but these gaskets 14 may be omitted if the machining precision of the housings 7–11 is high enough. These housings 7–11 are connected with one another by ten tie bolts 16 penetrating their outer circumferential portions, and these housings 7–11 are positioned to keep predetermined fixed positions. Between these housings 7–11 and the main shaft 4, metal bearings 17 are provided respectively so that main shaft 4 is supported rotatably. However, needle bearing or ball bearing may be applied in place of metal bearings 17. On the front portion of main shaft 4, a thrust bearing 18 between a flange portion 4a of main shaft 4 and housing 10, and an annular member 29, are each mounted. On the front end portion of main shaft 4, a valve drive gear 19 for a rotary valve 124 (described below) and three pulleys 20 are each fitted, and the front end of main shaft 4 has a screw portion 4b. On the rear portion of main shaft 4, a thrust bearing 22, a bearing holding member 23, two strong coned disk springs 24 and a nut 25 are each mounted. By screwing nut 25 onto screw portion 4c, coned disk springs 24 are deformed elastically, thereby thrust bearing 22 is held by the bearing holding member 23. Accordingly, the difference between thermal expansion of housings 7–11 and that of main shaft 4 can be absorbed via elastic deformation of coned disk springs 24. An annular member 26 is disposed around thrust bearing 22. On screw portion 4c, a fly wheel 30 restrained so as not to rotate relatively to main shaft 4 is screwed on. The outer circumferential surface of fly wheel 30 has gears 30a for engaging with a pinion 31a of a starter 31. The rear end portion of main shaft 4 has output shaft portion 4d for connecting to a member to be driven by engine 1.

Figure 5:
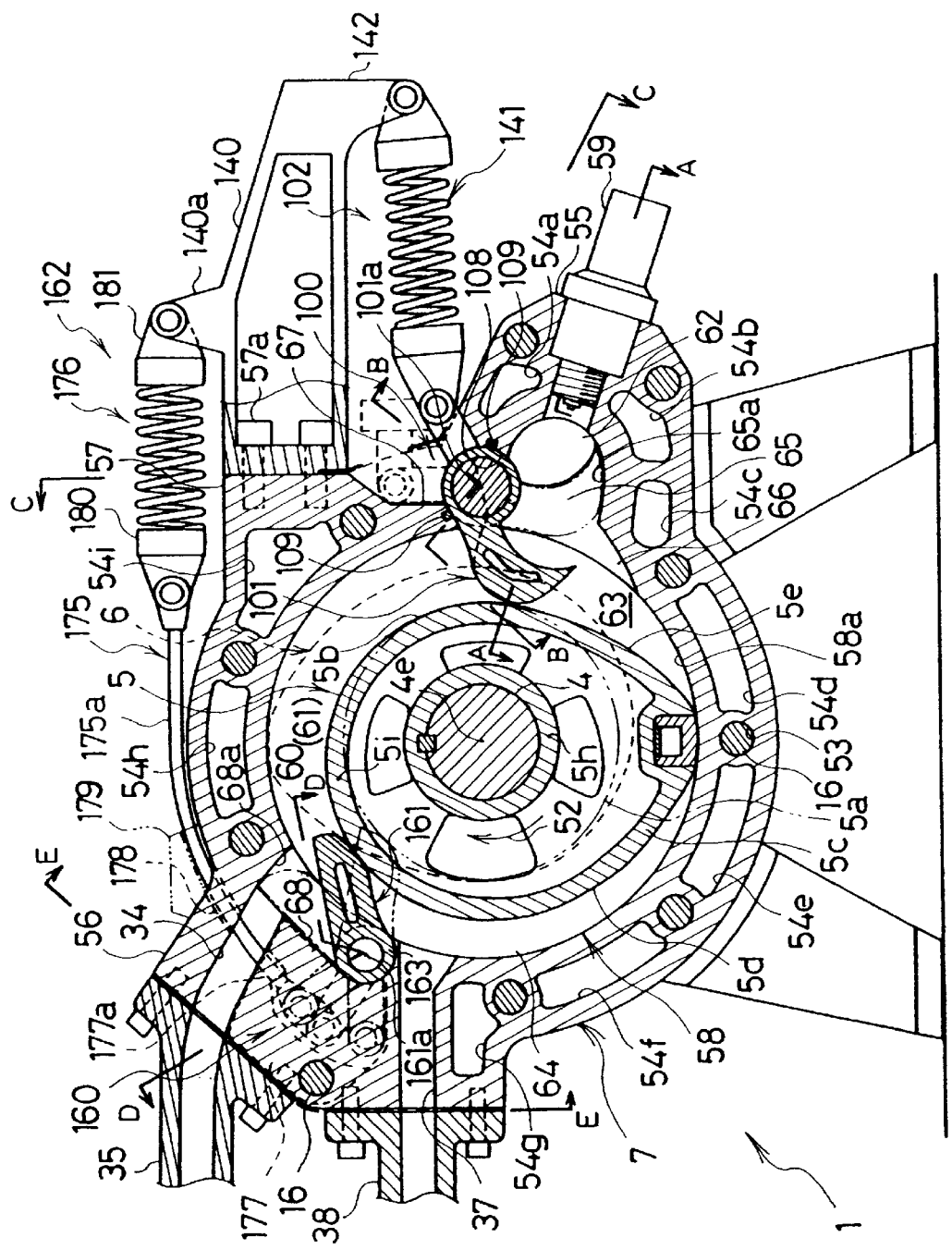
FIG. 5 is a vertically cross sectional front view of the engine shown in FIG. 2 and FIG. 3.

In the intake system, an intake pipe 32 extending from an air cleaner (not shown) has a air flow-meter unit 32a, a throttle valve unit 32*b* and a surge tank 33. As shown in FIGS. 2, 3, 5, rotor housings 7,8 are each provided with an intake port 34. Each intake branch pipe 35 connected to corresponding intake port 34 is connected to the right side surface of surge tank 33. In this way, air is supplied to cylinders 2,3 respectively through each intake branch pipe 35.

In the exhaust system, rotor housings 7,8 are each provided with an exhaust port 37 positioned near intake port 34 on the trailing side in the direction of rotor rotation (direction of an arrow 52 in FIG. 5). Each exhaust branch pipe 38 connected to corresponding exhaust port 37 is connected to an exhaust tank 39 positioned below surge tank 33. Exhaust tank 39 is connected to an exhaust pipe 40 having a catalytic converter and a muffler (not shown). In this way, combustion exhaust gas is expelled from cylinders 2,3 respectively, through exhaust branch pipe 38 and exhaust pipe 40. However, exhaust tank 39 may be omitted.

With regard to various auxiliary devices, these auxiliary devices include a valve driving mechanism 42, a cooling water pump 48, a radiator and fan (not shown), an oil pump 49, a starter 31, an alternator 50, a distributer 51, a fuel pump (not shown), etc. Furthermore, although not shown, a control unit for controlling engine 1, plural sensors and plural switches, are each provided. With the exception of valve driving mechanism 42, these auxiliary devices are not characteristic configurations of the present invention, hence these are shown roughly only for reference without showing supporting structures. Their sizes, constructions and driving systems may be altered according to given specifications.

In valve driving mechanism 42, a valve shaft 43 made of an axial member penetrates housings 7–11, and a driven gear 44 with the same diameter as a drive gear 19, is fitted on the front end portion of valve shaft 43 on the front of side housing 10. On support portion 45 of side housing 10, an intermediate gear 46 via a shaft and a bearing is provided, which enables driven gear 44 to be rotated by drive gear 19 via intermediate gear 46, in the same direction and with the same rotation speed as in main shaft 4. These gears 19,44,46 may be made up of spur gears or helical gears. In each of cylinders 2,3 of engine 1, an ignition is made for each revolution of main shaft 4, and therefore driving shaft 51*a* of distributer 51 is connected to valve shaft 43 by a coupling 47. Alternator 50 is driven by pulley 20 on main shaft 4 via a belt, and starter 31 is positioned at the lower left side under the rear end portion of engine main body. Cooling water pump 48 and oil pump 49 are interconnected to common pulley 48*a* driven by pulley 20 on main shaft 4 via a belt. Cool water from cooling water pump 48 is applied for cooling the engine main body. Pressurized oil from oil pump 49 is applied for lubrication, cooling and sealing of several frictional contact portions in engine main body. However, a unit including cooling water pump 48 and oil pump 49 may be mounted onto main shaft 4 coaxially, or either one of them may be mounted onto main shaft 4 coaxially.

Each intake branch pipe 35 has fuel injector 36 for injecting fuel (gasoline in this embodiment) into the pipe, and fuel pump (not shown) for feeding pressurized fuel to these injectors 36 is driven by pulley 20 on main shaft 4 via a belt. First and second cylinders 2,3 are of basically the same construction except that the phase angles of rotors 5,6 differ by 180 degrees, hence detailed descriptions will be given of the construction of only first cylinder 2.

Referring to FIGS. 4 and 5, rotor housing 7 is made of ductile cast iron or aluminum alloy, but rotor housing 7 may be made of heat resisting alloy steel or fibre-reinforced ceramic materials. Rotor housing 7 is coaxial with main shaft 4 and is basically cylinder-shaped, with a given length along main shaft 4. Rotor housing 7 has a subchamber forming portion 55 integral therewith on the lower right side and a port forming portion 56 integral therewith on the upper left side.

Inside of rotor housing 7, a rotor holding bore 58 from the front end to the rear end of rotor housing 7 and coaxial with main shaft 4 is formed. Rotor 5 supported on main shaft 4 is held in rotor holding bore 58. Between bore surface 58*a* of rotor holding bore 58 and the outer circumferential surface of rotor 5, a suction chamber 60, a compression chamber 61, a combustion chamber 63 (i.e. expansion chamber) and an exhaust chamber 64 to be described below, are each formed. Bore surface 58*a* is constructed as a low frictional and abrasion resisting surface by such surface treatments as electroplating, thermal spraying or chilling process.

Figure 9:
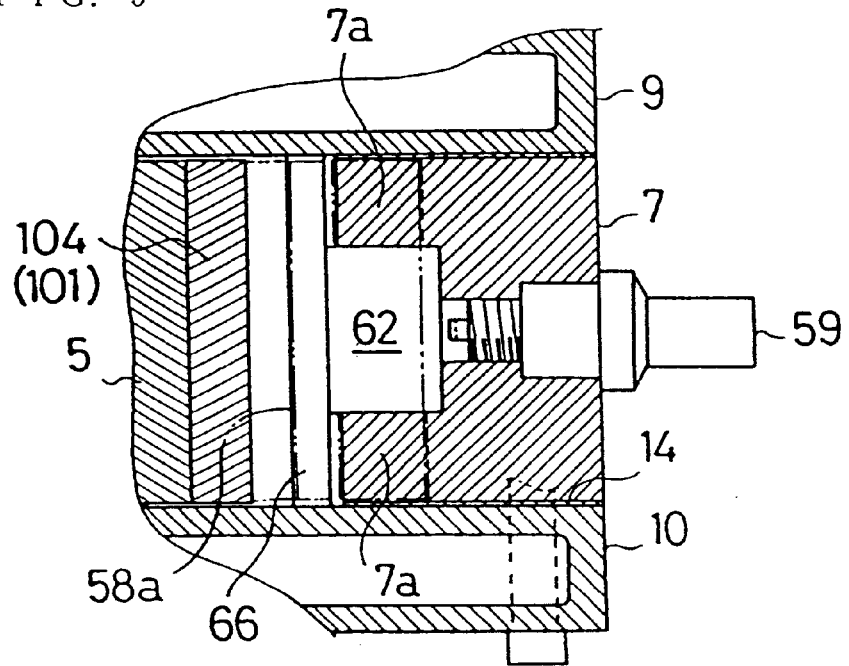
FIG. 9 is a cross sectional view at A—A line of FIG. 5.
Figure 10:
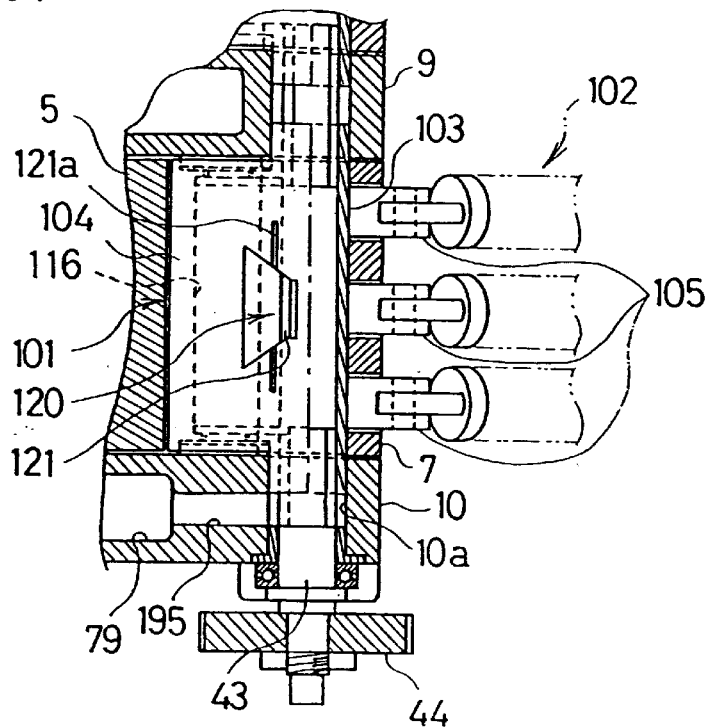
FIG. 10 is a cross sectional view at B—B line of FIG. 5.

In an approximately opposite position to intake port 34 and exhaust port 37 with respect to the axial center 4*e* of main shaft 4, subchamber forming portion 55 of rotor housing 7 has a vane holding cavity 65, being open to bore surface 58*a* and continuing throughout the full length of rotor housing 7. It also has a combustion subchamber 62 positioned at the mid portion in the axial direction of rotor housing 7. Combustion subchamber 62 is formed to communicate with vane holding cavity 65 and is opened by and closed with first swinging vane 101. Subchamber forming portion 55 has an ignition plug 59 facing subchamber 62 (shown in FIG. 9). A gas stream guide passage 66 communicating with the lowest end of vane holding cavity 65 and being open to bore surface 58*a*, is formed throughout the full length of rotor housing 7.

The lower surface of vane holding cavity 65 is a partially cylindrical surface 65*a* centered at the swing center 101*a* of first swinging vane 101. But gas stream guide passage 66 may be made smaller in accordance with the shape of first swinging vane 101.

Figure 11:
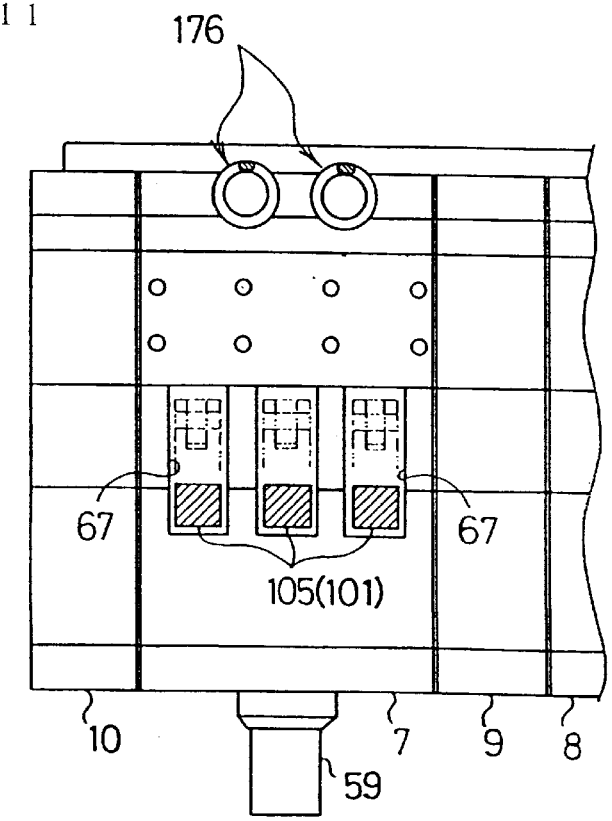
FIG. 11 is a cross sectional view at C—C line of FIG. 5.

In order to fit axial portion 103 of first swinging vane 101 to the upper side position of vane holding cavity 65, rotor housing 7 is provided with axial bore 108 opened to vane holding cavity 65 and combustion subchamber 62 throughout full length thereof. Rotor housing 7 has three openings 67 (shown in FIG. 11) for three drive arms 105 of first swinging vane 101, and these openings 67 are formed like slits not to divide rotor housing 7 up and down.

Figure 20:
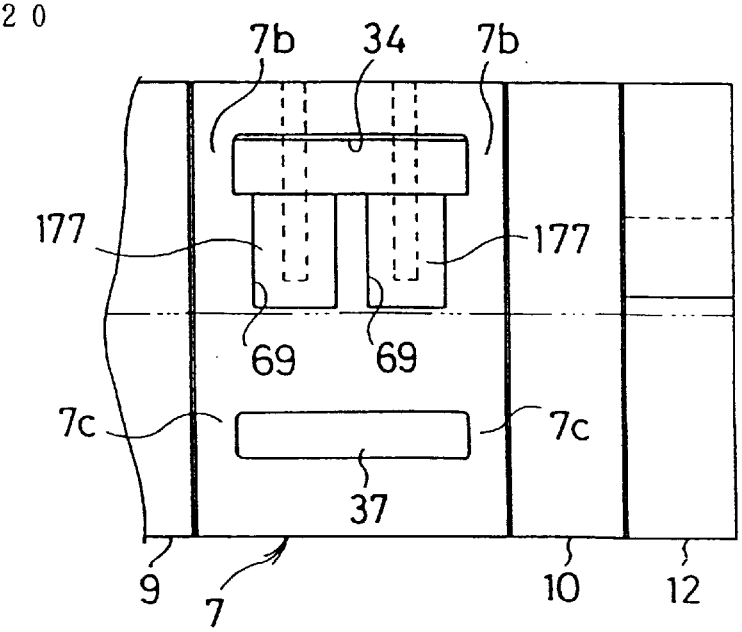
FIG. 20 is a cross sectional view at E—E line of FIG. 5.

Port forming portion 56 of rotor housing 7 is provided with exhaust port 37 opened at the opposite side to combustion subchamber 62 with respect to the axial center 4*e* of main shaft 4 and intake port 34 positioned slightly above exhaust port 37. Intake port 34 is positioned at the shifted position from exhaust port 37, by approximately 35 degrees in the direction of rotor rotation (direction of arrow 52) in rotor 5. As shown in FIG. 20, each intake port 34 and exhaust port 37 is a rectangular passage of large cross sectional area extending approximately from the front end to the rear end of rotor housing 7.

In order not to divide rotor housing 7 up and down, rotor housing 7 has thick strength walls 7*b* formed at front and rear sides of intake port 34 and thick strength walls 7*c* formed at front and rear sides of exhaust port 37.

Rotor housing 7 is provided with a vane holding cavity 68 throughout the full length thereof for holding a second swinging vane 161, vane holding cavity 68 which communicates with intake port 34 and is formed to communicate with bore surface 58*a*. The lowest end surface of vane holding cavity 68 is formed as a partially cylindrical surface admitting an axial portion 163 of second swinging vane 161, and the upper surface of vane holding cavity 68 is formed as a partially cylindrical surface 68a centered at the axial center of axial portion 163. The port forming portion 56 of rotor housing 7 is provided with two openings 69 for two drive arms 165 of second swinging vane 161, these openings 69 communicate with intake port 34 (shown in FIG. 20).

The right side upper portion of rotor housing 7 is provided with a protrusion 57 integral therewith for fitting a spring support member 140 of a biasing mechanism biasing first and second swing vanes 101,161, and the base end of spring support member 140 is fixed on the right side surface of protrusion 57 by eight bolts 57a (shown in FIG. 5). Rotor housing 7 is provided with ten bolt holes 53 admitting tightly ten tie bolts 16 respectively and plural cooling water passages 54a–54i for the flow of cooling water, whose passages 54a–54i are penetrated from front to rear end. Also, there are provided inner and outer ring seal members 27,28 for sealing cooling water (shown in FIG. 4).

Referring to FIGS. 2, 3, and 4, intermediate housing 9 and side housings 10,11 are made of cast iron, ductile cast iron or aluminum alloy, but these housings 9,10,11 may also be made of heat resisting alloy steel or fiber-reinforced ceramic materials. Of these housings 9,10,11, at least the surfaces facing the bore 58 are constructed as low frictional and abrasion resisting surfaces by such surface treatments as electroplating, thermal spraying or chilling process. Intermediate housing 9 and side housings 10,11 are of substantively similar structure. First, descriptions will be given of intermediate housing 9.

Intermediate housing 9 has a given thickness along the direction of main 10 shaft 4, and is a plate type member of approximately the same outline shape as rotor housing 7. Intermediate housing 9 is provided with a cooling water passage 70 communicating with cooling water passages 54a–54g in the lower halves of rotor housings 7,8 and a cooling water passage 71 communicating with cooling water passages 54h,54i in the upper halves of rotor housings 7,8. Furthermore, intermediate housing 9 is provided with a bearing hole through which main shaft 4 penetrates. This bearing hole comprises a metal fitting hole 72 and end holes 73 at both sides of the hole 72. The main shaft 4 is supported rotatably by metal bearing 17. The end holes 73 are larger in diameter than main shaft 4. But, for example, rear end hole 73 may be formed in a pair of divided half rings in order to fit metal bearing 17. Intermediate housing 9 has an annular oil passage 74 disposed around the outer circumference of metal fitting hole 72. The front end portion of intermediate housing 9 is provided with plural arcuate oil passages 75 communicating with annular oil passage 74 and facing oil passages 91a–91d in the rear end wall of rotor 5 in first cylinder 2. The rear end portion of intermediate housing 9 is provided with plural arcuate oil passages 76 communicating with annular oil passage 74 and facing oil passages 91a–91d in the rear end wall of rotor 6 in second cylinder 3. As with intermediate housing 9, front and rear side housings 10,11 are provided with cooling water passages 77,82 communicating with cooling water passages 54a–54g in the lower halves of rotor housings 7,8, a cooling water passage 78,83 communicating with cooling water passages 54h,54i in the upper halves of rotor housings 7, 8, an annular oil passage 79,84 and plural arcuate oil passages 80,85, respectively.

Figure 8:
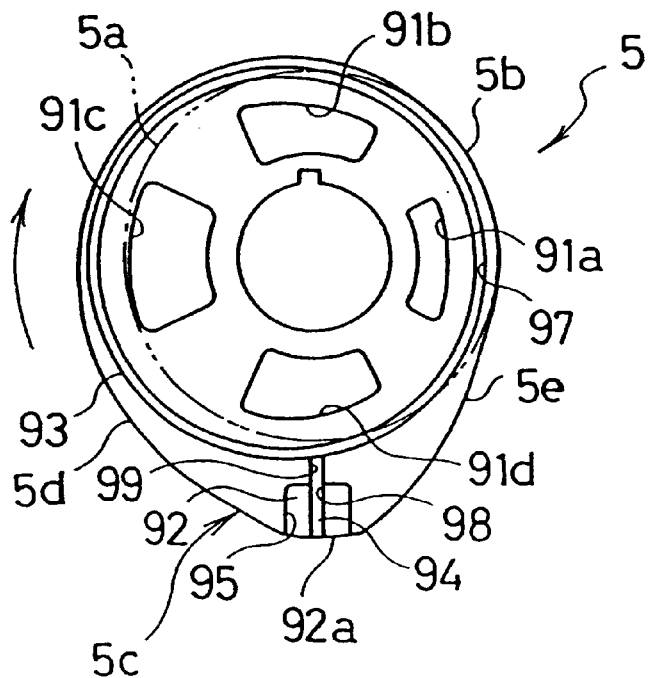
FIG. 8 is a front view of a rotor of the engine.

Referring to FIGS. 4, 5, and 8, rotor 5 is made of cast iron, ductile cast iron or aluminum alloy, but may also be made of heat resistant alloy steel or fiber-reinforced ceramic materials. Rotor 5 is positioned in the bore 58 of rotor housing 7 and supported on main shaft 4 so as not to rotate via key 87. Rotor 5 is rotatable with main shaft 4 in unison, in the direction of arrow 52. Between the front end surface of rotor 5 and housing 10, and between the rear end surface of rotor 5 and housing 9, there are minute gaps of approximate 0.5 mm, respectively. From axial center 4e of main shaft 4, the minimum radius of the outer circumferential surface of rotor 5 is approximately $\frac{2}{3}$ of the radius of bore surface 58a, and an imaginary base cylindrical surface 5a having the minimum radius of rotor 5 is defined as shown in FIG. 5. The minimum radius surface 5b coincident with surface 5a is formed narrow circumferentially. The rotor 5 is provided with a projecting portion 5c protruding largely out of an imaginary base cylindrical surface 5a and extending to bore surface 58a, throughout the full length of rotor 5. The top of projecting portion 5c is in contact with bore surface 58a with a minute clearance, and has a circumferential width of approximately 10 to 15 mm. The top of projecting portion 5c is positioned at the position shifted by about 90 degrees from minimum radius surface 5b toward the rotating direction of rotor 5.

The outer circumferential surface of rotor 5 is provided with a leading side curved surface 5d (i.e. gently inclined curved pressurization surface) and a trailing side curved surface 5e (i.e. steeply inclined curved pressure reception surface). The radius of leading side curved surface 5d decreases in a small and approximately constant radius decreasing ratio toward the direction of rotor rotation, from the leading end (leading side end in rotation of rotor) of the top of projecting portion 5c to the trailing end (trailing side end in rotation of rotor) of minimum radius surface 5b. The radius of trailing side curved surface 5e decreases in a large and approximately constant radius decreasing ratio toward the direction opposite to rotor rotation, from the trailing end of the top of projecting portion 5c to the leading end of minimum radius surface 5b. That is, leading side curved surface 5d is formed as a curved surface having an increasing radius with small and approximately constant radius increasing ratio toward the reverse direction to rotor rotating direction, from the trailing end of minimum radius surface 5b to the leading end of the top of projecting portion 5c.

The outer circumferential surface of rotor 5 is constructed as a low frictional and abrasion resisting surface by such surface treatments as electroplating, thermal spraying or chilling process. Rotor 5 is provided with a tubular wall 5f fitted on main shaft 4, a front end wall 5g, a rear end wall 5h and an outer circumferential wall 5i, integrally. The wall thickness of these walls is determined according to the high-temperature strength of the material comprising rotor 5, various sizes and the combustion gas pressure. Rotor 5 has an oil passage 90 inside thereof, but may have reinforcing ribs and/or flow guide fins therein. The inner surface of tubular wall 5f has a key groove 87a, and lubricating oil is introduced into key groove 87a through small holes (not shown) and supplied to the gap between metal bearing 17 and main shaft 4.

In the area adjacent to the outer circumference of rotor 5, front end wall 5g and rear end wall 5h are each provided with four oil passages 91a–91d communicating with oil passage 90. Rotor 5 is fitted with top main seal 92, two annular side seals 93 and two top side seals 94. The top of projecting portion 5c has a seal fitting groove 95 of approximately the same width as the top, throughout the full length thereof. Top main seal 92 made of ductile cast iron, for example, is fitted in seal fitting groove 95 movably. The outer surface of top main seal 92 is formed to be a partially cylindrical seal surface 92a of almost the same curvature as bore surface 58a. Top main seal 92 is formed like a box opening at the bottom, and is biased against the bore surface 58a by a leaf spring 96 fitted inside thereof and by pressurized oil introduced from oil passage 90 via several small holes. The seal surface 92a of top main seal 92 contacts normally with bore surface 58a and prevents combustion gases of high pressure and compressed fuel-air mixture from leaking. Specifically, oil leaked from the gap (i.e. leading side gap) between seal fitting groove 95 and top main seal 92 lubricates the sliding engaging contact between seal surface 92a and bore surface 58a. And, in order to improve oil holding and abrasion-resistant functions, preferably, the seal face 92a of top main seal 92 may be chilled by laser beam scanning. Moreover, preferably, combustion gases may be introduced into seal groove 95 through the gap (i.e. trailing side gap) between seal fitting groove 95 and top main seal 92 in order to bias top main seal 92. Front end wall 5g and rear end wall 5h are each provided with an annular seal groove 97 eccentric to the axial center 4e of main shaft 4. Each annular seal groove 97 is provided slidably with a heat resistant annular side seal 93 as a gas and oil seal, the annular side seal 93 being of open or closed ring shape. The annular side seal 93 is biased by pressurized oil introduced into seal groove 97 from oil passage 90 via plural small holes (not shown) and by a spring included in side seal 93, thereby annular side seals 93 always keep sealing contact with housing 9,10. Front and rear ends of top main seal 92 each have a seal groove 98 directed radially, and front end wall 5g and rear end wall 5h each have a seal groove 99 continuous with seal groove 98 and directed radially. Each set of seal grooves 98,99 are fitted with top side seal 94 made of heat resistant metal. The top side seals 94 are pressed against housing 9,10 by oil pressure and springs and keep sealing contact with housing 9,10.

Referring to FIGS. 2, 3, 5, and 10–18, first swinging vane mechanism 100 as a first partitioning means functions as a partitioning means for partitioning hermetically between compression chamber 61 or suction chamber 60 and combustion chamber 63 or exhaust chamber 64 in cooperation with rotor 5, and as a means for opening and closing combustion subchamber 62. This first swinging vane mechanism 100 comprises a first swinging vane 101 (i.e. first swinging partitioning member), a first biasing mechanism 102 forcing heavily first swinging vane 101 against rotor 5 and the vane holding cavity 65. First swinging vane 101 is made of a titanium alloy, ductile cast iron or other heat resistant alloy steel of high strength. First swinging vane 101 comprises axial portion 103 parallel with main shaft 4, a vane main body 104 extended by a given length in the direction of rotor rotation from axial portion 103 and three drive arms 105, integrally. Axial portion 103 has inside it an axial bore 106 for admitting valve shaft 43, and both end portions of axial portion 103 are formed as pivot tubes 107. By means of fitting axial portion 103 in axial bore 108 of rotor housing 7 and inserting pivot tubes 107 rotatably in pivot bores 9a,10a of housings 9,10 (shown in FIG. 3), first swinging vane 101 is pivoted onto housings 9,10 which swing up and down. Two seal grooves in axial bore 108 are fitted with seal members 109 made of metal for sealing combustion gases.

Vane main body 104 has a beak like shape in cross section and is a rectangular plate member having a given thickness and the same length as rotor 5 in the axial direction. The upper surface of vane main body 104 on the rotor side has a gently curved surface 110a of the same curvature as bore surface 58a which continues smoothly with bore surface 58a when closing combustion subchamber 62 as shown with a chain line in FIG. 5, a partially cylindrical curved surface 110b for hermetically sealing engagement with rotor 5 (this curved surface 110b being extending smoothly from gently curved surface 110a and having a larger curvature) and a partially cylindrical curved surface 110c for hermetically sealing engagement with the lower partially cylindrical surface 65a of vane holding cavity 65, curved surface 110c having a center at the axial center 101a of axial portion 103 and extending smoothly from the curved face 110b.

The lower surface of vane main body 104 has a partially cylindrical face 110d, and its mid portion comprises a bore side wall of combustion subchamber 62. Both end side portions of surface 110d contact hermetically with end side portions of the interior wall of vane holding cavity 65, when combustion subchamber 62 is closed, as shown with the chain line in FIG. 5. The axial bore 108 and axial portion 103 are positioned so as to approximately circumscribe bore surface 58a. In order to secure hermetically sealing engagement even when abrasion occurs on the surfaces 110c,65a, it is preferable to apply one of the modified structures (shown in FIGS. 37,38) described below. The upper portion of vane main body 104 comprises a lubricating member 111 made of porous sintered metal having a plurality of minute continuous interstices and self lubricating characteristics. Lubricating member 111 is fixed by engaging its dovetail portions 111a with dovetail grooves 112. Also, heat resistant inorganic adhesives may be applied additionally to fix lubricating member 111. Three drive arms 105 on opposite side to vane main body 104 are formed integrally with axial portion 103, and the top end of each drive arm 105 has a pin joint portion 105b including a pin hole 105a. These drive arms 105 are inserted through three openings 67 in rotor housing 7, respectively, and three pin joint portions 105b project out of the outer surface of rotor housing 7.

Figure 17:
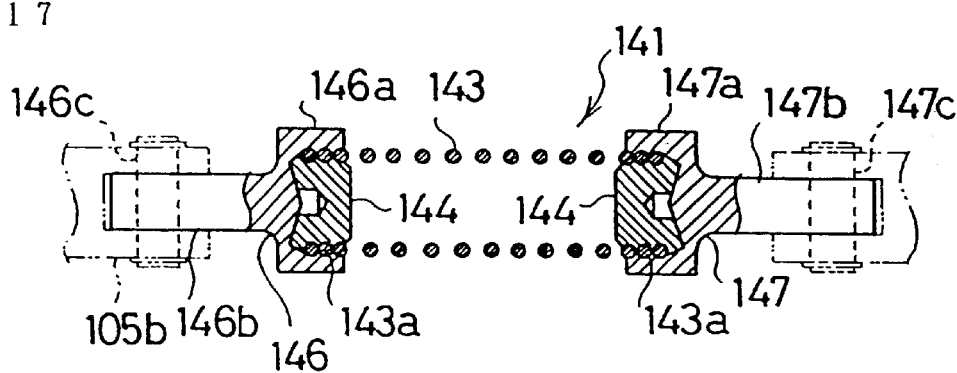
FIG. 17 is a cross sectional view of a spring unit of a first biasing mechanism of the first swinging vane mechanism.
Figure 18:
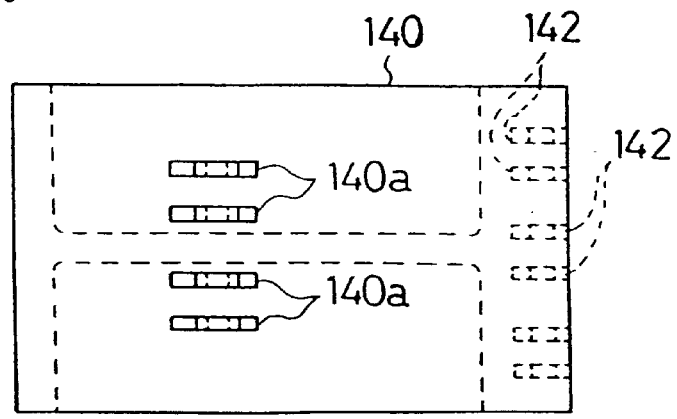
FIG. 18 is a plan view of a spring support member of the first biasing mechanism.
Figure 19:
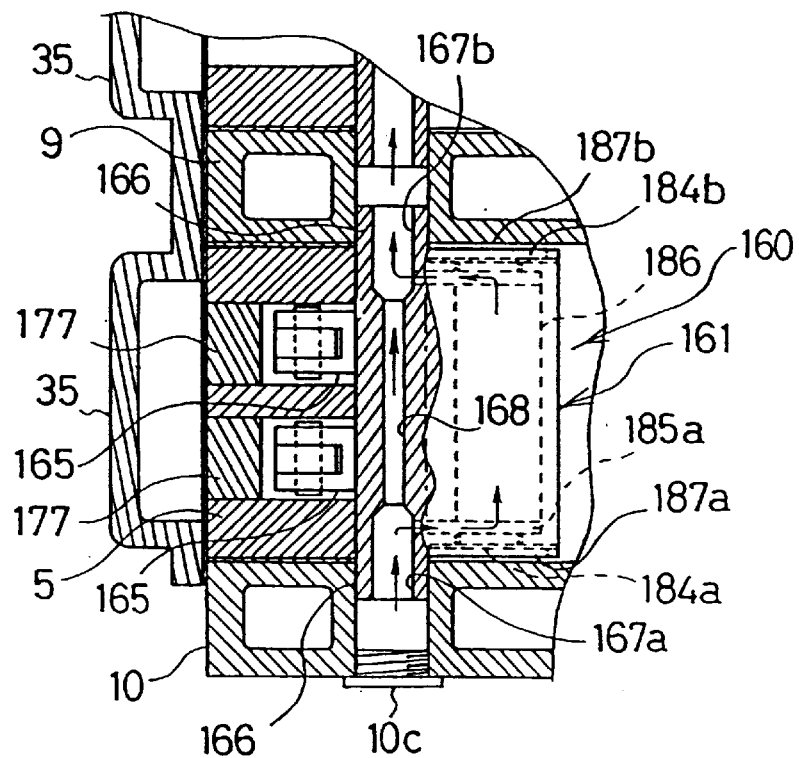
FIG. 19 is a cross sectional view at D—D line of FIG. 5.

First biasing mechanism 102 biasing elastically first swinging vane 101 against rotor 5 has spring support member 140 fixed to rotor housing 7 and three spring units 141 connecting spring support member 140 to three drive arms 105 respectively, and three spring units 141 force heavily first swinging vane 101 against rotor 5 (i.e. toward clockwise direction in FIG. 5). As shown in FIG. 18, for example, spring support member 140 is made of an aluminum alloy and its top end is provided with three pin joint portions 142 corresponding to three drive arms 105. Each pin joint portion 142 has a pin hole. As shown in FIG. 17, the spring unit 141 has a tensile coil spring 143, and each end thereof is formed as a screw like portion 143a having a screw 144 fixed therein, and caps 146a,147a of two connecting members 146,147 are screwed onto corresponding screw like portions 143a respectively. Three pin joint portions 146b of three connecting members 146 are pivoted with three pin joint portions 105b of three drive arms 105 by three pins 146c, respectively. Three pin joint portions 147b of three connecting members 147 are pivoted with three pin joint portions 142 of spring support member 140 by three pins 147c, respectively. Thus, three spring units 141 are positioned so as to exert tensile forces on three drive arms 105.

As shown in FIG. 5, when the swing angle of first swinging vane 101 in counterclockwise direction is small and the gas pressure (i.e. the pressure of fuel-air mixture) in compression chamber 61 is low, the biasing force of three spring units 141 is not significant. In accordance with the increase in the swing angle, elastic deformation of spring units 141 increases and the effective lever length of drive arms 105 increases, thereby the biasing force of first biasing mechanism 102 increases. By means of setting properly the thickness of spring wire, diameter, winding number, length and spring rate of spring 143, the first biasing mechanism 102 is constructed so as to force first swinging vane 101 against rotor 5, and to maintain hermetical engaging contact between curved surface 110c and outer circumferential surface of rotor 5. The first swinging vane 101 always makes contact with the outer circumferential surface of rotor 5 and is driven swingingly around a couple of pivot tubes 107 in accordance with rotation of rotor 5.

With respect to the biasing force of first biasing mechanism 102, as shown in FIG. 26, until a rotary valve 124 (described below) opens, first biasing mechanism 102, at least, has to press first swinging vane 101 toward rotor 5 while resisting the gas pressure in compression chamber 61. But, after the rotary valve 124 opened and compressed fuel-air mixture flew into combustion subchamber 62, gas pressure is exerted on the inner surface 110d of the vane 101. When combustion gas pressure is generated in the subchamber 62 after ignition, its high combustion gas pressure is exerted on inner surface 110d. Accordingly, the biasing force of first biasing mechanism 102 is designed taking into account above behaviors.

With respect to the other configurations of vane 101, both ends of vane main body 104 are provided with seal grooves 114a,114b and oil passages 115a,115b communicating with grooves 114a,114b respectively, and vane main body 104 is provided with oil passage 116 communicating with oil passages 115a,115b. Each seal members 117a,117b, made of metallic plate are fitted into seal grooves 114a,114b movably. In order to supply lubricating oil to the upper surface of vane main body 104 through lubricating member 111, vane main body 104 has twelve to eighteen small oil passages 118a from oil passage 116 to the lower surface of lubricating member 111.

As for valve shaft 43 penetrating axial bore 106 of axial portion 103, its portions in housings 9,10 and its portions corresponding to both end side portions of axial portion 103, are formed smaller in diameter than axial bore 106, and the other portions of valve shaft 43 are formed with almost the same diameter as the bore 106. As described below, lubricating oil is introduced into an oil passage 119a in the front pivot tube 107, this lubricating oil flows along oil passage 115a, oil passage 116, oil passage 115b and an oil passage 119b in the rear pivot tube 107, sequentially. Both seal members 117a,117b are forced against housings 10,9 by pressurized lubricating oil in oil passages 116a,116b. Lubricating oil from small oil passages 118a soaks onto the upper surface of vane main body 104 through lubricating member 111 and lubricates the sealing engagement portion between rotor 5 and the vane 101 and the sealing engagement portion between the vane 101 and partially cylindrical surface 65a of vane holding cavity 65. Thereby, the first swinging vane 101 is cooled and lubricated by lubricating oil.

Referring to FIGS. 5, 10, and 12–16, compressed gas inlet passage 120 is a passage for introducing the compressed fuel-air mixture which has been compressed by rotating rotor 5 in compression chamber 61, to be introduced into subchamber 62. The rotary valve 124 is a valve means for opening the inlet passage 120 in the course of the compression stroke in compression chamber 61 and for closing inlet passage 120 just before the timing of top dead center.

A first inlet passage 121 from the mid portion of curved surface 110a to axial bore 106 is formed in axial portion 103 and vane main body 104 of first swinging vane 101. At the position corresponding to first inlet passage 121, axial portion 103 is provided with a second inlet passage 123 making axial bore 106 communicate with the subchamber 62. At the position corresponding to first and second inlet passages 121,123, valve shaft 43 is provided with a cutout passage 122 of semicircle shape in cross section. The curved surface 110a has a pair of shallow guide grooves 121a communicating with first inlet passage 121.

Figure 12:
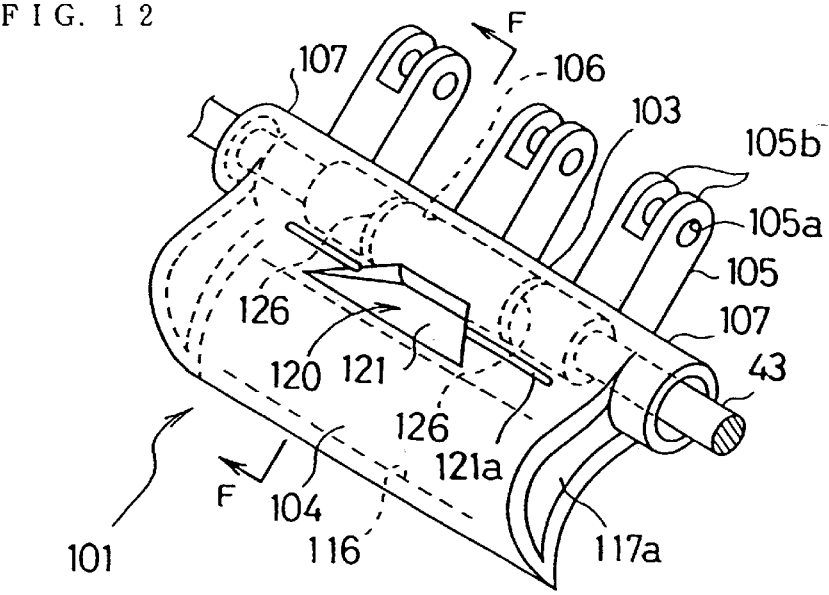
FIG. 12 is a perspective view of a first swinging vane of a first swinging vane mechanism.
Figure 14:
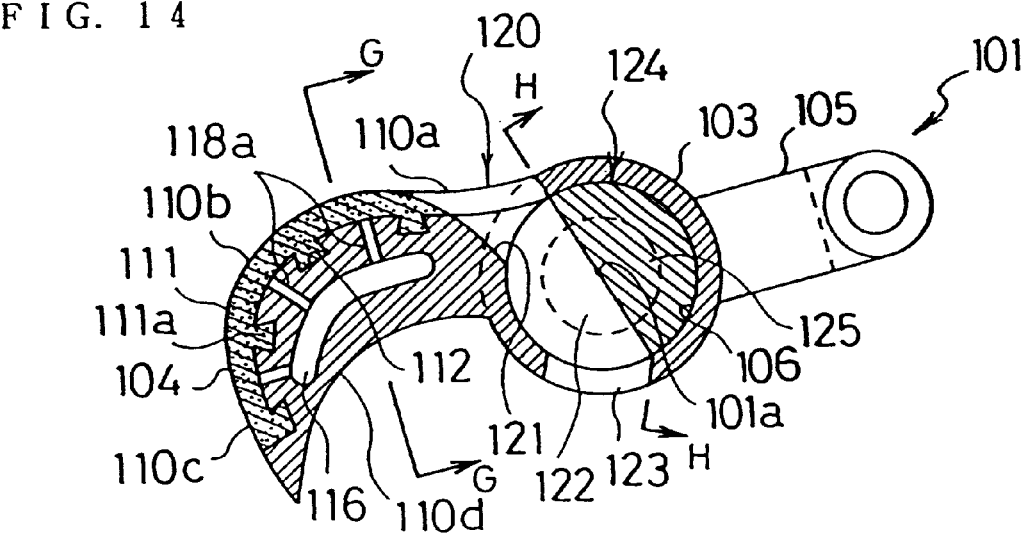
FIG. 14 is a cross sectional view at F—F line of FIG. 12.
Figure 15:
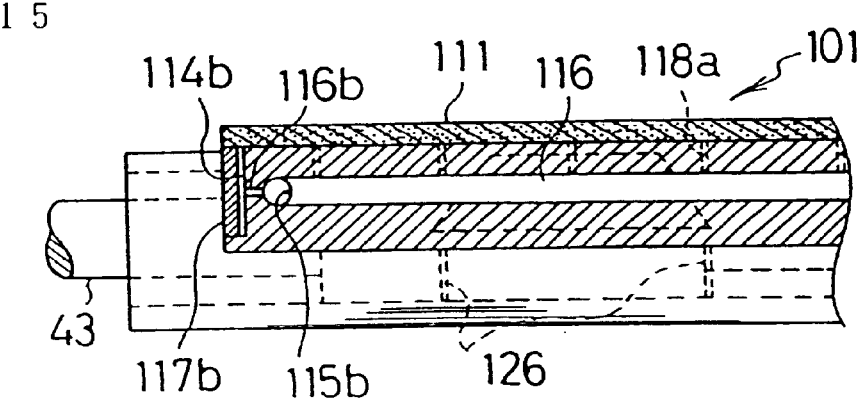
FIG. 15 is a cross sectional view at G—G line of FIG. 14.

As shown in FIGS. 12,14, inlet passage 120 comprises first and second inlet passages 121,123 and cutout passage 122, and this inlet passage 120 has a cross sectional area capable of introducing compressed fuel-air mixture into subchamber 62. But, the width of inlet passage 120 may be expanded along axial direction, and inlet passages 121,123 and cutout passage 122 may be divided at several positions along the axial direction. Rotary valve 124 comprises the cutout passage 122 and a closing shaft portion 125 of semicircle shape in cross section, in the valve shaft 43 driven by valve driving mechanism 42. As shown in FIG. 14, when cutout passage 122 is directed toward vane main body 104, inlet passages 121,123 are communicated via cutout passage 122, thereby rotary valve 124 opens.

When the closing shaft portion 125 is directed toward vane main body 104, inlet passages 121,123 are closed by the shaft portion 125, thereby rotary valve 124 closes. Rotor 5 and valve shaft 43 rotate synchronously at the same rotating speed in the same direction, the operation of rotary valve 124 depends on the rotation phase of rotor 5 (i.e. rotation phase of valve shaft 43) and the swing phase of the vane 101. Detailed descriptions about these will be made below.

Figure 13:
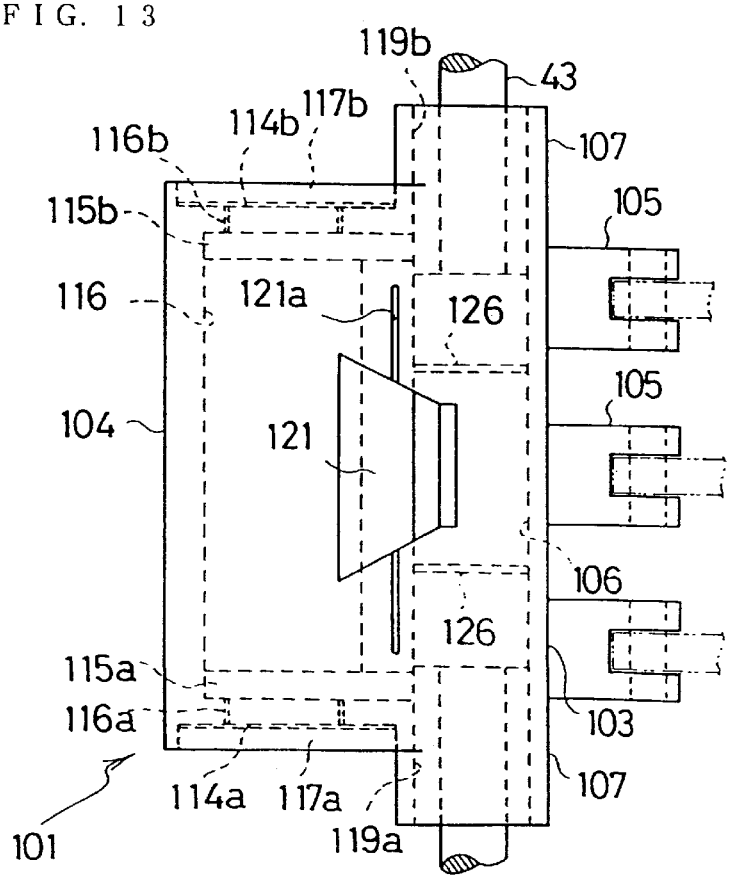
FIG. 13 is a plan view of the first swinging vane.
Figure 16:
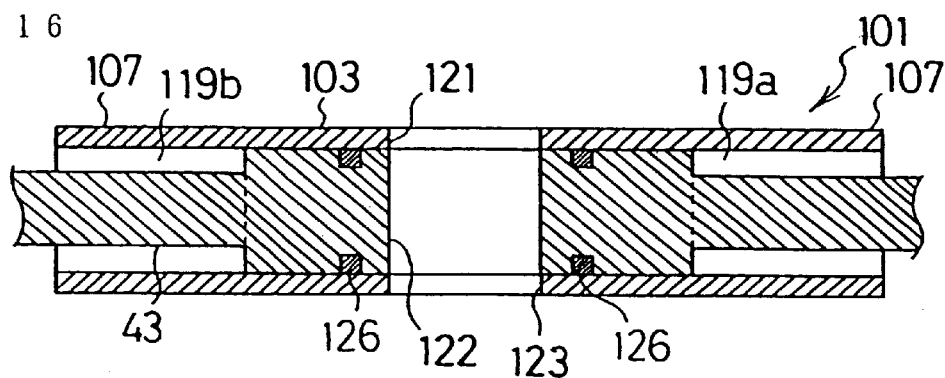
FIG. 16 is a cross sectional view at H—H line of FIG. 14.

In the closed state of rotary valve 124, valve shaft 43 is exposed to combustion gas from subchamber 62, and therefore, preferably, valve shaft 43 should be made of strong and heat resistant alloy steel such as chromium-molybdenum steel. As shown in FIGS. 12,13,16, in order to prevent combustion gas pressure from leaking into oil passages 119a,119b, a couple of annular seal members 126 made of metal fitted in annular seal grooves are provided around valve shaft 43 at front and rear positions relative to inlet passage 120. Additionally, it is possible to enlarge the diameters of axial portion 103 and valve shaft 43 and to enlarge the passage area of inlet passage 120.

Referring to FIGS. 5 and 19–24, second swinging vane mechanism 160 as a second partitioning means functions as a partitioning means for partitioning hermetically between exhaust chamber 64 and suction chamber 60 or compression chamber 61 in cooperation with rotor 5, and as an opening/closing means for opening and closing intake port 34. This second swinging vane mechanism 160 comprises a second swinging vane 161 (i.e. second swinging partitioning member), a second biasing mechanism 162 forcing heavily second swinging vane 161 against rotor 5 and the vane holding cavity 68. The second swinging vane 161 is made of the same kind of material as first swinging vane 101.

The second swinging vane 161 comprises axial portion 163 parallel with main shaft 4, a vane main body 164 extended by a given length toward the rotor rotation direction from axial portion 163 and two drive arms 165, integrally. Both end portions of axial portion 163 are formed as pivot tubes 166 and have therein large oil passages 167a, 167b. The intermediate portion of axial portion 163 has therein a small oil passage 168. By means of fitting axial portion 163 into a partially cylindrical recess of vane holding cavity 68 in rotor housing 7 and inserting pivot tubes 167 rotatably in pivot bores 9b,10b of housings 9,10 (shown in FIG. 3), second swinging vane 161 is pivoted on housings 9,10 so as to swing up and down. The vane main body 164 is of shown cross sectional shape and is a rectangular plate member having a given thickness and the same length as rotor 5 in the axial direction. The lower surface of vane main body 164 on the rotor side has a gently curved surface 169a of the same curvature as bore surface 58a which continues smoothly with bore surface 58a in the state shown with the chain line in FIG. 5. It also has a partially cylindrical curved surface 169b for hermetically sealing engagement with rotor 5 (this curved surface 169b being extending smoothly from gently curved surface 169a and having a larger curvature) and a partially cylindrical curved surface 169c for hermetically sealing engagement with the upper partially cylindrical surface 68a of vane holding cavity 68 (curved surface 169c having a center at the axial center 161a of axial portion 163 and extending smoothly from the curved surface 169b). The upper surface of vane main body 164 is flat. As shown in FIG. 5, axial portion 163 and pivot bores 9b,10b are positioned so as to circumscribe approximately bore surface 58a. The lower portion of vane main body 164 is constructed with a lubricating member 170 made of porous sintered metal having many minute continuous interstices and self lubricating characteristics. The lubricating member 171 is fixed by engaging its dovetail portions 170a with dovetail grooves 171. Also, heat resistant inorganic adhesives may be applied additionally to fix lubricating member 170.

Two drive arms 165 on opposite side to vane main body 164 are formed integrally with axial portion 163, and the top end of each drive arm 165 has a pin joint portion 165a which includes a pin hole. These drive arms 165 are inserted through two openings 69 in rotor housing 7, respectively. In order to close the area between each opening 69 and intake port 34, with the exception of the moving space for drive arm 165, openings 69 are each fitted with a metallic or non-metallic insert member 177 having a wire passage 177a.

Second biasing mechanism 162 biasing elastically second swinging vane 161 against rotor 5 has spring support member 140, two wire units 175 connected to two drive arms 165 respectively and two spring units 176 connecting spring support member 140 to two wire units 175 respectively. Two spring units 176 heavily force second swinging vane 161 against rotor 5 (i.e. toward clockwise direction in FIG. 5). As shown in FIG. 18, on the upper mid portion of spring support member 140, two pin joint portions 140a corresponding to two drive arms 165 are provided. Each pin joint portion 140a has a pin hole.

Wire unit 175 has a metallic wire 175a of about 3 to 4 mm in thickness. Each end of wire 175a is provided with a pin joint member 175b having a pin hole. The left end pin joint member 175b of each wire unit 175 is connected by a pin to pin joint portion 165a of drive arm 165, and wire 175a extends along the upper surface of rotor housing 7 through wire hole 177a of insert member 177 in opening 69, intake port 34 and a wire hole 178 of port forming portion 56. In order to prevent the fuel-air mixture from leaking out via wire hole 178, one or more seal members such as O-rings may be fitted onto wire hole 178. Seal member 179, made of rubber, may also be fitted onto the outer surface of rotor housing 7, for example.

Spring unit 176 is constructed similarly to the spring unit 141 of the first swinging vane mechanism 100. However, the biasing characteristics of spring unit 176 are different from those of spring unit 141. In each spring unit 176, the pin joint portion of a left end connecting member 180 is attached to right end pin joint portion 175b of wire unit 175 by a pin, and the pin joint portion of right end connecting member 181 is attached to pin joint portion 140a of spring support member 140 by a pin. Thus, two spring units 176 are positioned so as to exert tensile forces. As shown in FIG. 5, in accordance with the increase in the swing angle counterclockwise of the second swinging vane 161, the biasing force of two spring units 176 increases. By means of setting properly the thickness of the spring wire, diameter, winding number, length and spring rate, the second biasing mechanism 162 is constructed so as to force second swinging vane 161 against rotor 5, and to maintain hermetical engaging contact between curved surfaces 169a,169b and outer circumferential surface of rotor 5. The second swinging vane 161 always makes contact with the outer circumferential surface of rotor 5 and is driven to swing around a couple of pivot tubes 166 according to rotation of rotor 5. With respect to the second biasing mechanism 162, as shown in FIG. 26, after the projecting portion 5c of rotor 5 approximately passes second swinging vane 161, the gas pressure in exhaust chamber 64 is exerted on vane 161. The cross sectional area of exhaust port 37 is sufficiently large, and the gas pressure in exhaust chamber 64 in state of FIG. 26 is moderate, and the period of exhaust stroke is sufficiently long as described below. Exhaust resistance is sufficiently minimal, as well. Accordingly, the biasing force of the second biasing mechanism 162 is set smaller than that of the first biasing mechanism 102. With respect to the other configurations of vane 161, both ends of vane main body 164 have seal grooves 184a,184b and oil passages 185a, 185b communicating with grooves 184a,184b, respectively. Vane main body 164 is provided with an oil passage 186 communicating with oil passages 185a,185b. As described below, almost all of the pressurized oil introduced into pivot hole 10b in side housing 10 flows through oil passage 167a, oil passage 185a, oil passage 186, oil passage 185b and oil passage 167b, sequentially. Residual pressurized oil flows through oil passage 167a, oil passage 168 and oil passage 167b, sequentially. Thereby, the second swinging vane 161 is cooled effectively by the lubricating oil. Seal members 187a,187b made of metallic plate are fitted in seal grooves 184a,184b movably. These seal members 187a,187b are forced against housings 10,9 by pressurized lubricating oil, and sealing engagement portions between seal members 187a,187b and housings 10,9 are lubricated respectively by the lubricating oil leaked from seal grooves 184a,184b. In order to supply lubricating oil to the lower surface of vane main body 164 through lubricating member 170, vane main body 164 has twelve to eighteen small oil passages 186a from oil passage 186 to the upper surface of lubricating member 170.

Next, additional descriptions will be made regarding the oil system in the engine main body and the other items. As shown in FIGS. 2 and 3, in front end portion of valve shaft 43, a thrust bearing 149 is fitted on the shaft 43 between its flange portion 43a and side housing 10, and a bush 150, fixed on shaft 43, is inserted fixedly in a pivot hole 10a of the housing 10, while annular member 151 is provided around thrust bearing 149. Concerning the rear end portion of valve shaft 43, a bush 152 fixed on the shaft 43 is inserted fixedly in pivot hole 11a of the housing 11. Thrust bearing 153 and a coned disk spring 154 are fitted on shaft 43 at the outside of housing 11, and a nut 155 is screwed on a screw portion 43b of the shaft 43 until coned disk spring 154 deforms elastically. An annular member 156 is provided around thrust bearing 153. Thereby, valve shaft 43 is positioned at a predetermined position and supported rotatably.

Figure 6:
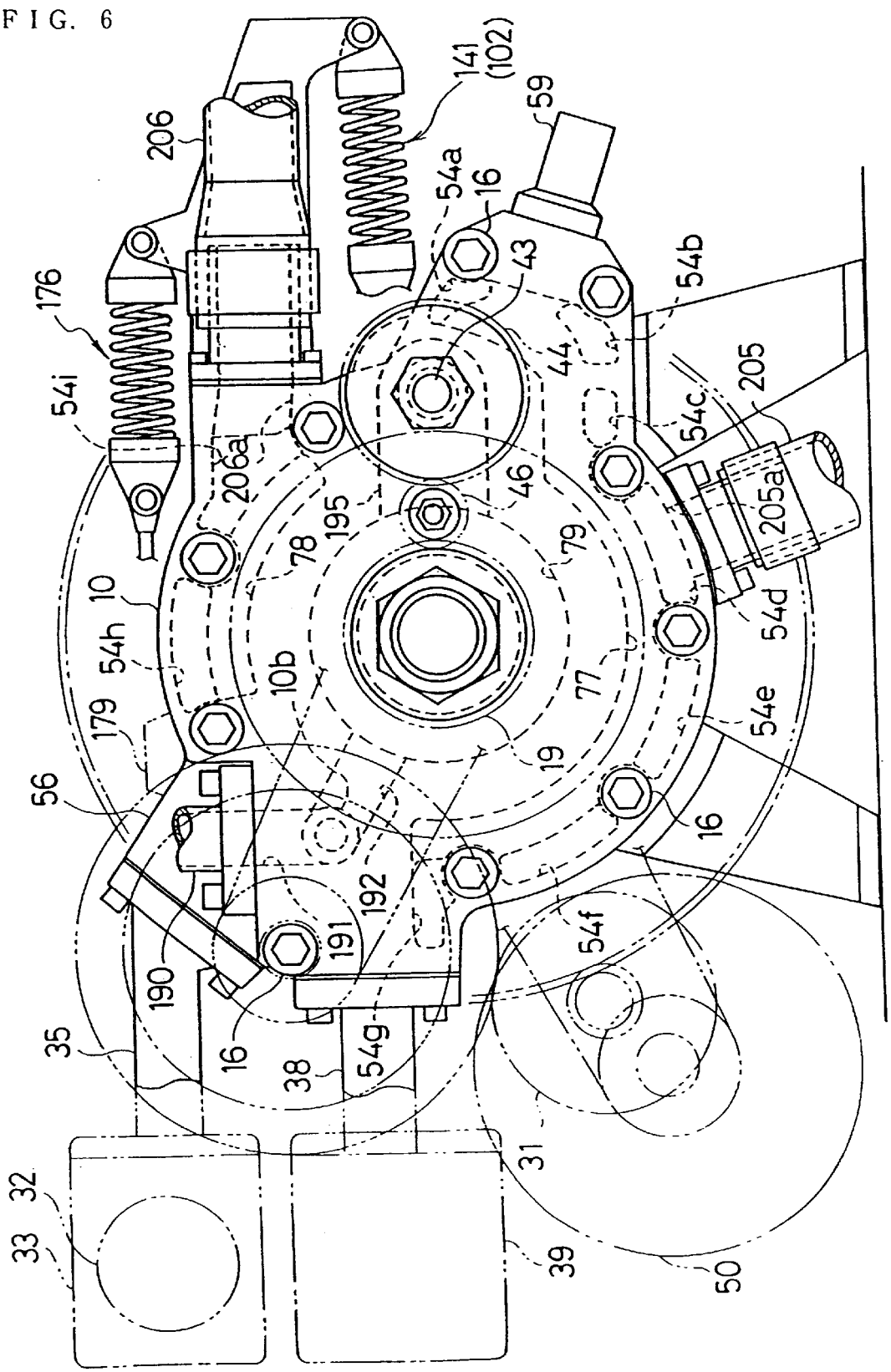
FIG. 6 is a front view of the engine shown in FIG. 2 and FIG. 3.
Figure 7:
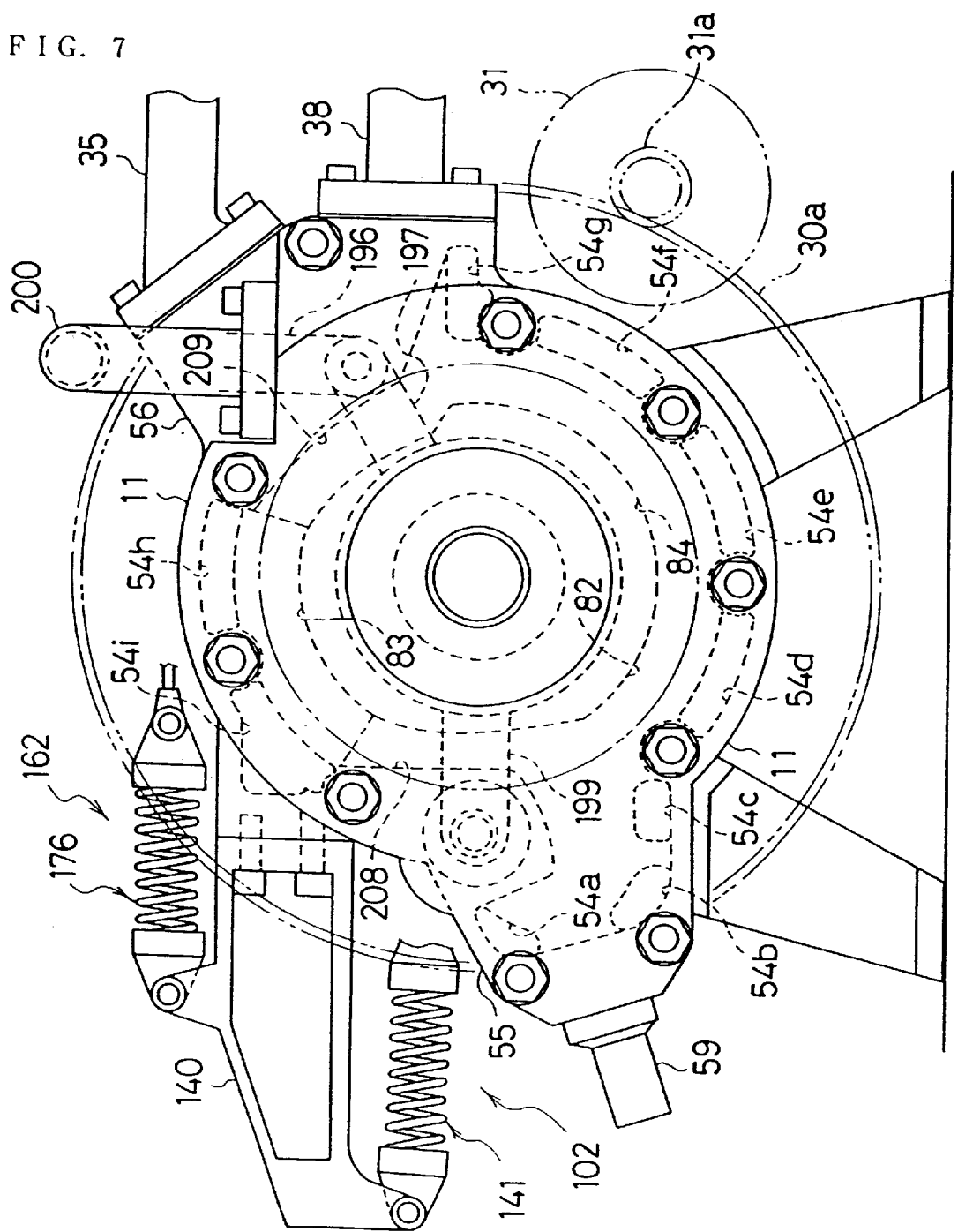
FIG. 7 is a rear view of the engine shown in FIG. 2 and FIG. 3.

As for front side housing 10, as shown in FIGS. 3, 4, and 6, the housing 10 has an annular oil passage 79, an oil passage 192 allowing oil passage 79 to communicate with an inlet port 191 and an oil passage 195 making oil passage 79 communicate with an oil passage 194 in pivot hole 10a. At the rear side housing 11, as shown in FIGS. 2, 4, and 7, there is an annular oil passage 84, an oil passage 197 allowing oil passage 84 to communicate with an outlet port 196 and an oil passage 199 allowing oil passage 84 to communicate with oil passage 198 in pivot hole 11a. A plug member 10c is screwed in the front end of pivot hole 10b, and a plug member 11c is screwed in the rear end of pivot hole 11b.

The oil pump 49 supplies pressurized oil to inlet port 191 through an oil supply pipe 190. Most of the oil in inlet port 191 flows through annular oil passage 79, oil passage 90 in rotor 5 of first cylinder 2, annular oil passage 74 in intermediate housing 9, oil passage 90 in rotor 6 of second cylinder 3, annular oil passage 84 in side housing 11, outlet port 196 and an oil return pipe 200, sequentially. Some portion of the oil in inlet port 191 flows through annular oil passage 79, oil passage 195, oil passage 194, plural oil passages in first swinging vane 101 of first cylinder 2, pivot hole 9a in intermediate housing 9, plural oil passages in first swinging vane 101 of second cylinder 3, oil passage 198 in pivot hole 11a, oil passages 199,84,197 in rear side housing 11 and outlet port 196, sequentially. The residual portion of the oil in inlet port 191 flows through pivot hole 10b in side housing 10, through several oil passages in second swinging vane 161 of first cylinder 2, then through pivot hole 9b in intermediate housing 9, as well as several oil passages in second swinging vane 161 of second cylinder 3, and finally through pivot hole 11b and outlet port 196, sequentially.

Next, additional descriptions will be given concerning the cooling water system in the engine main body. As shown in FIG. 6, front side housing 10 has therein an inlet port 205a communicating with a cooling water hose 205 extending from cooling water pump 48, a cooling water passage 77 communicating with inlet port 205a and cooling water passages 54a–54g in the lower half of the engine main body. It also has an outlet port 206a communicating with a cooling water hose 206 extending to a radiator and a cooling water passage 78 communicating with outlet port 206a and cooling water passages 54h,54i in the upper half of engine main body. As shown in FIG. 7, rear side housing 11 has therein a cooling water passage 82 communicating with cooling water passages 54a–54g in the lower half of the engine main body, a cooling water passage 83 communicating with cooling water passages 54h,54i in the upper half of the engine main body and cooling water passages 208,209 connecting both ends of cooling water passages 82,83.

In the engine main body, the thermal load on the side of combustion subchamber 62 and combustion chamber 63 is high, but the thermal load on the side of suction chamber 60 and compression chamber 61 is low. Accordingly, in this cooling water system, the cooling water supplied into front side housing 10 from cooling water pump 48 via cooling water hose 205 flows through cooling water passages 54a–54g in the lower half of the engine main body, toward rear side housing 11. Subsequently, the cooling water flows through cooling water passages 54h,54i in the upper half of the engine main body, toward front side housing 10, and subsequently the cooling water returns to the radiator through cooling water hose 206.

Next, descriptions will be made of operations of the engine 1 in operating condition, with reference to FIGS. 26–35.

First, relating to the compression top dead center, when the top of projecting portion 5c rotates while making contact with curved surface 110a of first swinging vane 101, the vane 101 swings most toward subchamber 62 to achieve compression top dead center condition. Subsequently, until the top of projecting portion 5c leaves from the curved face 110a, the top dead center condition continues. Numerals of angle shown in FIGS. 26–35 indicate rotation phase angles of rotor 5 based on the case where the rotation phase angle is set at zero degrees at the final timing during the top dead center condition. As shown in FIG. 26, between the outer circumferential surface of rotor 5 and bore surface 58a, three chambers partitioned by the projecting portion 5c, first swinging vane mechanism 100 and second swinging vane mechanism 160 are each provided. The capacities of three chambers vary in accordance with the rotation of the rotor 5. The first swinging vane mechanism 100 partitions between compression chamber 61 and exhaust chamber 64. The second swinging vane mechanism 160 partitions between exhaust chamber 64 and suction chamber 60. In the state of FIG. 26 (rotation phase of 234 degrees), projecting portion 5c passes vane 161 and intake port 34 begins to open, while fuel-air mixture begins to flow into suction chamber 60 from intake port 34. While rotary valve 124 is closed, the fuel-air mixture reducing its capacity in compression chamber 61 is compressed therein. The compression rate of this engine 1 is 8 to 10 for example, and the fuel-air mixture in the chamber 61 is compressed so as to be approximately 60 percent of the compression rate in the condition shown in FIG. 26, and the rotary valve 124 begins to open at approximately this timing.

As swinging vane 101 begins to close the subchamber 62 just before rotary valve 124 begins to open, the fuel-air mixture introduced into subchamber 62 is held therewithin. After opening of valve 124, gas pressure of the compressed mixture in subchamber 62 is exerted on the inner surface 110d of vane 101. The combustion gas in the previous cycle remaining in chamber 64 is being exhausted.

Under these conditions, the pressing force F being exerted on rotor 5 from first swinging vane 101 due to elastic biasing force exerted on vane 101, is directed approximately toward the axial center 4e of main shaft 4, and therefore the reversely driving torque due to the pressing force F is substantively very small. But, the pressing force f being exerted on rotor 5 from second swinging vane 161 is directed with a large lever offset toward the axial center 4e, and therefore rotor 5 is forced in the direction of rotor rotation by the pressing force f.

In the state of FIG. 27 (rotation phase of 284 degrees), the second swinging vane 161 opens intake port 34 completely, and expanding suction chamber 60 is intaking the fuel-air mixture smoothly. The fuel-air mixture in reducing compression chamber 61 is being compressed approximately to 80 to 90 percent of the compression ratio. As the rotary valve 124 is opened fully, the compressed mixture is being introduced rapidly into subchamber 62. In accordance with the progress of compression, the lap length of surface 110c and surface 65a increases, thereby leakage of the compressed mixture from subchamber 62 is prevented certainly. The gas pressure of compressed mixture in subchamber 62 is exerted on the inner surface of vane 101, and the elastic biasing force of first biasing mechanism 102 increases depending on the increase of the swing angle of vane 101, and therefore 101 stays hermetical engaging contact with rotor 5. However, the combustion spent gases in reducing exhaust chamber 64 are being exhausted from exhaust port 37.

In the state of FIG. 28 (rotation phase 330 of degrees), as the projecting portion 5c of rotor 5 begins to come into contact with gently curved surface 110a of vane 101, the capacity of compression chamber 61 becomes minimum (approximately zero). If the curvature of surface 100a is the same as that of bore surface 58a, the minimum capacity of the chamber 61 becomes a certain minimum value. If the curved shape of surface 10a is the same as that of the top portion of leading side curved surface 5d, the minimum volume of chamber 61 becomes approximately zero.

Almost all of the compressed mixture compressed in chamber 61 is charged into inlet passage 120 and into subchamber 62, and after that rotary valve 124 is closed. Vane 101 swings in a large movement toward subchamber 62, and the lap length of surfaces 110c,65a becomes larger, thereby hermetical sealing function is maintained. Just after the closing of rotary valve 124, the compressed fuel-air mixture in subchamber 62 is ignited by ignition plug 59. As start of combustion delays from ignition by plug 59, it is advisable to ignite as early as possible, just as in ordinary reciprocating combustion engines.

Additionally, the compressed mixture in first inlet passage 121 and cutout passage 122 of rotary valve 124 flows back into suction chamber 60 later, but its volume is presumed to be approximately 15 percent. This means that the capacity of suction chamber 60 has to be increased by 15 percent. However this engine 1 can be considerably reduced in size over conventional engines. Therefore, the above defect should not cause any problems.

In the state of FIG. 29 (rotation phase of 338 degrees), the rotary valve 124 closes further, and vane 101 swings further toward subchamber 62, thereby the fuel-mixture in subchamber 62 is compressed further. In the compression top dead center condition from the timing when projecting portion 5c of rotor 5 arrives at the gently curved surface 110a, until the final timing shown in FIG. 30 (rotor rotation phase of 0 degrees) of the top dead center condition, closing grade of rotary valve 124 becomes maximum, and the vane 101 swings most toward subchamber 62, while the capacity of subchamber 62 becomes minimum. Thereby, the compressed fuel-air mixture in subchamber 62 is compressed maximumly to be approximately 1.2 times of the compression ratio in the state of FIG. 28. The firing of the mixture also spreads fully in subchamber 62. Then, before rotating to the state of FIG. 31 (rotation phase of 32 degrees), firing of the mixture progresses entirely in subchamber 62, and combustion gas pressure in subchamber 62 increases rapidly to approximately maximum combustion gas pressure, while the combustion gas pressure is exerted on the vane 101. Additionally, the capacity of suction chamber 60, the capacities of passages 121,122,123 of gas inlet passage 120, and the capacity of subchamber 62 in the compression top dead center, are determined so as to attain a predetermined compression ratio (for example, 8 to 10 in case of gasoline fuel).

In the state of FIG. 31, projecting portion 5c of rotor 5 passed over vane 101, and vane 101 is pressed heavily against rotor 5 by the biasing force of first biasing mechanism 102 and the pressing force by combustion gas pressure, and thus vane 101 begins to open subchamber 62. After subchamber 62 begins opening, as vane 101 is biased heavily against rotor 5 by high pressure of combustion gas, vane 101 maintains hermetically sealing engagement with rotor 5. Even before subchamber 62 begins opening, as the trailing side curved surface 5e is steeply inclined, a driving torque driving rotor 5 is generated by a pressing force being exerted on rotor 5 from vane 101. In the state of FIG. 31, suction chamber 60 is charged with a maximum quantity of fuel-air mixture, and exhausting of spent exhaust gas from exhaust chamber 64 is presumed to be completed by approximately 70 to 80 percent.

In the state of FIG. 32 (rotation phase of 98 degrees), the closing grade of rotary valve 124 is large, while vane 101 opens subchamber 62 to a large extent, and the combustion gas gushes quickly into combustion chamber 63. Because minimum radius surface 5b is in contact with vane 101, a maximum driving torque is exerted on rotor 5. When defining the maximum torque Tmax, minimum radius r of rotor 5, radius R of bore surface 58a, length L of rotor 5 in axial direction and combustion gas pressure P, the maximum torque Tmax is given as follows. Tmax=L×(R−r)×P×(R+r)/2. But, in this estimation, the gas pressure in exhaust chamber 64 and the gas pressure in suction chamber 60 or compression chamber 61, as well as various frictional forces, are neglected. In this state of FIG. 32, in suction chamber 60, compression of the mixture begins while intaking fuel-air mixture, and residual spent gas is being exhausted from exhaust chamber 64. In the state of FIG. 33 (rotation phase of 144 degrees), combustion chamber 63 is expanding, and a driving torque approximately equal to the maximum torque Tmax is being exerted on rotor 5. As the cutout passage 122 communicates with subchamber 62, the mixture of low pressure in passage 122 flows into subchamber 62 to promote combustion of residual burned mixture. The rotary valve 124 holds closing of gas inlet passage 120 and the second vane 161 closes intake port 34 and compression chamber 61 reduces, thereby the compression of fuel-air mixture progresses in chamber 61. The exhaust chamber 64 reduces its capacity remarkably, and the emission of spent gas is generally completed.

In the state of FIG. 34 (rotation phase of 174 degrees), combustion chamber 63 expands to a maximum value, and a driving torque approximately equal to the maximum torque Tmax is being exerted on rotor 5. Rotary valve 124 remains closed, and the mixture in compression chamber 61 gradually becomes compressed. Exhaust chamber 64 reduces its capacity to a maximum extent, thereby spent gas is exhausted entirely from exhaust chamber 64. Additionally, if the gently curved surface 169a of the vane 161 is formed in the same shape as bore surface 58a, a small gap remains between gently curved surface 169a and the leading side curved surface 5d of rotor 5, but an insignificant amount of spent gas remains, and so this small gap causes no problem. However, a guide groove for making the gap communicate with the exhaust port 37 may be formed on gently curved surface 169a. If the surface 169a is formed in the same shape as the top portion of leading side curved surface 5d, it is possible to eliminate the gap.

In the state of FIG. 35 (rotation phase of 190 degrees), the projecting portion 5c of rotor 5 rotates by the position of the vane 161, and exhaust port 37 opens to a large extent, thereby combustion spent gas is being exhausted from exhaust chamber 64 which was converted from combustion chamber 63. Additionally, after emission begins, combustion gas pressure is exerted on rotor 5, and therefore the gas pressure drives rotor 5 even in the states shown in FIGS. 35, 26.

The descriptions have been made regarding one cylinder. However, rotor 5 of first cylinder 2 and rotor 6 of second cylinder 3 differ by 180 degrees in phase angle, and therefore drive torque is generated on main shaft 4 sequentially from two rotors 5,6 as shown in FIG. 25. Additionally, in FIG. 25, suction stroke is shown as a period of 180 degrees in main shaft rotation angle, but intake port 34 is opening during a period corresponding to approximately 270 degrees.

Next, descriptions will be made for the valve opening period of rotary valve 124 and an opening period for subchamber 62, as noted in FIG. 36. Depending on the rotation of rotor 5, the first inlet passage 121 moves along its moving zone 121Z, and second inlet passage 123 moves along its moving zone 123Z, and cutout passage 122 moves along its moving zone 122Z, and therefore valve opening period A is determined and subchamber opening period B is determined based on moving behavior of the end of vane main body 104. By adjusting the position and size of passages 121 and 123, as well as adjusting the size of passage 122, it is possible to alter the valve opening period A. By means of adjusting the size of gas stream guide passage 66, and adjusting the size and shape of vane main body 104 of the vane 101, it is possible to alter the subchamber opening period B. A dotted edge line 62e shows a upper edge of subchamber 62.

Next, descriptions will be given regarding the functions and advantages of the rotary piston type internal combustion engine 1.

In this engine 1, rotors 5,6 rotate together with main shaft 4, and rotors 5,6, main shaft 4 and the bore surface 58a are completely coaxial to one another, and the rotation of rotors 5,6 is not eccentric. Accordingly, engine vibrations due to eccentric motion are not generated, and this engine 1 operates more quietly than conventional reciprocating piston engines and Wankel type rotary piston engines.

In each of cylinders 2,3, per one revolution of main shaft 4, one ignition is made and one combustion stroke is generated. Thus, this engine 1 with two cylinders is equivalent to a four stroke cycle reciprocating engine with four cylinders, allowing engine 1 to be considerably reduced in size.

Suction chamber 60 and exhaust chamber 64 are partitioned completely by the second vane 162, thereby combustion gas does not leak into suction chamber 60 and fuel-air mixture in suction chamber 60 does not leak into exhaust chamber 64. Accordingly, combustibility in subchamber 62 and combustion chamber 63 is improved, and. the amount of unburned gas can be considerably decreased.

The opening period of intake port 34 is a very long period equivalent to 270 degrees in the main shaft rotation angle, and intake port 34 can be easily formed to a sufficient size in section area, and therefore intaking resistance in intaking fuel-air mixture into suction chamber 60 can be reduced considerably.

The exhaust period for exhausting spent combustion gas from exhaust chamber 64 is a very long period equivalent to 340 degrees in the main shaft rotation angle. Exhaust port 37 can be easily formed to a sufficient size in section area, and therefore exhaust resistance in exhausting combustion gas from the chamber 64 can be reduced considerably.

With respect to output torque, as described in descriptions relating to the maximum torque Tmax, the lever length of the resultant force exerting on rotors 5,6 of combustion gas pressure in combustion chamber 63 is maintained to be a large value approximately equal to (R+r)/2 during the whole period of the combustion stroke, and the reversely driving torque exerting on rotors 5,6 due to combustion gas pressure is quite small, allowing combustion gas pressure to be converted into output torque efficiently. Accordingly, the fuel consumption ratio of the engine 1 can be considerably improved over conventional reciprocating piston engines and Wankel type rotary piston engines. Additionally, in engine 1, when vane 101 comes into contact with the trailing side curved surface 5e, the pressure receiving area of rotor 5 is rather small, but even in this condition driving torque is generated by mechanical pressing forces (gas pressure force and biasing force of spring units) exerting on rotors 5,6 from the vane 101. Also, in other short period, rotors 5,6 are driven by biasing force of the vane 161.

Compression chamber 61 and combustion chamber 63 are partitioned by vane 101, and vane main body 104 of vane 101 is extended by a given length in the direction of rotor rotation from axial portion 103, while combustion gas pressure is exerted on vane 101. Therefore, even when rotors 5,6 rotate at high speeds, vane 101 never detaches from corresponding rotors 5,6 due to irregular motions. Accordingly, each trailing side curved surface 5e of rotors 5,6 can be formed as a steeply inclined curved surfaces having a large radius reduction ratio, and the minimum radius r of rotors 5,6 can be reduced relative to the radius R of bore surface 58a, and the value of radius ratio r/R can also reduced. Through these improvements, the pressure receiving area of rotors 5,6 receiving combustion gas pressure can be enlarged to attain high output torque and output horse power. As well, combustion chamber 63 can be formed thick in the radial direction to decrease the cooling superficial area of combustion chamber 63, thereby combustibility can be improved and energy loss through cooling can be decreased. Additionally, the value of radius ratio r/R may be altered to be smaller or larger than that shown in Figures, and other alterations may be added to the shape of rotors 5,6.

While rotors 5,6 rotate by approximately 60 degrees, compressed mixture is kept in the subchamber 62, thereby firing, flame propagation and initial combustibility in subchamber 62 can be improved considerably. Accordingly, engine 1 has the potential to improve combustibility in combustion chamber 63 and to decrease the quantity of unburned mixture while improving the fuel consumption ratio.

The radius decreasing ratio of leading side curved surface 5d is set very small, and vanes 101,161 are extended from respective axial portions 103,163, thereby the reversely driving torque due to mechanical pressing forces by vanes 101,161 is very small. However, frictional resistance due to mechanical pressing forces by vanes 101,161 is exerted on rotors 5,6, but the frictional resistance is presumed to be approximately 10 percent of the driving torque by combustion gas pressure and is thus not large. Due to the above coaxial structure, the width of the top of projecting portion 5c can be enlarged in terms of circumference, and wide top main seal 92 can seal compressed fuel-air mixture or combustion gas. Annular seal members 93 and seal members 94 on the front and rear surfaces of rotors 5,6 can prevent compressed fuel-air mixture or combustion gas from leaking. In particular, combustion gas pressure is exerted on vane 101, thereby combustion gas does not substantively leak from the sealing engagements between vane 101 and rotors 5,6.

Vane 101 of the first swinging vane mechanism 100 functions not only as a partitioning means for partitioning between chambers, but also as an opening/closing means for opening and closing subchamber 62, allowing the structure to be simplified considerably when compared to structures where an opening/closing means is provided independently. The axial portion 103 of the vane 101 is positioned approximately so as to circumscribe bore surface 58a, and vane 101 is extended from axial portion 103 in the direction of rotor rotation, while the gently curved surface 110a of vane 101 is formed in approximately the same shape as the top portion of leading side curved surface 5d. Accordingly, almost all of the compressed mixture in compression chamber 61 can be charged into inlet passage 120 and subchamber 62. As well, axial portion 103 of vane 101 is positioned near bore surface 58a, inlet passage 120 is formed at axial portion 103 and its adjacent positions, and inlet passage 120 is opened and closed by rotary valve 124 installed in axial portion 103.

Accordingly, the length of inlet passage 120 can be shortened and the volume of remaining gas in passages 121,122 can be considerably reduced. Furthermore, in final stage of compression shown in FIGS. 28–30, the lapping area of partially cylindrical surface 110c of vane 101 and partially cylindrical surface 65a is formed so as to be large, thereby insuring the function of gas sealing for subchamber 62. Notably, vane 101 is extended by the given length from its axial portion 103 in the direction of rotor rotation, and therefore, in the final stage of compression, compressed mixture is held in subchamber 62 while rotors 5,6 rotate by approximately 30 degrees, subsequently subchamber 62 is kept closed with vane 101 while rotors 5,6 rotate by approximately 30 degrees. Accordingly, the firing performance after ignition is high and initial combustibility after firing is also high, thereby the combustion performance in combustion stroke (i.e., expansion stroke) is improved, and it may be possible to apply lean fuel-air mixture of large air-fuel ratio.

Because vane 101 opens and closes subchamber 62, subchamber 62 can be opened into a large position. When closing subchamber 62, the mixture in subchamber 62 becomes shock absorbing so that impact noise caused by vane 101 is softened. Furthermore, curved surface 110b for hermetically sealing engagement with rotors 5,6 does not engage with local portions, but engages with its whole surface sequentially, thereby local abrasion of surface 110b never occurs and durability can be improved. Furthermore, in relation to the first biasing mechanism 102, three drive arms 105 of the vane 101 are extended out through openings 67 of rotor housings 7,8, and therefore the biasing mechanism 102 can be positioned outside of rotor housings 7,8 to simplify assembly of the mechanism 102. It is also unnecessary to divide rotor housings 7,8 up and down in order to provide the biasing mechanism 102. Unity of each rotor housing can be assured, and therefore fabrication of housings 7,8 can be simplified and the housings 7,8 can be machined with high-precision.

In relation to rotary valve 124, a pair of rotary valves 124 of the first and second cylinders 2,3 have a common valve shaft 43 extending through axial portions 103 of the vanes 101 of cylinders 2,3, and the valve shaft 43 is driven by main shaft 4 via valve driving mechanism 42. Accordingly, the valve driving mechanism 42 can be simplified and operational reliability of two rotary valves 124 can be obtained.

Vane 161 of second swinging vane mechanism 160 functions not only as a partitioning means for partitioning between chambers, but also as an opening/closing means for opening and closing intake port 34. The structure can be simplified considerably when compared to structures where an opening/closing means is provided independently. Just as in the first swinging vane mechanism 100, exhaust chamber 64 can be reduced to the maximum extent by vane 161, and local abrasion of the curved surface 169b can be avoided in order to improve the durability of surface 169b. Vane 161 is forced heavily against rotor and thus irregular movements of vane 161 never occur. When vane 161 retracts into vane holding recess 68, impact noise caused by vane 161 is softened by the shock absorbing function of the fuel-air mixture. Also, it is unnecessary to divide rotor housings 7,8 in order to provide the second swinging vane mechanism 160, and thus the unity of each rotor housing can be maintained. The second biasing mechanism 162 can be installed outside of the rotor housing to simplify assembly.

Next, descriptions will be given regarding additional explanations and altered modifications of engine 1.

Instead of providing intake port 34 in rotor housings 7,8, intake port 34 may be formed in intermediate housing 9 and/or side housings 10,11. Just as in the above case, exhaust port 37 may be formed in intermediate housing 9 and/or side housing 10, 11.

In relation to intake port 34 in rotor housing or housings 9–11, it is possible to provide an intake valve means for preventing fuel-air mixture or compressed air from flowing back from suction chamber 60.

In relation to combustion subchamber 62, instead of providing subchamber 62 in rotor housings 5,6, it is possible to provide a subchamber in intermediate housing 9 and/or side housings 10,11 and to provide a valve means for opening and closing the subchamber synchronously with rotor rotation. In the above case, inlet passage 120 and rotary valve 124 may be omitted.

In relation to top main seal 92 and seal groove 95 of rotors 5,6, in order to prevent top main seal 92 from jumping out at discontinuous portions of the bore surface 58a (i.e. gas stream guide passage 66, the leading side portion of vane holding cavity 68), it is advisable to provide a jump preventing means for top main seal 92 in the projecting portion 5c. For example, the seal groove 96 may be formed in the shape of a T groove and top main seal 92 may be formed to have a T shape cross section, thereby top main seal 92 can move radially by several hundreds micron meters. Otherwise, it is preferable to provide a pair of guide walls perpendicular to the axial direction at both ends of gas stream guide passage 66.

In the above embodiment, the shape of rotors 5,6 is only one example. Various alterations may be added to the shape of rotor. For example, as shown with a real line in FIGS. 42 and 43, the minimum radius surface 5b may be elongated toward the trailing direction, thereby it is possible to lengthen the period when the pressure receiving area in combustion chamber 63 is at maximum, without changing the timing and period of closing the subchamber 62. Now, additional descriptions will be given of the shape of rotors 5,6. Depending on the shape of leading side curved surface 5d, the closing timing closing subchamber 62 by the vane 101 and the closing timing closing intake port 37 by the vane 161 are determined. Depending on the shape of trailing side curved surface 5e, the opening timing opening subchamber 62 by the vane 101 and the opening timing opening intake port 37 by the vane 161 are determined. Accordingly, for example, as shown with a chain line in FIG. 31, the circumferential length of the top of projecting portion 5c may be decreased, thereby the opening timing opening subchamber 62 can be advanced.

Because vane 101 is formed to be a curved body as a whole, when the gas pressure in subchamber 62 is exerted on vane 101, vane 101 will deform elastically so as to decrease the curvature, thereby the sealing performance of vane 101 will be improved.

In relation to lubrication between vane 101 and rotors 5,6, seal grooves may be formed on the curved surface 110b of vane 101, and may be provided with seal members respectively. These seal members may be fitted in seal grooves so as to move minutely, and lubricating oil is supplied via these seal members from inside the seal grooves. This is the same with respect to the curved surface 170 of the vane 161. Otherwise, the lubricating member 111 may be omitted, and a plurality of small oil holes supplying oil to the curved surfaces 110a–110c from oil passage 116 may be formed in vane 101. This is the same with respect to the curved surface 170 of vane 161.

As shown in FIG. 37, in order to assure hermetical gas sealing performance between partially cylindrical surface 110c and partially cylindrical face 65a, the upper wall portion of gas stream guide passage 66 may be constructed with an elastic member 210 made of heat resistant metal such as chromium-molybdenum steel. The left end portion of elastic member 210 is fixed on the rotor housing with plural bolts or stud-pin members 210a, and pressurized oil (more than approximate 10 Kgf/cm2) is supplied to the underside of the elastic member 210 from an oil passage 211 throughout the full length of the engine main body. The extent of elastic deformation of member 210 due to oil pressure is largest at the right end. The thickness, width and Young's modulus (modulus of elasticity) at high temperature of the member 210 are set so that the largest elastic deformation will be approximately 200 microns. With the oil leaked from a gap 210b, lubrication and gas sealing between surfaces 110c,65a is accomplished.

As shown in FIG. 38, as a countermeasure for abrasion in surfaces 110c,65a, the upper wall portion of gas stream guide passage 66 may be constructed with a movable member 212 made of heat resistant metal such as chromium-molybdenum steel, and an adjusting mechanism 123 for adjusting the position of the member 212 may be provided. The adjusting mechanism 123 has eight vertical bolts 214, a screw mechanism 215 for adjusting vertical positions of these bolts 214, and a plate member 216 fixed on the under surface of subchamber forming portion 55. The top of each bolt 214 is screwed in member 212. Each screw member 217 screwed in screw hole 216a of the plate member 216 is fitted between a flange portion 214a and a bolt head 216b, and each screw member 217 has a hexagonal portion 217a. By rotating hexagonal portion 217a, the position of each screw member 217 can be adjusted minutely to accommodate the position of each bolt 214. When abrasion of the surfaces 110c and 65a occurs, the vertical position of movable member 212 can be changed by adjusting mechanism 123.

Instead of spring units 141,176, spring unit 141A, shown in FIG. 39, may be used. This spring unit 141A includes an outer spring 143A, an inner spring 143B, a pair of screw members 144A, a pair of annular screw members 144B and connecting members 146,147.

Instead of spring units for biasing mechanisms 102,162, it is possible to provide spring members for biasing both ends of axial portion 103, 163 in housings 9,10,11.

As shown in FIGS. 40 and 41, instead of first biasing mechanism 102 biasing vane 101, biasing unit 220 may be used. In this biasing unit 220, a cylinder main body 221 is constructed with a case member 221a, a bottom plate 221b and a cover plate 221c which are connected by four tie bolts 222. The cylinder main body 221 has a cylinder bore 223 of elongated circular shape in cross section therein, and a piston member 224 is held movably in cylinder bore 223, and each right end of three piston rods 225 is connected with piston member 224. Each piston rod 225 has a pin joint portion 225a at left end thereof for connecting with drive arm 105 of the vane 101. On the right end of bottom plate 221b, three pin joint portions 226 for connecting respectively with three pin joint portions 142 of spring support member 140 are provided. In drive chamber 227 between piston member 224 and cover plate 221c, three compressed springs 228 are fitted on three piston rods 225 respectively. An air supply tube 229 is fitted on cylinder main body 221, and compressed air is supplied to drive chamber 227 through air supply tube 229 from a compressed air source (not shown). The elastic biasing force of three springs 228 and the fluid force by compressed air in drive chamber 227 are set approximately equal to the elastic biasing force of the first biasing mechanism 102. Additionally, it is possible to generate a biasing force equal to the elastic biasing force of first biasing mechanism 102 with only the fluid force of compressed air, and in such a case, three springs 228 may be omitted. If engine 1 is a gasoline engine, it may be possible to generate a biasing force equal to the elastic biasing force of first biasing mechanism 102 with only the elastic biasing force of three springs 228. If engine 1 is a diesel engine, it may be possible to generate a biasing force necessary for the diesel engine with the elastic biasing force of three springs 228 and the fluid force of compressed air. Similarly, above biasing unit 220 may be applied instead of second biasing mechanism 162 in the second swinging vane mechanism 160.

As shown in FIGS. 44 and 45, in order to improve the initial combustibility in the subchamber, subchamber 230 may be formed in a shape such as that shown in FIGS. 44 and 45, the subchamber 230 is opened at the midway portion of vane holding cavity 231. The interior surface 231a of vane holding cavity 231 is formed flat, and the lower surface of vane main body 104A in first swinging vane 101A is formed flat. However, a shallow recess 232 corresponding to the subchamber 230 is formed on the mid portion of the lower surface of vane main body 104A. Compressed fuel-air mixture is supplied into subchamber 230 through inlet passage 120 which is opened and closed by rotary valve 124, and ignition plug 59 is fitted as shown. Cooling water passages 223 are provided around subchamber 230. It is preferable to provide several horizontal small gas guide grooves on the interior surface 231a. As described in the above configuration, the shape of subchamber 230 becomes more spherical, thereby firing performance after ignition and initial combustibility in subchamber 230 is improved. Additionally, otherwise, subchamber 62 may be configured so as to extend from the front end to the rear end of housings 7,8.

As shown in FIGS. 46 and 47, in relation to axial portion 262 of first swinging vane 261 in first swinging vane mechanism 260, the diameter and wall thickness are enlarged, and a valve shaft 263 is enlarged in its diameter. In axial portion 262, in a mid portion in the axial direction of valve shaft 263 as a subchamber forming member, a cylindrical combustion subchamber 264, with a axial length equal to a half of the length of a rotary housing 7A, is provided. Axial portion 262 has an inlet passage 265 for introducing compressed fuel-air mixture into subchamber 264. The rotor housing 7A has an inlet cutout portion 266 for introducing the compressed mixture into inlet passage 265. In order to introduce the mixture into subchamber 264 and to make combustion gas in subchamber 264 gush out, valve shaft 263 is provided with an opening 267 communicating with subchamber 264. In order for combustion gas in subchamber 264 to gush into the combustion chamber, axial portion 262 is provided with an outlet passage 268 positioned at the opposite side to inlet passage 265. Rotor housing 7A has a vane holding cavity 269 opening to bore surface 58a and a gas guide passage 270 opening to vane holding cavity 269. The interior portion of gas guide passage 270 is capable of communicating with outlet passage 268, the axial length of gas guide passage 270 is enlarged gradually toward bore surface 58a. An ignition plug 59 for igniting compressed fuel-air mixture in subchamber 264 through opening 267 and outlet passage 268 is fitted on rotor housing 7A. Additionally, rotor housing 7A has a gas stream guide passage 271, and the total capacity of subchamber 264 and opening 267 is set so that a predetermined compression ratio is achieved in relation to the maximum capacity of the suction chamber. Valve shaft 263 is driven so as to rotate in the same direction and with the same rotating speed as rotor 5, by valve driving mechanism 42 including driven gear 44. The rotary valve comprises a cylindrical wall portion 263a of valve shaft 263, opening 267 and axial portion 262. As shown in FIG. 48, when rotor 5 rotates, inlet passage 265 moves along its moving zone 265z, and outlet passage 268 moves along its moving zone 268z, and opening 267 moves along its moving zone 267z. Additionally, an edge line 270e shown with a chain line corresponds to the upper edge of gas guide passage 270.

Accordingly, in the latter period of compression stroke in compression chamber, the compression chamber communicates with subchamber 264 via inlet cutout portion 266, inlet passage 265 and opening 267, thereby the compressed fuel-air mixture is introduced to subchamber 264. That is, compressed gas charging period AA during approximately 210 to 330 degrees in rotor rotation angle is determined as shown. In this charging period AA, outlet passage 268 is closed with cylindrical wall portion 263a. While moving zone 268z of outlet passage 268 is in moving zone 267z of opening 267 and is smaller in angle than the edge line 270e, subchamber 264 is communicating with combustion chamber through opening 267, outlet passage 268 and gas guide passage 270. Accordingly, combustion gas gushing period BB during approximately 0 to 160 degrees in rotor rotation angle is determined as shown. In this combustion gas gushing period BB, inlet passage 265 is closed with cylindrical wall portion 263a. Just after the charging period AA, in the period during approximately 320 to 360 degrees while moving zone 267z and moving zone 268z overlap, ignition plug 59 meets subchamber 264, igniting the compressed mixture in subchamber 264. As described above, if subchamber 264 is provided in the axial portion 262 of first swinging vane 261, the distance from compression chamber to the subchamber 264 can be considerably shortened, and rotor housing structure can be simplified. But, in order to cool valve shaft 263, an oil passage may formed in the wall of valve shaft 262, by means of enlarging the wall thickness of valve shaft 262. By giving the same numerals to elements same with those of above described embodiment, detailed descriptions thereof are omitted.

Instead of rotary valve 124, a check valve 290 as shown in FIG. 49 may be used. In this check valve 290, inside of the axial portion 103 of the vane 101, a valve member 291 made of heat resistant metal or non-metal material for opening and closing the first inlet passage 121 is provided. This valve member 291 is fitted and supported on the forward end portion of an elastic plate 292 made of heat resistant alloy steel. The base end portion of elastic plate 292 is fixed in a first embedded member 293 fixed in axial portion 103, and a second embedded member 294 is fixed in axial portion 103. When the gas pressure of compressed fuel-air mixture or compressed air charged from compression chamber 61 is exerted on valve member 291, elastic plate 292 deforms to open as shown with a chain line, thereby the compressed mixture or compressed air is charged into the subchamber 62 through second inlet passage 123. As well, when the gas pressure of combustion gas in the subchamber 62 is exerted on valve member 291, check valve 290 remains closed, thereby the combustion gas pressure does not flow back from first inlet passage 121. Check valve 290 is only one example, various kinds of check valves can be used.

Although not shown in Figure, in middle-sized engines for various uses such as marine use, the rotor in each cylinder may be provided with two projecting portions different from each other by 180 degrees in phase angle, and that, each cylinder may be provided with one first swinging vane mechanism and one second swinging vane mechanism. In such cases, in each cylinder, two time ignition (ignition by ignition plug for gasoline engines, ignition by compression and fuel injection for Diesel engines) is generated for each rotor revolution. Furthermore, as shown in FIG. 50, for middle-sized or large-sized engines in various uses such as marine use, the rotor holding bore 58A and rotor 5B are enlarged in their diameters. The rotor 5B in each cylinder is provided with two projecting portions 280 positioned as rotation symmetry around the axial center 4e of main shaft 4, and rotor housing 7b is provided with two sets of first swinging vane mechanisms 100 positioned at opposite sides of the axial center 4e and two sets of second swinging vane mechanisms 160 positioned at opposite sides of the axial center 4e. The intake port 34 and exhaust port 37 are provided in adjacent to each second swinging vane mechanisms 160. The leading side curved surface 281 (gently inclined curved pressurization surface), the trailing side curved surface 282 (steeply inclined curved pressure reception surface), the minimum radius surface 283 etc. are formed as shown in FIG. 50. The other configurations such as seal members of rotor 5B, the rotary valve and its gas inlet passages and the valve driving mechanism, first swinging vane 101 and second swinging vane 161 are the same as those described in the above embodiment.

If each rotor has plural projecting portions, and/or, if plural sets of 20 first and second swinging vane mechanisms are provided around each rotor holding bore, when defining the number of projecting portion as i, the number of first swinging vane mechanism as j and the number of second swinging vane mechanism as j, the number of chambers formed between the rotor and the bore surface is (i+2j). Capacities of these chambers vary respectively depending on rotor rotation.

The various gas sealing configurations described in the above embodiments are only examples; various alterations to these gas sealing configurations may also be adopted. For example, a pair of annular side seals 93 may be fitted in a double pattern on front and rear end surfaces of the rotor, or plural small seal members may be added on front and rear end surfaces of the rotor, or side seal members 117a, 187a of the vane main bodies 104, 164 of first and second vanes 101, 161 may be altered in their shapes. Cooling and lubricating oil may be supplied into rotors through the main shaft, or a water cooling system cooling rotors by water may be adopted. For small-sized engines, an air cooling system or an oil cooling system may be adopted for cooling housings, and the other various alterations may also be used.

In the above embodiment, the engine has two cylinders, but it is more preferable to provide three cylinders in order to improve the continuity of output torque. However, the number of cylinders can be set freely according to uses of the engine. The engine according to the present invention can be applied not only to automobiles but also to engines with various sizes for various uses (for example, the engine for agricultural vehicles, construction vehicles and ships). In the above embodiment, descriptions were given for a gasoline engine for automobiles, but it may also be used for Diesel engines. However, in this case, some alterations need to be made. For example, ignition plug 59 and injectors 36 are omitted, and each subchamber forming portion is provided with a fuel injector for injecting fuel into the subchamber and a glow plug for heating compressed air and fuel particles in the subchamber. Capacities of the suction chamber and the subchamber are designed so as to attain a predetermined compression ratio for the Diesel engine.

Additionally, as the structures of housings and rotors of this engine are rather simple, it may be possible to make housings and rotors with fiber-reinforced ceramic materials including high-tensile fibers such as aluminum oxide short fibers. Furthermore, the fuel for this engine is not limited to gasoline or light oil, but the engine can adopt various fuels such as gasoline-alcohol mixed fuel, alcohol, gasoline-water mixed fuel, hydrogen (gas or liquid), LPG, LNG and the like.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A rotary piston type internal combustion engine, comprising:

a housing including a rotor housing and side housings;

a cylindrical rotor holding bore formed in the housing;

a rotor as a rotary Piston held in the rotor holding bore rotatably around a rotation center which is an axial center of the rotor holding bore, the rotor including at a portion of an outer circumferential surface a minimum radius surface smaller in diameter than a bore surface which is a circumferential surface of the rotor holding bore, and including a projecting portion for partitioning whose top portion is in contact with the bore surface with gas seal engagement;

an axial member coaxial with the rotor holding bore, the axial member supporting the rotor on the housing, and being rotative in unison with the rotor;

an intake port and an exhaust port which are formed in the housing, the exhaust port being disposed near the intake port on the trailing side in the direction of rotor rotation;

a first partitioning means for partitioning hermetically between the outer circumferential surface of the rotor and the bore surface, said first partitioning means being located on an opposite side to the intake port and exhaust port with respect to the axial center of the rotor holding bore;

a second partitioning means for partitioning hermetically between the outer circumferential surface of the rotor and the bore surface, said second partitioning means being located between the intake port and exhaust port; and three chambers formed by partitioning with the first partitioning means, the second partitioning means and the projecting portion, between the outer circumferential surface of the rotor and the bore surface within the rotor holding bore, the three chambers varying their capacities according to rotor rotation, wherein the rotor comprises, on said outer circumferential surface, the minimum radius face, a first inclined curved pressurization surface extending with an increasing radius from a trailing side end of the minimum radius surface to the top of the projecting portion, and a second inclined curved pressure reception surface extending with an increasing radius from a leading side end of the minimum radius surface to the top of the projecting portion, the radius of said second inclined surface increasing at a greater rate than the radius of said first inclined surface, and wherein the first partitioning means comprises:

a first swinging partition member comprising an axial portion positioned so as to approximately circumscribe the bore surface and supported on the housing so as to swing around an axial center parallel with the axial center of the rotor holding bore, and a swinging partition plate formed integrally with the axial portion and extended by a given length from the axial portion in the direction of rotor rotation and having an engaging curved surface for engaging hermetically with the rotor;

a first holding cavity formed in the rotor housing and being open to the bore surface, and being capable of holding the swinging partition plate of the first swinging partition member; and a first biasing means for forcing the first swinging partition member so that the swinging partition plate may be forced against the rotor, said first biasing means comprising compressed air which provides an elastic force.

2. A rotary piston type internal combustion engine according to claim 1, wherein the second partitioning means comprises:

a second swinging partition member comprising an axial portion positioned so as to approximately circumscribe the bore surface and supported on the housing so as to swing around an axial center parallel to the axial center of the rotor holding bore, and a swinging partition plate formed integrally with the axial portion and extended by a given length from the axial portion in the direction of rotor rotation and having an engaging curved surface for engaging hermetically with the rotor, the second swinging partition member being capable of opening and closing the intake port at timings depending on rotation phase of the rotor;

a second holding cavity formed in the rotor housing and being open to the bore surface, and being capable of holding the swinging partition plate of the second swinging partition member, and communicating with the intake port; and a second biasing means for forcing the second swinging partition member so that the swinging partition plate may be forced against the rotor.

3. A rotary piston type internal combustion engine according to claim 1, wherein the three chambers comprise:

when the projecting portion of the rotor is positioned between the intake port and the first partitioning means in the direction of rotation, a suction chamber communicating with the intake port, a compression chamber between the projecting portion and the first partitioning means, and an exhaust chamber communicating with the exhaust port; and when the projecting portion of the rotor is positioned between the first partitioning means and the exhaust port in the direction of rotation, a suction chamber or a compression chamber, an expansion chamber, and an exhaust chamber.

4. A rotary piston type internal combustion engine according to claim 1, wherein the intake port and the exhaust port are formed in the rotor housing.

5. A rotary piston type internal combustion engine according to claim 1, wherein the projecting portion of the rotor comprises a seal groove, a seal member fitted in the seal groove and being in hermetical contact with the bore surface of the rotor holding bore, and a biasing means forcing the seal member against the bore surface.

6. A rotary piston type internal combustion engine according to claim 3, wherein the rotor housing is provided with a combustion subchamber opening to at least a portion of an interior end face of the first holding cavity, the combustion subchamber being capable of being switched as a closed condition closed hermetically by the swinging partition plate of the first swinging partition member and as an opened condition opened to the first holding cavity and the expansion chamber.

7. A rotary piston type internal combustion engine according to claim 3, further comprising:
a subchamber forming member fitted in an axial bore in the axial portion of the first swinging partition member; and
a combustion subchamber formed in the subchamber forming member.

8. A rotary piston type internal combustion engine according to claim 7, further comprising:
a gas inlet passage formed in the first swinging partition member for introducing compressed fuel-air mixture or compressed air in the compression chamber into the combustion subchamber; a gas outlet passage formed in the first swinging partition member for expelling combustion gas from the combustion subchamber into the expansion chamber; and
an opening/closing valve means having a valve shaft fitted in through the axial bore in the axial portion of the first swinging partition member, the valve shaft including the subchamber forming member, the opening/closing valve means opening and closing each of the gas inlet passage and the gas outlet passage at timings depending on rotation phase of the rotor.

9. A rotary piston type internal combustion engine according to claim 1, wherein the first biasing means further comprises one or more spring members.

10. A rotary piston type internal combustion engine according to claim 2, wherein the second biasing means comprises one or more spring members which provide an elastic force.

11. A rotary piston type internal combustion engine according to claim 2, wherein the second biasing means comprises one or more spring members and compressed air which provide an elastic force.

12. A rotary piston type internal combustion engine according to claim 1, further comprising an oil supplying means for supplying lubricating oil to the engaging curved surface of the first swinging partition member of the first partitioning means.

13. A rotary piston type internal combustion engine according to claim 1, further comprising a cooling means for cooling the first swinging partition member of the first partitioning means.

14. A rotary piston type internal combustion engine according to claim 2, further comprising an oil supplying means for supplying lubricating oil to the engaging curved surface of the second swinging partition member of the second partitioning means.

15. A rotary piston type internal combustion engine according to claim 2, further comprising a cooling means for cooling the second swinging partition member of the second partitioning means.

16. A rotary piston type internal combustion engine according to claim 6, further comprising an ignition plug for igniting compressed fuel-air mixture in the combustion subchamber.

17. A rotary piston type internal combustion engine according to claim 6, further comprising a fuel injector for injecting fuel into the combustion subchamber.

18. A rotary piston type internal combustion engine comprising:

a housing including a rotor housing and side housings;
a cylindrical rotor holding bore formed in the housing;
a rotor as a rotary piston held in the rotor holding bore rotatably around a rotation center which is an axial center of the rotor holding bore, the rotor including at a portion of an outer circumferential surface a minimum radius surface smaller in diameter than a bore surface which is a circumferential surface of the rotor holding bore, and including a protecting portion for partitioning whose top portion is in contact with the bore surface with gas seal engagement, said rotor including, on said outer circumferential surface, the minimum radius face, a first inclined curved pressurization surface extending with an increasing radius from a trailing side end of the minimum radius surface to the top of the projecting portion, and a second inclined curved pressure reception surface extending with an increasing radius from a leading side end of the minimum radius surface to the top of the projecting portion, the radius of said second inclined surface increasing at a greater rate than the radius of said first inclined surface;
an axial member coaxial with the rotor holding bore, the axial member supporting the rotor on the housing, and being rotative in unison with the rotor;
an intake port and an exhaust port which are formed in the housing, the exhaust port being disposed near the intake port on the trailing side in the direction of rotor rotation;
a first partitioning means for partitioning hermetically between the outer circumferential surface of the rotor and the bore surface while engaging the outer circumferential surface, on an opposite side to the intake Port and exhaust port with respect to the axial center of the rotor holding bore, the first partitioning means including:
a first swinging partition member comprising an axial portion positioned so as to approximately circumscribe the bore surface and supported on the housing so as to swing around an axial center parallel with the axial center of the rotor holding bore, and a swinging partition plate formed integrally with the axial portion and extended by a given length from the axial portion in the direction of rotor rotation and having an engaging curved surface for engaging hermetically with the rotor;
a first holding cavity formed in the rotor housing and being open to the bore surface, and being capable of holding the swinging partition plate of the first swinging partition member; and
a first biasing means for forcing the first swinging partition member so that the swinging partition plate may be forced against the rotor;
a second partitioning means for partitioning hermetically between the outer circumferential surface of the rotor and the bore surface while engaging the outer circumferential face, between the intake port and exhaust port; and
three chambers formed by partitioning with the first partitioning means, the second partitioning means and the projecting portion, between the outer circumferential surface of the rotor and the bore surface within the rotor holding bore, the three chambers varying their capacities according to rotor rotation, said three chambers including,
when the projecting portion of the rotor is positioned between the intake port and the first partitioning means in the direction of rotation, a suction chamber communicating with the intake port, a compression chamber between the projecting portion and the first partitioning means, and an exhaust chamber communicating with the exhaust port; and when the projecting portion of the rotor is positioned between the first partitioning means and the exhaust port in the direction of rotation, a suction chamber or a compression chamber, an expansion chamber, and an exhaust chamber;

the rotor housing being provided with a combustion subchamber opening to at least a portion of an interior end face of the first holding cavity, the combustion subchamber being capable of being switched as a closed condition closed hermetically by the swinging partition plate of the first swinging partition member and as an opened condition opened to the first holding cavity and the expansion chamber;

a gas inlet passage formed in the first swinging partition member for introducing compressed fuel-air mixture or compressed air in the compression chamber into the combustion subchamber; and an opening/closing valve means having a valve shaft fitted in through an axial bore in the axial portion of the first swinging partition member, the opening/closing valve means opening and closing the gas inlet passage at timings depending on rotation phase of the rotor.

19. A rotary engine, comprising:

a housing defining a rotor holding bore;

a rotor disposed in said rotor holding bore and being rotatable in a rotational direction;

a swinging partition member swingably disposed adjacent to said rotor holding bore, said swinging partition member engaging an outer circumferential surface of said rotor, said swinging partition member being swingable into a holding cavity communicating with said rotor holding bore;

a portion of said rotor holding bore located upstream of said swinging partition member relative to said rotational direction being an intake/compression chamber;

a portion of said rotor holding bore located downstream of said swinging partition member relative to said rotational direction being an expansion/exhaust chamber;

said housing defining a combustion subchamber adjacent to said holding cavity, said combustion subchamber being communicable with said intake/compression chamber when said swinging partition member is located in a first angular range of rotation, said combustion subchamber being communicable with said expansion/exhaust chamber when said swinging partition member is located in a second angular range of rotation.

20. A rotary engine according to claim 15, wherein said combustion subchamber is communicable with said intake/compression chamber via a gas inlet passage defined in said swinging partition member.

21. A rotary engine according to claim 19, wherein said expansion/exhaust chamber is sealed off from each of said combustion subchamber and said intake/compression chamber by said swinging partition member when said swinging partition member is located in said first angular range of rotation.

22. A rotary engine according to claim 19, wherein said intake/compression chamber is sealed off from each of said combustion subchamber and said expansion/exhaust chamber by said swinging partition member when said swinging partition member is located in said second angular range of rotation.

23. A rotary engine according to claim 21, wherein said intake/compression chamber is sealed off from each of said combustion subchamber and said expansion/exhaust chamber by said swinging partition member when said swinging partition member is located in said second angular range of rotation.

24. A rotary engine according to claim 19, wherein a surface of said swinging partition member which engages said outer circumferential surface of the rotor is convex.

25. A swinging partition arrangement in a rotary engine including a housing defining each of a rotor holding bore and a combustion subchamber, and a rotor disposed in said rotor holding bore and being rotatable in a rotational direction, said swinging partition arrangement comprising:

a swinging partition member swingably disposed adjacent to said rotor holding bore, said swinging partition member being swingable into a holding cavity communicating with said rotor holding bore, said swinging partition member engaging an outer circumferential surface of said rotor to divide an intake/compression chamber of said rotor holding bore located upstream of said swinging partition member relative to said rotational direction from an expansion/exhaust chamber of said rotor holding bore located downstream of said swinging partition member relative to said rotational direction, said swinging partition member being swingable in a first angular range of rotation to communicate said combustion subchamber with said intake/compression chamber, said swinging partition member being swingable in a second angular range of rotation to communicate said combustion subchamber with said expansion/exhaust chamber.

26. A swinging partition arrangement according to claim 25, wherein said swinging partition member defines a gas inlet passage which communicates said combustion subchamber with said intake/compression chamber when said swinging partition member is in said first angular range.

27. A swinging partition arrangement according to claim 25, wherein said swinging partition member seals said expansion/exhaust chamber off from each of said combustion subchamber and said intake/compression chamber when said swinging partition member is in said first angular range of rotation.

28. A swinging partition arrangement according to claim 25, wherein said swinging partition member seals said intake/compression chamber off from each of said combustion subchamber and said expansion/exhaust chamber when said swinging partition member is in said second angular range of rotation.

29. A swinging partition arrangement according to claim 27, wherein said swinging partition member seals said intake/compression chamber off from each of said combustion subchamber and said expansion/exhaust chamber when said swinging partition member is in said second angular range of rotation.

30. A swinging partition arrangement according to claim 25, wherein a surface of said swinging partition member which engages said outer circumferential surface of the rotor is convex.

* * * * *